United States Patent
Berquist et al.

(10) Patent No.: US 6,437,807 B1
(45) Date of Patent: *Aug. 20, 2002

(54) TOPOGRAPHY OF SOFTWARE NOTES

(75) Inventors: David T. Berquist, St. Paul; Peter M. Eisenberg; Mitchell B. Grunes, both of Minneapolis; Timothy A. Mertens, Cottage Grove; Cindy L. Munson, Woodbury; Martin A. Kenner, Burnsville; John M. Kruse, Minneapolis, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/635,482

(22) Filed: Aug. 8, 2000

Related U.S. Application Data

(63) Continuation of application No. 08/890,162, filed on Jul. 9, 1997, now Pat. No. 6,151,021, which is a division of application No. 08/674,082, filed on Jul. 1, 1996, which is a continuation of application No. 08/188,219, filed on Jan. 27, 1994, now abandoned.

(51) Int. Cl.[7] .................................................. G06F 3/14
(52) U.S. Cl. ........................ 345/764; 345/788; 345/804
(58) Field of Search ................................ 345/335, 337, 345/348, 350, 346, 435, 113, 114, 118, 145, 744, 747, 764, 765, 769, 770, 835, 839, 775, 776, 804, 805, 856, 620, 628, 634; 707/500, 512, 530

(56) References Cited

U.S. PATENT DOCUMENTS

| | | | |
|---|---|---|---|
| 3,999,050 A | 12/1976 | Pitroda | 708/112 |
| 4,079,449 A | 3/1978 | Mercurio et al. | 345/804 |
| 4,458,331 A | 7/1984 | Amezcua et al. | 345/804 |
| 4,555,775 A | 11/1985 | Pike | 349/790 |
| 4,616,336 A | 10/1986 | Robertson et al. | 707/512 |
| 4,626,836 A | 12/1986 | Curtis et al. | 345/156 |
| 4,752,893 A | 6/1988 | Guttag et al. | 345/440 |
| 4,782,521 A | 11/1988 | Bartlett et al. | 379/354 |

(List continued on next page.)

FOREIGN PATENT DOCUMENTS

| | | |
|---|---|---|
| CA | 2003231 | 12/1990 |
| CA | 2045907 | 12/1992 |
| EP | 0 230 141 A2 | 7/1987 |
| EP | 0 547 784 A2 | 6/1993 |
| WO | WO 90/15380 | 12/1990 |

OTHER PUBLICATIONS

PinUp Notes Version 1.3 for Microsoft disk and accompanying documentation.

(List continued on next page.)

Primary Examiner—Crescelle N. dela Torre
(74) Attorney, Agent, or Firm—Schiff Hardin & Waite

(57) ABSTRACT

The present invention implements, in a data processing environment, many of the attributes of paper Post-it® notes. The note program of the present invention need not be resident in an application program, and the notes of the present invention may be moved directly between windows or between regions without being saved in an intermediate memory, may be easily dispensed either from a note dispenser of a window or on a desktop, may overlap the boundary of a window, may be automatically saved, may be attached to a document within a window so that the note moves with the document, may overlap a boundary of a window, may be resized with the constraint that the note may not be resized off of a window, may be moved across a window boundary, and may be attached to an object, such as a character, a word, a sentence, or paragraph of a document.

66 Claims, 38 Drawing Sheets

U.S. PATENT DOCUMENTS

| | | | |
|---|---|---|---|
| 4,819,191 A | 4/1989 | Scully et al. | 345/751 |
| 4,868,765 A | 9/1989 | Diefendorff | 345/797 |
| 4,881,179 A | 11/1989 | Vincent | 358/1.14 |
| 4,931,783 A | 6/1990 | Atkinson | 345/163 |
| 4,977,520 A | 12/1990 | McGaughey, III et al. | 345/753 |
| 5,023,851 A | 6/1991 | Murray et al. | 368/41 |
| 5,161,213 A | 11/1992 | Knowlton | 345/428 |
| 5,165,012 A | 11/1992 | Crandall et al. | 345/809 |
| 5,202,828 A | 4/1993 | Vertelney et al. | 707/530 |
| 5,231,578 A | 7/1993 | Levin et al. | 707/512 |
| 5,341,293 A * | 8/1994 | Verteiney et al. | 707/530 |
| 5,367,623 A | 11/1994 | Iwai et al. | 345/776 |
| 5,524,193 A * | 6/1996 | Covington et al. | 707/512 |
| 5,559,942 A * | 9/1996 | Gough et al. | 345/802 |
| 5,563,996 A * | 10/1996 | Tchao | 707/521 |
| 5,581,681 A * | 12/1996 | Tchao et al. | 707/541 |
| 5,590,256 A * | 12/1996 | Tchao et al. | 707/525 |
| 5,596,697 A * | 1/1997 | Foster et al. | 345/810 |
| 5,596,700 A * | 1/1997 | Darnell et al. | 707/512 |
| 5,598,524 A | 1/1997 | Johnston, Jr. et al. | 345/769 |
| 5,623,679 A | 4/1997 | Rivette et al. | 707/526 |
| 5,623,681 A * | 4/1997 | Rivette et al. | 707/522 |
| 5,806,079 A | 9/1998 | Rivette et al. | 707/512 |
| 6,151,021 A * | 11/2000 | Berquist et al. | 345/764 |

OTHER PUBLICATIONS

Note Ware Version 3.0(c) 1993 disk and accompanying documentation.
Quick Note for Windows disk and accompanying documentation.
WinPost 3.2a disk and accompanying documention.
PostNote 3.0 disk.
IBM Technical Disclosure Bulletin, vol. 28, No. 4, Sept., 1985, pp. 1623–1628.
Selected pages from Microsoft Word Brochure, pp. 17–23.
Article entitled "RAM–Resident Programs Help the Disorganized" —Dec. 4, 1987 *Government Computer News*.
Article entitled "Software: Note–It Plus, Noteworthy, and Smartnotes" —Jul., 1988 *Lotus*.
Adobe™Acrobat Version 1.0, 5 disks and accompanying documentation.
Diskette containing copy of software program entitled "Evergreen Notes For Windows", by Evergreen International Technology Inc.™, 1994.
Photocopy of User Guide for Evergreen Notes For Windows computer software program, @1994 Evergreen International Technology Inc.™.
Brief article and product announcement retyped from Computing Canada entitled "Evergreen invents electronic post–it–notes for Windows," vol. v.20, Issue n5, p. 46(1), Published Mar. 2, 1994, copyright 1994 Information Access Co.
Brief article and product announcement retyped from Computer Reseller News, by Jeanette Brown, Dec. 13, 1993, p. 106, copyright 1993 CMP Publications, Inc.
Pp. 2–3 of MacWarehouse 1994 Product Catalog.
IBM Technical Disclosure Bulletin, vol. 33 No. 8, Jan. 1991, pp. 258–259.
IBM Technical Disclosure Bulletin, vol. 34 No. 10B, Mar. 1992, pp. 53–54.
IBM Technical Disclosure Bulletin, vol. 35 No. 4B, Sep. 1992, p. 362
IBM Technical Disclosure Bulletin, vol. 37 No. 01, Jan. 1994, pp. 121–122.
2244 Research Disclosure (1990) Dec., No. 320, Emsworth, GB, entitled: "Creating Personalized User Indexes for Annotated Documents", Disclosed Anonymously.
IBM™Technical Disclosure Bulletin entitled "Electronic Posted Notes", vol. 37, No. 1, Jan. 1994, pp. 121–122.
IBM™Technical Disclosure Bulletin entitled "Translucent Window Attribute", vol. 36 No. 06A, Jun. 1993, pp. 135–136.
Brochure entitled "Inside OS2®2.0", By New Riders Publishing, Undated, cover and pp. 159–160.
Article entitled "Media View—A General Multimedia Digital Publication System", Communications of the ACM, vol. 34, No. 7, pp. 75–83, Jul. 1991, by Richard L. Phillips.

* cited by examiner

TOPOGRAPHY OF SOFTWARE NOTES

This is a Continuation of U.S. application Ser. No. 08/890,162, filed Jul. 9, 1997 now U.S. Pat. No. 6,151,021, which is a Divisional of U.S. application Ser. No. 08/674,082, filed Jul. 1, 1996, which is a Continuation of U.S. application Ser. No. 08/188,219, filed Jan. 27, 1994, now abandoned.

TECHNICAL FIELD OF THE INVENTION

The present invention relates to an arrangement which allows software notes to be used in much the same fashion as sticky-back paper Post-it® notes are currently used.

BACKGROUND OF THE INVENTION

Computers are currently used to execute a wide variety of application programs. Such application programs include, for example, design and manufacturing programs, spread sheet programs, word processing programs, programs to facilitate access to data bases, programs to create graphics, and the like. As the number and kinds of application programs continue to proliferate, as computers become easier to use, and as people become increasingly accustomed to using computers, the types of application programs will continue to grow.

While a computer is executing such application programs, the computer user may be offered many occasions on which it would be desirable to create one or more notes. For example, on one occasion, a computer user may be working on one or more application programs when the computer user receives a telephone call. During that telephone call, the computer user may be presented with information which the computer user may wish to memorialize for later access and use or which may spark ideas which the computer user does not want to forget. On another occasion, the computer user may wish to be reminded of some action which the computer user desires, or is required, to take in the future, such as to make a telephone call or to fill out a time sheet. On yet another occasion, the computer user may want others to take some action, such as to review or revise a document.

On all of these occasions, a computer user would traditionally write down the appropriate information on paper notes. Paper Post-it® notes are very convenient forms of such paper notes. Paper Post-it® notes are simply removed from a dispenser pad of is sticky-back paper Post-it® notes, and are applied to various surfaces such as documents, the tops of desks, telephones, or the like. Information can be written on paper Post-it® notes either before or after the paper Post-it® notes are detached from their dispenser pad or attached to their target surfaces. Paper Post-it® notes can be easily moved from one surface to another, such as between documents or between documents and the tops of desks, they can overlap edges or boundaries of documents, they can be layered, and they can be moved with the objects to which they are attached.

However, it is often more convenient for a computer user who is currently using a computer to create a software note on the computer instead of manually writing out a paper note. For example, the note may relate to the contents of one or more documents of the computer's application programs. In such cases, it may be much more convenient to associate the note with a document as the document is saved in the computer's memory, or as the document is displayed on the computer screen. On the other hand, even if the note does not specifically relate to such a document, it still may be more convenient for the computer user to create a note on the computer. For example, if the computer user must take some action while the computer user is using the computer, a reminder note is much more useful if it can be attached to the desktop of the computer display so that the reminder note remains in the computer user's view even while the computer user moves from application program to application program or when all documents are closed.

Application programs currently exist which permit a computer user to generate a software note, and to attach the software note to a document of an application program. Such a note can be created, deleted, edited, saved, and selectively viewed. A computer user may move such a note within a document, or between documents, by cutting the note from a document, storing the note in a clipboard, and then pasting the note to another area of the same document or to a different document. The contents of the note may be entered by use of a keyboard, or by taking a snapshot of a document or of a portion of a document. The background color and size of a note can be selected, the note can be hidden or shown on a selective basis, the note can be stacked with other notes, and the note can be resized. A note can be saved with or without a date and time stamp and, if it is saved with a date and time stamp, the note can be automatically called up as a reminder note on the day and/or at the time stored with the note.

However, current note software programs have a number of problems. For example, many current note software programs must be resident in an application program so that the note software program cannot be interfaced with other application programs installed on the same computer. Therefore, a note for an application program in which the note software is not resident, or moving a note from a document of an application program in which the note software is resident to a document of an application program in which the note software is not resident, is impossible.

Moreover, notes generated by current note software cannot be easily moved. Moving a note between documents in the same application program, between documents of different application programs, between desktops, and between documents and desktops, is cumbersome since the note must be cut from its existing location, saved in a clipboard, and then pasted to its new location.

Notes generated by current note software cannot be easily dispensed, cannot be dispensed from the title bar of a window, cannot overlap the boundary of a window, and cannot be automatically saved without additional user instruction. While notes created by current note software can be attached to a document within a window so that the note moves with the document, notes cannot be attached to an object, such as a character, a word, a sentence, a paragraph, a graphic, a cell, a page, a video, a video frame, a video segment, a sound, or the like, so that the note moves with the object to a new site in the same document or in a different document. Notes created by current note software cannot be attached to a window so that, if the note is attached to a first portion of the window, the note moves with a scrollable section of the window, and so that, if the note is attached to a second portion of the window, the note does not move with a scrollable section of the window.

Icons have been used in connection with computer programs to open documents, to offer a selection of menu options, and to perform functions such as deleting documents. In some instances, icons are automatically saved. To a very limited extent, information, such as icon names, can even be inserted in certain icons which are created either by the computer program author or by the computer program user. However, even though limited information can be added to an icon, an icon is not a note. Unlike a note, an icon is merely a symbol which acts as a connection to an object in order to permit access to that object. For example, an icon permits access to a document, or to options from a menu represented by the icon. By contrast, a note is the object itself. A note can be accessed by way of an icon, and a note contains data. Data can be entered directly into a note, but data cannot be entered directly into an icon. The extent to which an icon can accept information is too limited to make the icon at all useful as a note.

The present invention overcomes one or more of the problems discussed above.

SUMMARY OF THE INVENTION

In one aspect of the present invention, program code is executed in a data processing system so that first and second windows are displayed, and so that the first window has a note. The note is moved from the first window directly to the second window so that the note is moved from the first window to the second window without storing the note in an intermediate storage location.

In another aspect of the present invention, a first program is executed in a data processing system, wherein a first region is displayed in response to execution of the first program, and wherein the first region has a note. A second program is executed in the data processing system, wherein a second region is displayed in response to execution of the second program, and wherein the first and second programs are different programs. The note is moved from the first region directly to the second region so that the note is moved from the first region to the second region without storing the note in an intermediate storage location.

In yet another aspect of the present invention, an indicator of a data processing system is moved to a note dispenser. A first note is grabbed from the note dispenser by use of the indicator, and the first note is moved to a location by use of the indicator. The indicator is moved to the note dispenser. A second note is grabbed from the note dispenser by use of the indicator, and the second note is moved to a location by use of the indicator.

In still another aspect of the present invention, a window is displayed in response to execution of program code in a data processing system. A note overlapping a boundary of the window is displayed in response to execution of program code in the data processing system.

In a still further aspect of the present invention, program code is executed in a data processing system to display a note in a region. Changes to the note are automatically saved without user instruction.

In another aspect of the present invention, program code is executed in a data processing system so that a window is displayed, and so that the window has an object therein. A note is attached to the object in the window so that the note moves with the object.

In yet another aspect of the present invention, a window is displayed in response to execution of program code in a data processing system, wherein the window has a first portion and a second portion. A note is attached to one of the first and second portions of the window in response to execution of program code in the data processing system so that, if the note is attached to the first portion of the window, the note moves with a scrollable section of the first portion of the window and so that, if the note is attached to the second portion of the window, the note does not move with the scrollable section of the window.

In still another aspect of the present invention, a window is displayed in response to execution of program code in a data processing system, wherein the window has a scrollable portion. A note is attached to the window in response to execution of program code in the data processing system so that the note does not move with the scrollable portion of the window.

In a still further aspect of the present invention, a window is displayed in response to execution of program code in a data processing system, wherein the window has a portion within which contents, such as contents of a document, are visible. A note, having a predetermined area, is displayed in response to execution of program code in the data processing system so that, if any portion of the predetermined area of the note is within the portion of the window, all of the note is displayed.

In yet a further aspect of the present invention, program code is executed in a data processing system so that a window is displayed and so that the window has a resizable note. Resizing of the note is limited so that the note cannot be resized off of the window.

In another aspect of the present invention, program code is executed in a data processing system so as to display a window having a boundary and so as to display a note in connection with the window. The note is moved across the boundary of the window.

In yet another aspect of the present invention, a window having a title bar is displayed in response to execution of program code in a data processing system. A note symbol is displayed in the title bar in response to execution of program code in the data processing system.

In still another aspect of the present invention, program code is executed in a data processing system so that first and second regions are displayed, and so that the first region has a note. The note is dragged from the first region directly to the second region.

In a further aspect of the present invention, program code is executed in a data processing system so that first and second regions are displayed in response to execution of the program code. A first note is attached to the first region. A second note is attached to the second region. At least some information concerning the first and second notes is added to an index.

In still a further aspect of the present invention, program code is executed in a data processing system so that first and second notes are displayed, and the first note is moved so that the second note is changed to permit contents under the second note to be viewed.

In yet a further aspect of the present invention, program code is executed in a data processing system so that a note is created wherein the first note has an option, and wherein the option has first and second states. The note is attached to a region so that, if the first state of the option is selected, the note moves as the region scrolls, and so that, if the second state of the option is selected, the note does not move as the region scrolls.

In still a further aspect of the present invention, a first program is executed in a data processing system, wherein the first program is an operating system, and wherein a first region is displayed in response to execution of the first program. A second program is executed in the data processing system, wherein a second region is displayed in response to execution of the second program, and wherein the first and second programs are different programs. A third program is executed in the data processing system in order to attach a note to one of the first and second regions, wherein the third program is compliant with the first and second programs, and wherein the third program is not a part of the first and second programs.

In another aspect of the present invention, an apparatus includes a region displaying means for displaying first and second regions, a note displaying means for displaying a note at the first region, and note moving means for moving the note from the first region directly to the second region so that the note is moved from the first region to the second region without storing the note in an intermediate storage location.

BRIEF DESCRIPTION OF THE DRAWINGS

These and other features and advantages will become more apparent from a detailed consideration of the invention when taken in conjunction with the drawing in which.

DETAILED DESCRIPTION

Paper Post-it® notes have substantially changed the way that people operate not only in their business environments but also in their personal environments. For example, when a person wishes to annotate a document, create a reminder, provide information to or request an action from another person, or the like, the person fills out a paper Post-it® note and applies the paper note to a document, a top of a desk, a file cabinet, a telephone, or the like. Paper Post-it® notes are convenient because they can be moved from one surface to another, such as between documents or between a document and a top of a desk, they can be edited, they have different attributes such as size, color, and shape, and they have many other useful characteristics. The present invention implements, in a data processing environment, many of these and other attributes of paper Post-it® notes.

Figure 1:
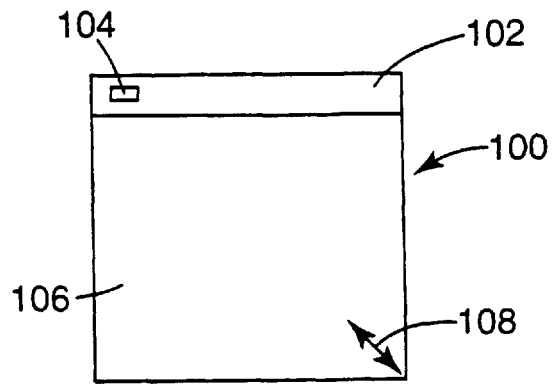
FIG. 1 illustrates a note according to one embodiment of the present invention.

An example of a software note 100 according to the present invention is shown in FIG. 1. A software note will be referred to hereinafter more simply as a note. The note 100 may have a grab area 102, an options area 104, a notation area 106, and/or one or more control areas such as a sizing control area 108. The grab area 102 allows the note 100 to be moved from one location to another, such as between documents, between desktops, or between documents and desktops. The options area 104, when activated, provides options which are selectable by a computer user. These options include, for example, hide/show, delete, font, color, size, duplicate, print, minimum/maximum, video/sound, drawings/graphics, cut/paste/copy, help, note information, preformatted notes, nonmove, content scrolling, and navigation. Any one or more of these options could be provided as a suitable area on the note 100.

The hide/show option allows the computer user to hide or to show the note 100. The delete option allows the note 100 to be deleted. The font option allows the computer user to select the font type, size, color, style, alignment, and the like, for the note 100. The color option allows the computer user to change the color of the note 100. The size option allows the size for the note 100 to be specified. Selection of the duplicate option allows the computer user to duplicate the note 100. Selection of the print option allows the computer user to print the note 100. The minimize/maximize option allows the computer user to select the minimum or maximum size of the note in a simple, one step operation. The video/sound option provides tools which can be used to manipulate and edit video and/or sound. The drawings/graphics option provides access to drawing and graphics manipulation features. The cut/paste/copy option provides basic editing tools for editing text, graphics, video, sound, and the like. The help option allows a computer user to ask for help in using the note program 318. Selection of the note information option provides information on the current note, such as creation time, last modification time, name of attached document, index number, etc. The preformatted note option allows preformatted notes, such notes in the format of a business form, notes with a computer user's name printed thereon, or notes having other specialized indicia, to be dispensed. The nonmove option has both a non-moving state and a moving state so that, if the non-moving state of the nonmove option is selected, the note does not move with a document being scrolled, and so that, if the moving state of the nonmove option is selected, the note moves with a document being scrolled. The content scrolling option, if selected, allows the contents of a note to be scrolled. The navigation option allows the computer user to navigate from one note to another on a document or between documents of the same or different application programs, and may include the additional functions of next note, previous note, first note, last note, go to a specific note, and the like.

Material, such as text, video, sound, or graphics, can be entered into the notation area 106 of the note 100, and the note 100 can be resized by the use of the sizing control area 108 in order to conform the size of the note 100 with the amount of information contained within the notation area 106, or for any other reason. The note 100 can be resized by positioning an indicator, such as a pointer or a cursor for example, over the sizing control area 108 of the note 100, by activating the cursor, by dragging the cursor to a different location, and by releasing the cursor. Although the term "cursor" is used herein, it should be clear that the term "cursor" is intended to broadly cover any type of indicator or pointer. As the cursor is dragged, an outline of the note 100 follows the cursor in order to indicate the changing size of the note 100. When the cursor is released, the note assumes the last indicated size of the note 100. Alternatively, the cursor can be positioned over the sizing control area 108 of the note 100, activated, and then activated again elsewhere on the viewing screen of a monitor of a display terminal to indicate a new corner location for the note 100. After this second activation, the note is resized. As a further alternative, the sizing control area 108 may comprise different size symbols each indicating a different size which may be selected for the note 100.

The grab area 102, the options area 104, the notation area 106, and the sizing control area 108 of the note 100 may be delineated by graphic design elements such as lines, shadings, color, or the like. The grab area 102 may be accessed, for example, by a cursor under control of a mouse, by arrow keys, or the like, in order to reposition the note 100. Either the grab area 102, or the notation area 106, or both, may be used to render the note active for such subsequent actions as adding information to, deleting information from, or editing information in, the notation area 106. A part of the display, when the options area 104 is accessed, may be a tool bar. Alternatively or in addition to the options area 104, the note 100 may contain a tool area which is always visible to the computer user.

Figure 2:
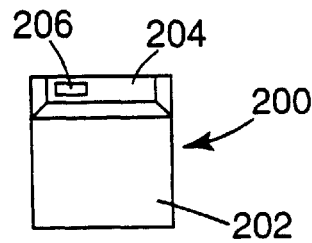
FIG. 2 illustrates one type of note dispenser which can be used to dispense notes, such as the note illustrated in FIG. 1.

The note 100 may be dispensed in a number of ways. One convenient way of dispensing the note 100 is from a note dispenser, an example of which is shown in FIG. 2. As shown in FIG. 2, a note dispenser 200 includes a note dispensing area 202 from which notes, such as the note 100, may be dispensed, a grab area 204 so that the note dispenser 200 may be repositioned, and an options area 206 which, when activated, presents options to the computer user. These options are selectable by the computer user, and may include, for example, options relating to the maximum and minimum size of notes, to hiding or showing all notes, to undeleting notes, to setting up a note appearance, to providing help, to specifying the color of notes, to printing a single note or a selected set of notes, to search for specific text, color, format, size, and/or the like of a note, and the like. The note dispensing area 202 represents a pad of notes from which notes may be dispensed one at a time, if desired. The areas of the note dispenser 200 may be delineated by graphic design elements such as lines, shadings, icons, color, and/or the like.

An index or directory listing of some or all of the notes may also be provided as a note option, a note dispenser option, an application program option, or otherwise.

Figure 3:
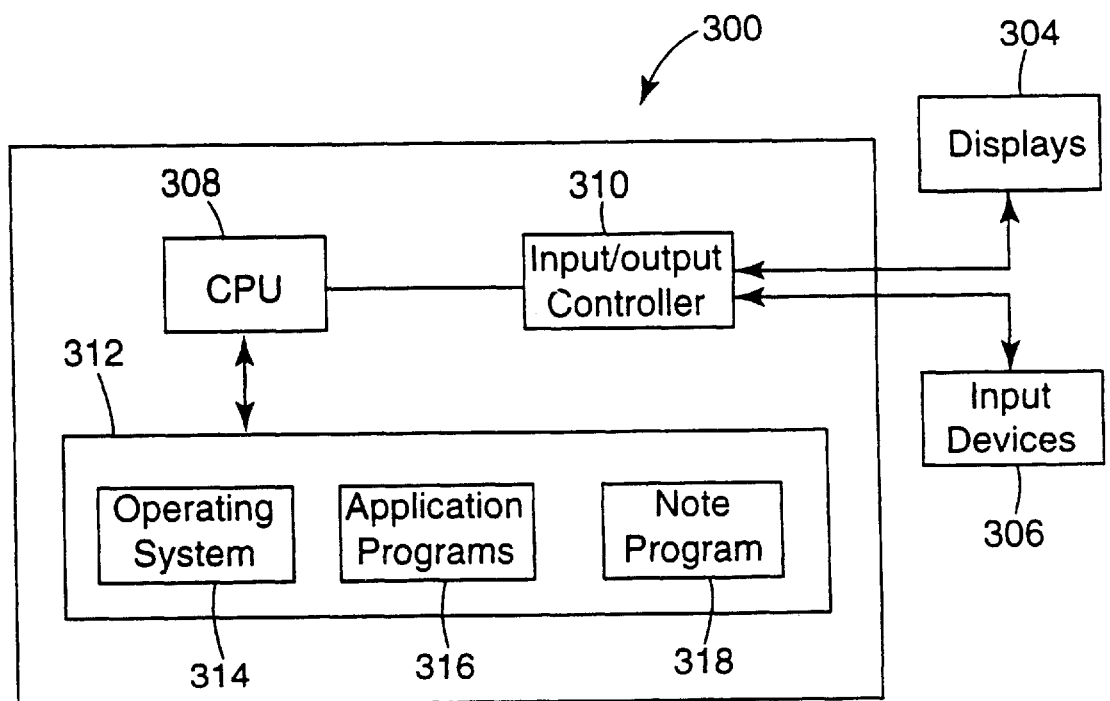
FIG. 3 is a block diagram of a data processing system which can be configured in accordance with the present invention.

One possible operating environment of the present invention is a data processing system such as a data processing system 300 shown in FIG. 3. However, it should be noted that the present invention can be used in any other operating environment. The data processing system 300, for example, can be a personal computer or work station which includes a processor 302, one or more display terminals 304, and one or more input devices 306. The display terminals 304 may include, for example, a monitor having a viewing screen, a printer, and/or the like. The input devices 306 may include, for example, a mouse, a keyboard, and/or similar devices.

The processor 302 includes a central processing unit (CPU) 308 which communicates with the display terminals 304 and the input devices 306 through an input/output controller 310, and which processes program code stored in a memory 312. The program code stored in the memory 312 includes, at least in part, an operating system 314, various application programs 316, and a note program 318. The application programs 316 may include word processing programs, spread sheet programs, and the like. The note program 318 is executed by the processor 302 in order to perform the functions of the present invention.

The note program 318 may contain a default size and shape for the note 100. The note program 318 may also contain a default color for the note 100 when the note is first created, i.e. dispensed. The default characteristics of the note 100 may be configured by the data processing system 300 and/or by the computer user. Furthermore, the color of the note 100 may change based on its state. For example, the note 100 positioned on a currently active window may have a different color or shade of color from a note positioned on an inactive window. An active window is a window which has been selected by a computer user for some action. An active window may have a different appearance to indicate that it is active and that inactive window are not active. The color of an individual note may also be changed by the computer user after it is created.

The note program 318 can provide more than one note dispenser 200. Each such note dispenser 200 may have a different size and shape. The notes of such note dispensers can have different functions. The computer user may dispense a note from a note dispenser dependent upon the desired function of the note.

Figure 4:
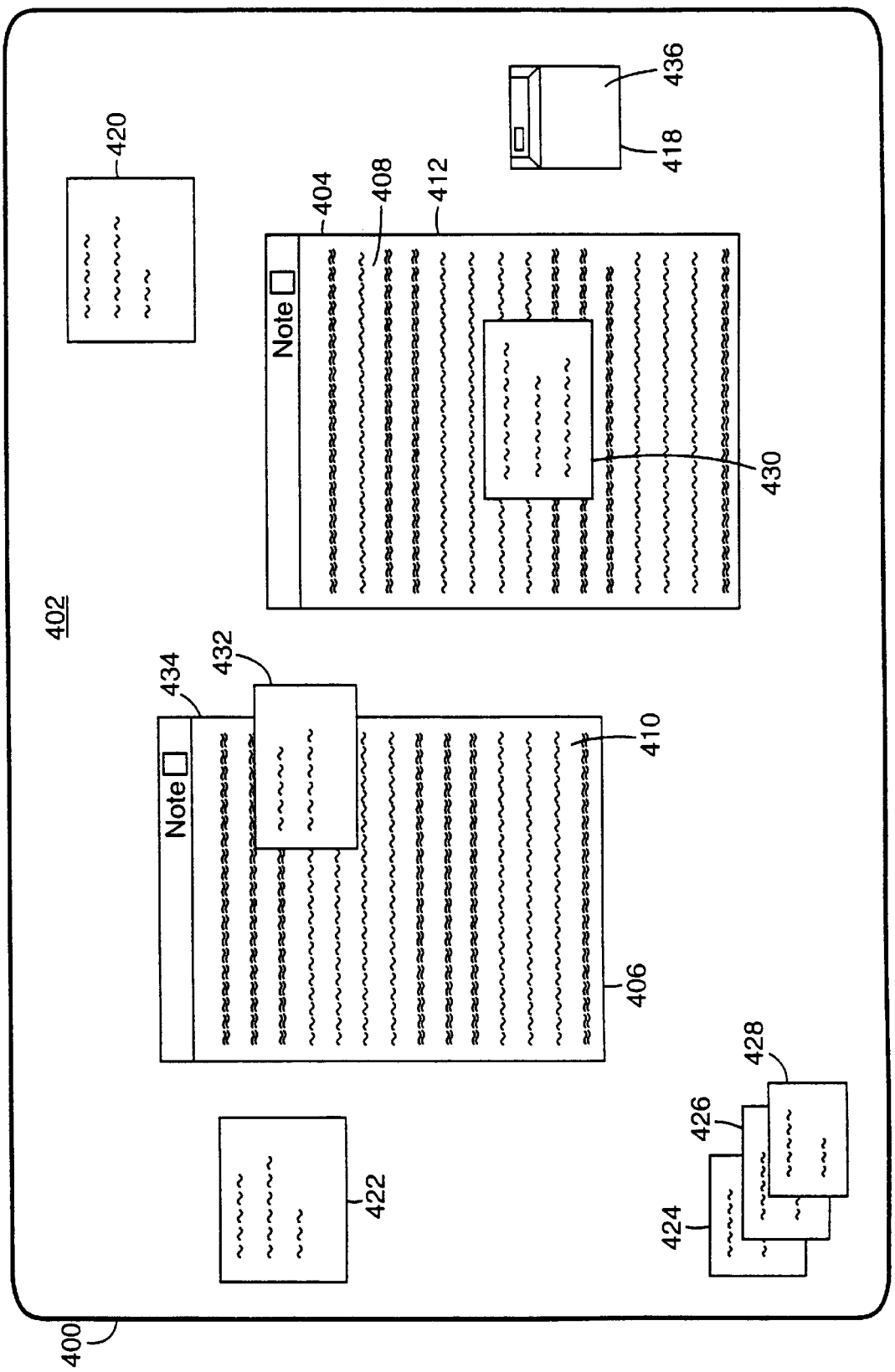
FIG. 4 is a representation of a screen display showing an overview of the preferred embodiment of the present invention.

FIG. 4 illustrates one possible display 400 which may appear on a viewing screen of a monitor of the display terminals 304 during execution by the data processing system 300 of the operating system 314, the application programs 316, and the note program 318. The display 400 includes a desktop 402 typically generated in response to execution of the operating system 314, an active window 404 typically generated in response to execution of one of the application programs 316, and an inactive window 406 also typically generated in response to execution of one of the application programs 316. The active window 404 contains a document 408, and the inactive window 406 contains a document 410. Each window, such as the active window 404, is typically defined by a boundary 412 which includes, in part, a title bar 414.

A note dispenser 418, which may be identical to the note dispenser 200 shown in FIG. 2, is positioned on the desktop 402. A plurality of notes are attached to various regions of the display 400. A region is defined herein as a window, or a desktop, or a document, or the like, but does not mean two areas of a document displayed in a window. For example, notes 420, 422, 424, 426, and 428 are attached to the desktop 402. These notes remain on the desktop 402 even though the active window 404 and the inactive window 406 are edited, are closed, or are replaced by other windows. Also, until these notes are deleted or edited, these notes may or may not, as desired, appear each time the data processing system 300 is initialized.

A note 430 is attached to the document 408 within the active window 404, and a note 432 is attached to the document 410 within the inactive window 406 so that it overlaps a right-hand edge of a boundary 434 of the inactive window 406. The notes 430 and 432 are saved so that they appear whenever their corresponding documents 408 and 410 appear, and the notes 430 and 432 appear on the viewing screen of a monitor of the display terminals 304 only when their corresponding documents 408 and 410 appear on the viewing screen of the monitor of the display terminals 304. The notes 420, 422, 424, 426, 428, 430, and 432, and the note dispenser 418, are created in response to execution of the note program 318.

A note can be dispensed, for example, from the note dispenser 418 by positioning a cursor (e.g., by appropriately controlling a mouse) over a note dispensing area 436 of the note dispenser 418. By activating the cursor (e.g., by depressing the control button of the mouse), a note can be dragged from the note dispenser 418 to a desired location where it can be attached by deactivating the cursor (e.g., by releasing the control button of the mouse). Alternatively, by positioning a cursor over the note dispensing area 436 of the note dispenser 418 and by merely activating the cursor, note can be caused to appear at locations of the display 400 as determined by the note program 318 and/or by the computer user. The notes can be moved from these locations by dragging the note to a desired attachment site.

Notes can be attached to an attachment site by selecting a note and by positioning the note on the attachment site to which the note is to be attached. For example, a cursor may be moved to the grab area of a note, such as the grab area 102 of the note 100. The cursor is activated, and the note is dragged to a desired attachment site. The note is then attached to the attachment site which is located under the cursor at the time that the cursor is deactivated. Alternatively, an attachment area can be provided on a note so that the note is attached to whatever attachment site is located beneath the attachment area of the note at the time that the cursor is deactivated. As another alternative, a note can be moved by clicking a mouse on the grab area of the note, and by then clicking the mouse again at a new attachment site.

If a note is attached so that the note is entirely within the boundary of a window, the attachment site of the note is easily discerned. However, when a note, such as the note 432, overlaps a boundary of a window, the attachment site of the note may be ambiguous. Thus, without any further indication, the note 432 could be attached either to the document 410 or to the desktop 402. Therefore, an indication may be provided to indicate the attachment site of the note. For example, a note attached to a window may have a different color, texture, border, or the like, than a note attached to a desktop. Alternatively, the options, tool, and size graphics can be removed from notes that are not attached to the top layered document. As another alternative, an attachment point on each note can be used to indicate the point to which the note is attached. Thus, a thumb tack graphic, or the like, can be used such that the point of the tack indicates the precise attachment point. Drop shadowing and/or border highlighting can be also used.

A note may or may not be attached to another note, as desired. In either event, however, notes can be layered with other notes so that the notes overlap parts of other notes, as illustrated by the notes 424, 426, and 428 of FIG. 4. Also, notes remain attached to documents as the documents travel, such as between terminals, and/or between terminals and a network server of a network, so that any computer user on the network receives the benefit of the notes as the computer user calls up documents to which the notes are attached.

When a new note is dispensed, the note can be displayed with an insert symbol (for example, a blinking vertical bar) at an insert point in the notation area of the note, such as in the notation area 106 of the note 100. Text or other material can be entered from a keyboard or other input device 306. If text is to be entered, for example, the computer user simply begins typing at the insert symbol within the newly dispensed (i.e., created) note. When an existing note is to be edited, a computer user positions an insert symbol within the notation area of the existing note and modifies the desired information as desired. In either case, the insert symbol moves with information entry to indicate the current insert point.

Preferably, although not necessarily, automatic word wrap is provided if text is entered into a note, or if a note having existing text is resized. When the entered text reaches the bottom right extent of the note, further entry of text is possible but is not seen by the computer user unless the computer user subsequently resizes the note, or makes the font size of the entered text smaller. Alternatively, additional text entry can be disallowed, and a beep can be sounded to indicate that the note is full. In another alternative, additional entry of text automatically expands the visible size of the note to accommodate the new text until the viewing screen of the data processing system is filled. Thereafter, text is scrolled up in the note as each new line of text is entered. Additional alternatives will be readily apparent.

The end of text entry can be invoked, for example, by clicking a mouse outside of the notation area of the note, which removes the insert symbol from the note. The end of text entry can also be invoked by pressing a key (such as the escape key) or a combination of keys. The amount of information that can be entered into a single note can be limited by the amount of memory provided by the system at the time that the note is created. Alternatively, a specific limit can be imposed on the amount that can be entered.

Drawings, video, and/or sound information can be added to the notation area of a note by copying them from another document and pasting them into the note. Alternatively, such information can be added to a note by using drawing, video, and/or sound tools available from the options area of a note or from a tool bar.

As mentioned previously and as shown in FIG. 5, notes can be dispensed in a variety of ways. For example, a note can be dispensed from a note dispenser, such as a note dispenser 500, which is located on a desktop 502 of a display 504. A note may be dispensed from the note dispenser 500 by moving a cursor to a note dispensing area 506 of the note dispenser 500, by activating the cursor (such as by clicking a mouse) to grab a note, and by dragging the note from the note dispensing area 506 to either the desktop 502 or to a window, such as a window 508. Thus, a note 510 can be grabbed by a cursor from the note dispensing area 506, and dragged by the cursor to a position on the desktop 502. The note 510 is attached to the desktop 502 by releasing the cursor. Alternatively, or additionally, a note 512 can be grabbed by a cursor from the note dispensing area 506, and dragged by the cursor to the window 508. The note 512 is attached to the window 508 by releasing the cursor. Alternatively, by positioning a cursor over the note dispensing area 506 of the note dispenser 500 and by merely activating the cursor, the note can be caused to appear in at locations of the display 504 as determined by the note program 318 and/or by the computer user.

Figure 5:
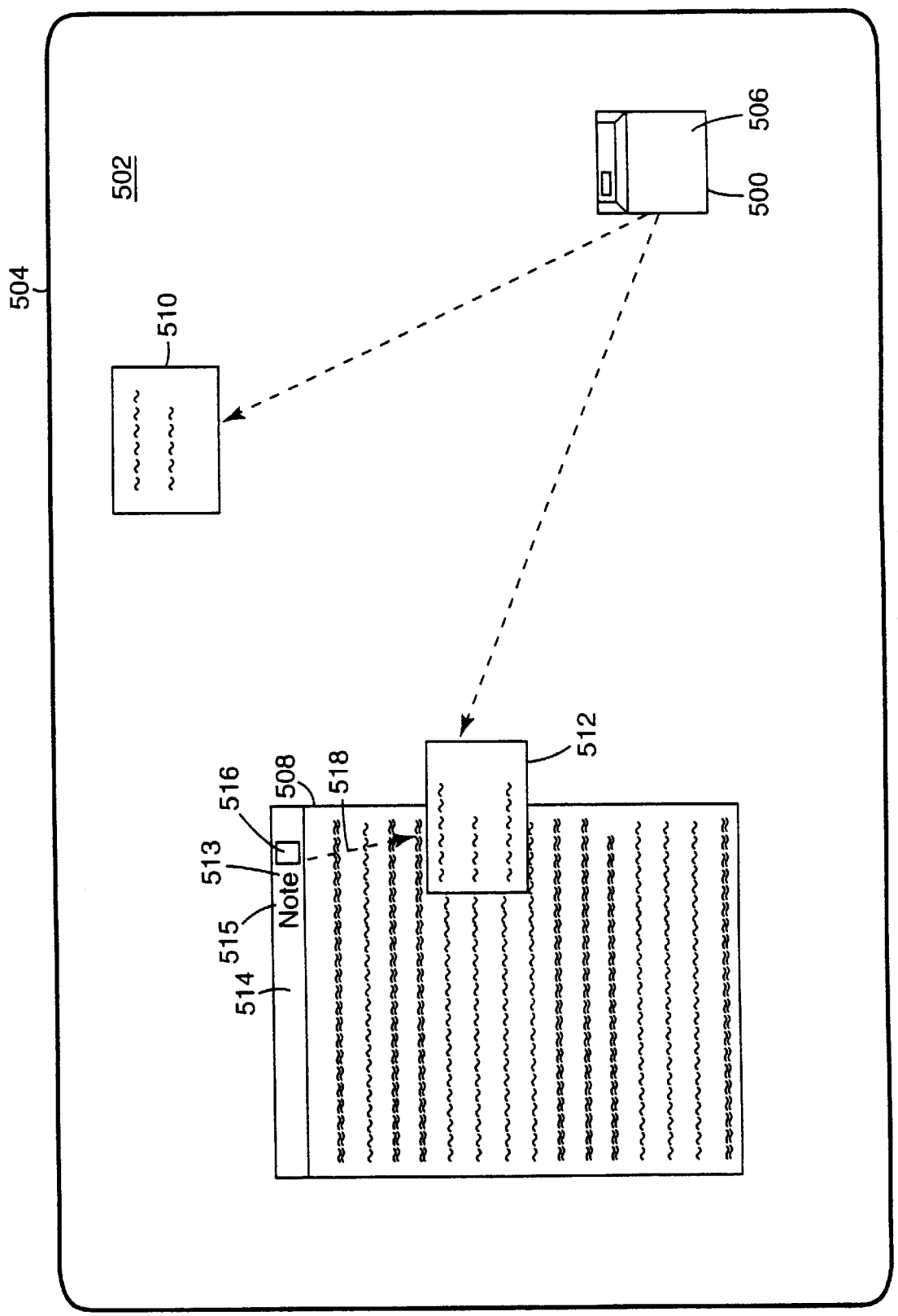
FIG. 5 is a representation of a screen display showing the creation of notes.

Also, as shown in FIG. 5, as part of the interface between the note program 318 and one or more of the application programs 316, a symbol, such as a note dispenser 513, appears in a title bar 514 of the window 508, although the note symbol, such as the note dispenser 513, may appear elsewhere on the window 508, such as in a tool bar or in a menu bar. The note dispenser 513 may be one or more words, icons, graphics, or the like. For example, the note dispenser 513 may comprise two parts, an options area 515 and a note dispensing area 516. As in the case of the note dispenser 500, a note, such as the note 512, can be dragged from the note dispensing area 516 by positioning the cursor over the note dispenser 516, by activating the cursor to grab a note from the note dispensing area 516, by dragging the note to any desired attachment site on either the window 508 or on the desktop 502, and by deactivating the cursor to attach the note to the desired attachment site. Alternatively, by positioning the cursor of the data processing system 300 over the note dispensing area 516 in the title bar 514, and by activating the cursor, a note, such as the note 512, is dispensed to a predetermined region of the display 504 as indicated by an arrow 518. The grab area of the note 512, such as the grab area 102 of the note 100 shown in FIG. 1, can be used to attach the note 512 to any desired attachment site either on the window 508 or on the desktop 502.

Figure 6:
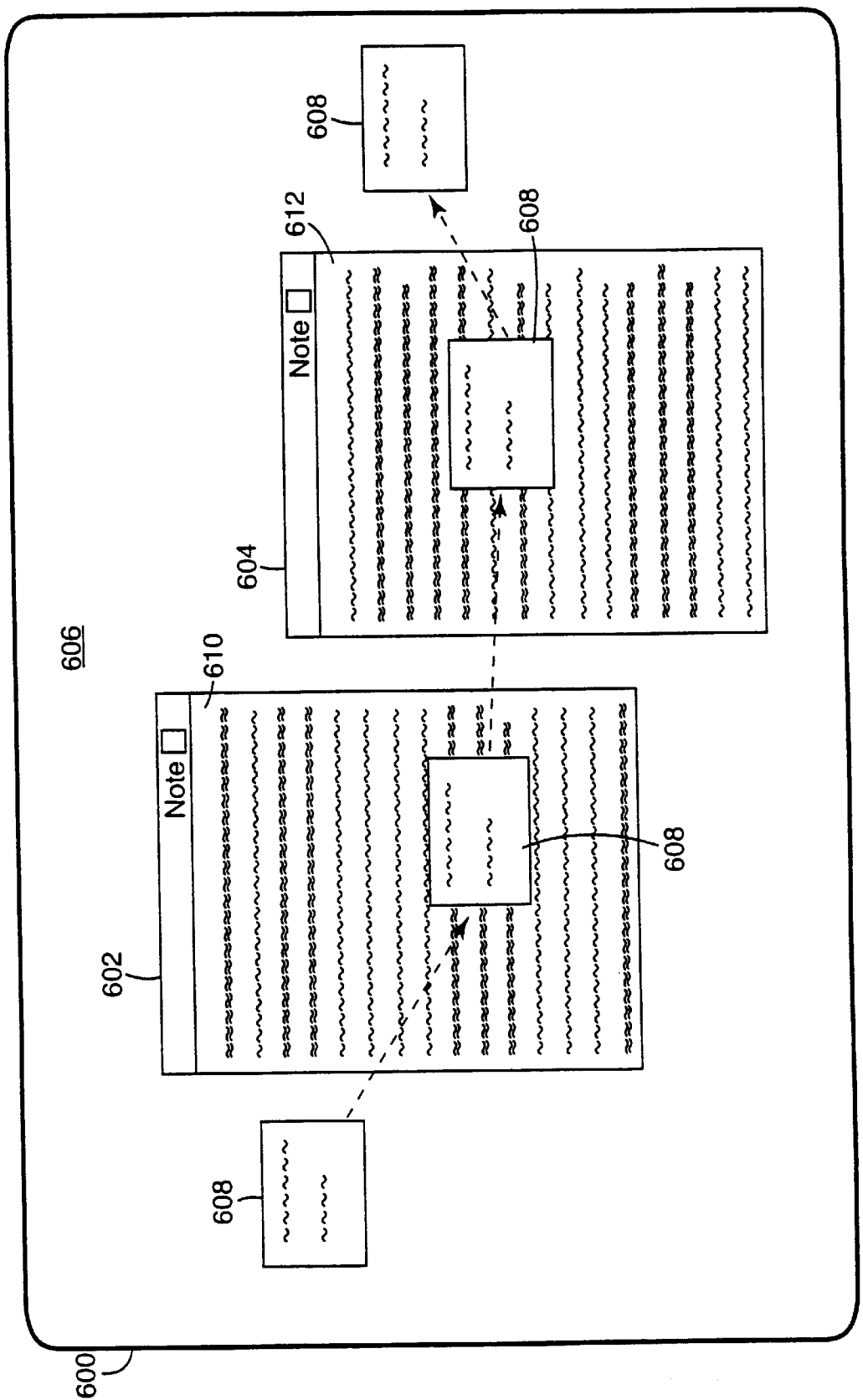
FIG. 6 is a representation of a screen display showing note movement and attachment.

As shown in FIG. 6, notes can be moved directly between regions of a display 600, such as between regions resulting from execution of application programs and/or operating systems. Because notes can be moved directly from a first region to a second region, the notes are moved without first saving the notes in a clipboard or other intermediate memory before the notes are attached to the second region. For example, with the present invention, there is no need to first cut or copy a note from the first region, to then temporarily store the note in a clipboard, and to then paste the note to the second region. Thus, the notes of the note program 318 can be moved much more simply than are the notes of other note programs.

Accordingly, the display 600, which may, for example, be presented on a viewing screen of a monitor of the display terminals 304, may contain regions such as a first window 602, a second window 604, and a desktop 606. The first and second windows 602 and 604 may appear in the display 600 as a result of execution of one or more of the application programs 316, and the desktop 606 may appear in the display 600 as a result of execution of the operating system 314. A note 608, which initially resides at a first location on the desktop 606 of the display 600, is moved directly from this first location on the desktop 606 to a document 610 in the first window 602. The note 608 may then be moved directly from the document 610 in the first window 602 to a document 612 in the second window 604. The note 608 may then be moved directly from the document 612 in the second window 604 to a second location on the desktop 606.

Since pre-existing notes can obscure potential attachment sites for a note being created or moved, all other visible notes may be changed to just outlines as soon as a selected note is in a moving state. Thus, anything under the note outlines becomes visible. Alternatively, only those notes under, or in the vicinity of, a moving cursor are changed to outline form only. A further alternative is to make either all notes, or the notes under a moving cursor, entirely transparent or translucent when any note is in a moving state so that a computer user can see through the non-moving notes to the material below.

Figure 7:
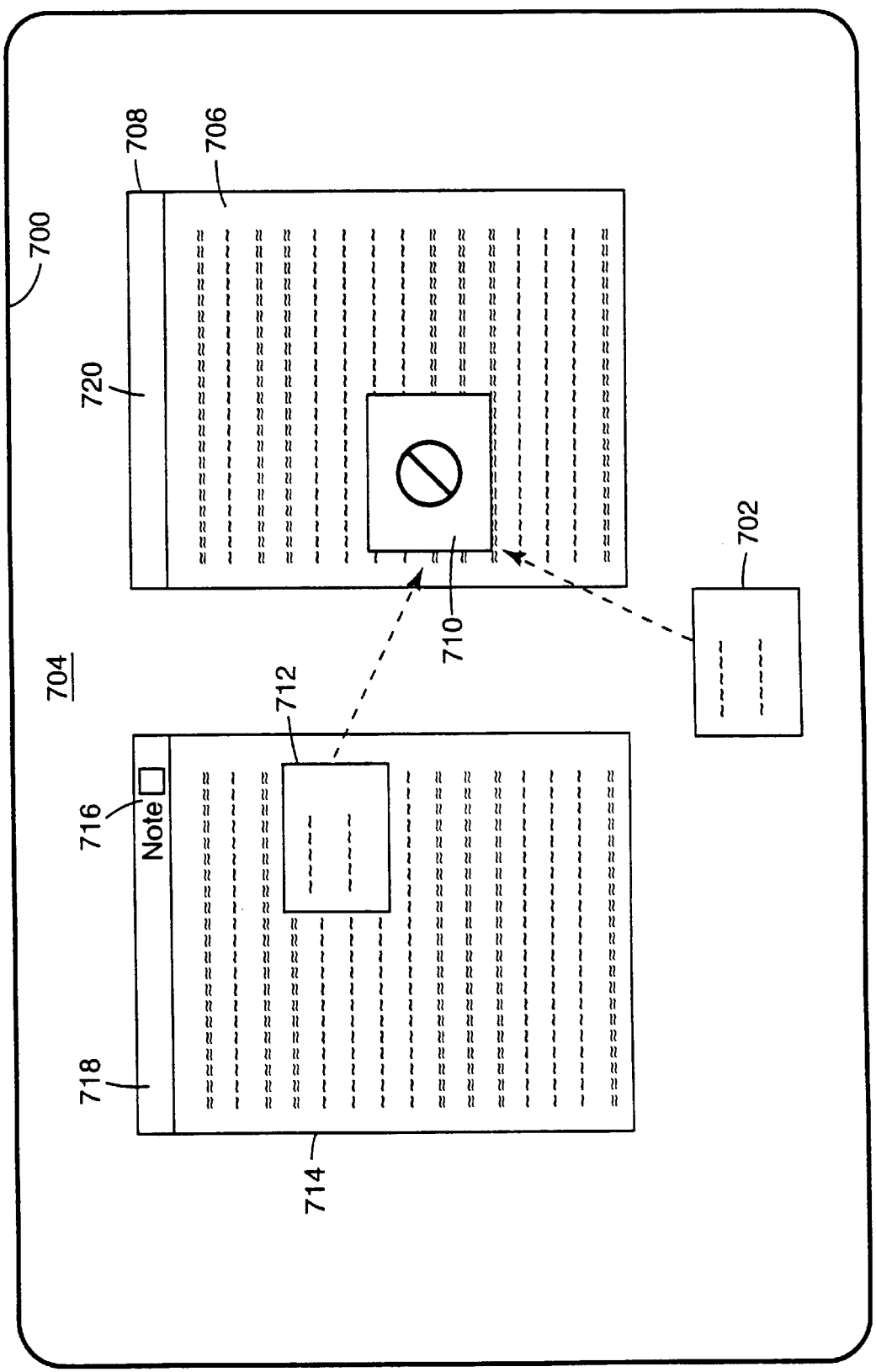
FIG. 7 is a representation of a screen display showing a note being moved to an illegal attachment site, such as a non-compliant window.

As shown by a display 700 in FIG. 7, a note can be moved only to a legal attachment site, e.g. a region of a viewing screen under control of a program which is compliant with the note program 318. A note 702 is currently attached to a compliant desktop 704, i.e. a desktop which results from execution of a program, such as the operating system 314, which is compliant with the note program 318. The note 702 cannot be moved to a document 706 contained within a noncompliant window 708, i.e. a window which results from execution of a program, such as one of the application programs 316, which is not compliant with the note program 318. An application program, or an operating system, is compliant with the note program 318 if the application program, or operating system, is interfaced with the note program 318. Similarly, an application program, or an operating system, is not compliant with the note program 318 if the application program, or operating system, is not interfaced with the note program 318. Moreover, certain windows, or even certain sections of windows, may be noncompliant with the note program 318 even though these windows, sections on windows, are displayed as a result of the execution of programs which are compliant with the note program 318.

If an attempt is made to move the note 702 to the noncompliant window 708, an immediate feedback may be provided to the computer user that the program controlling the noncompliant window 708 will not, and cannot, accept the note 702 from the note program 318. This feedback may be provided by changing the cursor to a symbol, such as a symbol 710, which appears whenever the note 702 is dragged over a noncompliant region. Alternatively, this feedback may be provided simply by the disappearance of the note 702 from the noncompliant window 708 and the reappearance of the note 702 at its original location when the cursor moving the note 702 over the noncompliant window 708 is released. Moreover, instead of providing a visual feedback of an attempt to attach a note to an illegal attachment site, such as the noncompliant window 708, an auditory feedback, such as a beep or continuous sound, may be provided when the note is over the illegal attachment site. Another alternative is for the outline of the note, which appears while the note is being moved, to simply zoom back to its original location when an attempt is made to attach the note to an illegal attachment site.

Also, a note 712 is currently attached to a compliant window 714, i.e. a window which results from a program, such as one of the application programs 316, which is compliant with the note program 318. The note 712 cannot be moved to the document 706 contained within the noncompliant window 708. If an attempt is made to move the note 712 to the noncompliant window 708, an immediate feedback may be provided to the computer user that the program controlling the noncompliant window 708 will not, and cannot, accept the note 712.

Moreover, if the note program 318 is arranged so that a note dispenser 716, which may be similar to the note dispenser 513, appears in a title bar 718 of the compliant window 714, the computer user will understand that the compliant window 714 is a compliant window. On the other hand, if the note dispenser 716 appears in the title bar 718 of the compliant window 714 but a similar note dispenser does not appear in a title bar 720 of the noncompliant window 708, the computer user will understand that, while the compliant window 714 is a compliant window, the noncompliant window 708 is a noncompliant window.

Figure 8:
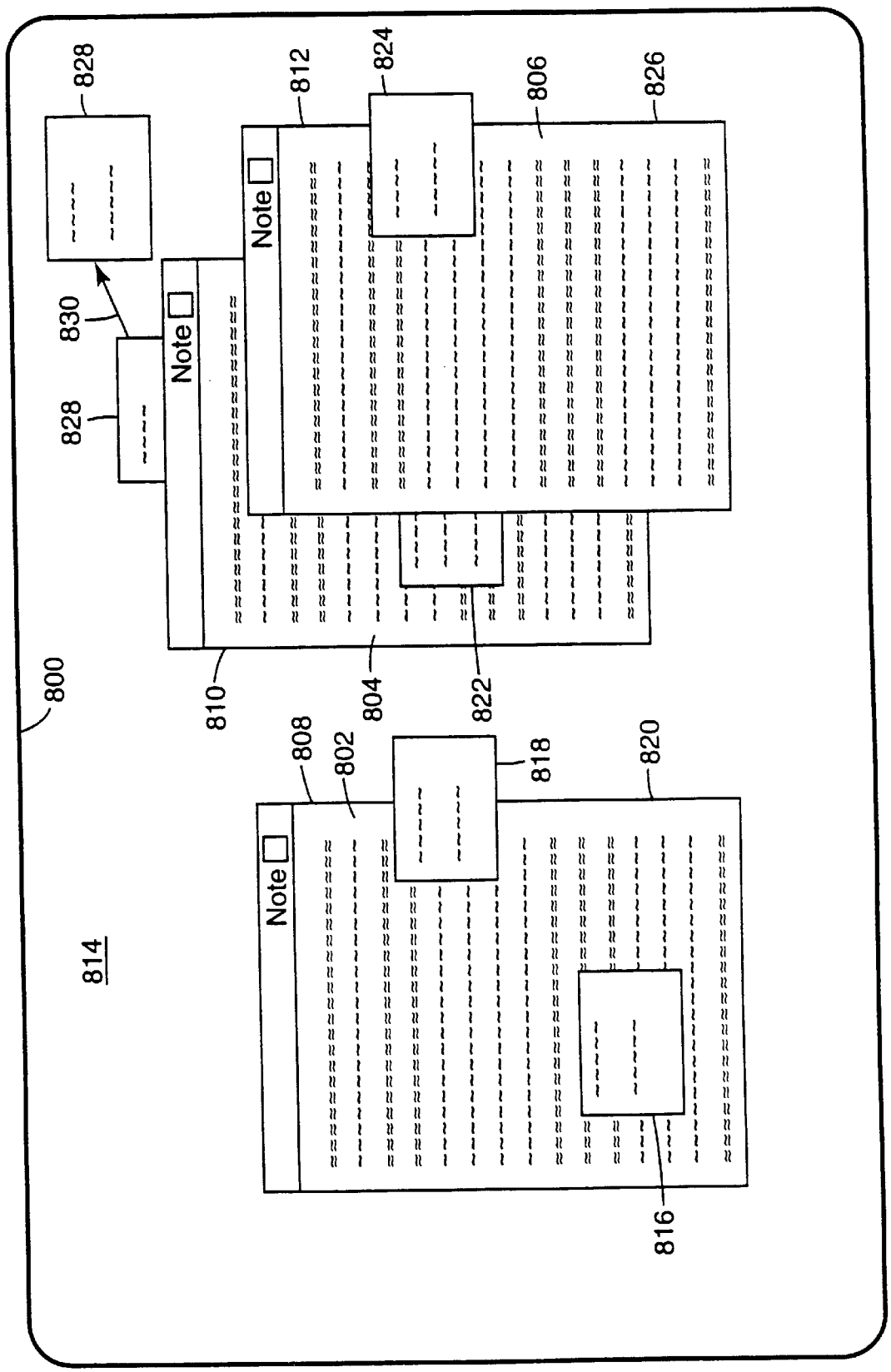
FIG. 8 is a representation of a screen display showing the effects of layering on notes.

As shown by a display 800 in FIG. 8, notes can be layered with windows. First, second, and third documents 802, 804, and 806 appear in corresponding first, second, and third windows 808, 810, and 812 as a result of execution of one or more application programs. The first, second, and third windows 808, 810, and 812 are shown on a desktop 814. The desktop 814 may appear on a monitor of the display terminals 304 as a result, for example, of execution of an operating system. The third window 812 is layered over a portion of the second window 810 so as to occlude a portion of the second document 804.

A first note 816 is attached to the first document 802 and is fully within the first window 808. A second note 818 is attached to the first document 802 but overlaps a right-hand edge 820 of a boundary of the first window 808. A third note 822 is attached to the second document 804 and is fully within the second window 810. A fourth note 824 is attached to the third document 806 but overlaps a right-hand edge 826 of a boundary of the third window 812. A fifth note 828 is attached to the desktop 814.

A note which is attached to a document appears as a layer over the document to which the note is attached. Thus, the content of the document underneath the note is occluded. Accordingly, for example, the first note 816 occludes that portion of the first document 802 which is underneath the first note 816. In order to access the information of the first document 802 underneath the first note 816, the first note 816 may be moved aside, or the options area of the first note 816, such as the options area 104 of the note 100, may be activated to reveal the hide/show option such that the hide option may be selected in order to hide the first note 816. Alternatively, a cursor may be activated over the grab area of the first note 816 in order to make the first note 816 invisible or translucent except for its outline, or in order to make the first note 816 entirely invisible or translucent.

As shown in FIG. 8, a portion of the fifth note 828 is layered under the second window 810. Thus, a portion of the fifth note 828 is obscured by the second window 810. The fifth note 828 can be grabbed and dragged, as shown by an arrow 830, to a location on the desktop 814 where the fifth note 828 is fully visible. (The fifth note 828 also can be grabbed and dragged from its location where it is partially obscured by the second window 810 to locations on any of the first, second, and/or third windows 808, 810, and 812.)

The layering of notes is affected by the layering of windows. Thus, since the third window 812 is layered over the second window 810, the third window 812 is also layered over any notes which are attached to the second window 810 and which are underneath the third window 812. As shown in FIG. 8, the third window 812 is layered over the third note 822. Accordingly, that portion of the third note 822 which is underneath the third window 812 is occluded by the third window 812.

When there are several notes on one window, the layering of these notes upon each other is based preferably, but not necessarily, on the recency of creation, editing, or selection of notes. That is, the topmost note of a plurality of layered notes is the note which was most recently created, edited, or selected. Accordingly, the selection of a note for creation, editing, or moving moves the note to the top layer of the notes and pushes all other notes down.

A note is associated with its attachment window so that the note becomes active when its attachment window becomes active. Moreover, if a window in a plurality of layered windows changes layers, any notes attached to that window which changes layers move along with that window which changes layers.

Furthermore, when a note attached to an inactive window is selected, the inactive window becomes active. In addition to the inactive window becoming active, if the selected note is among a plurality of layered notes on this window, the selected note moves to the top layer of the plurality of layered notes if the selected note is below the topmost note of the plurality of layered notes. (Alternatively, if the selected note is below the topmost note of a plurality of layered notes, the selected note need not move to the top layer of notes.)

A note can be moved to a window without affecting the existing layer of that window and without changing the active/inactive state of that window; however, as an alternative, the window may change its layer or state if a note is attached to it.

Figure 9:
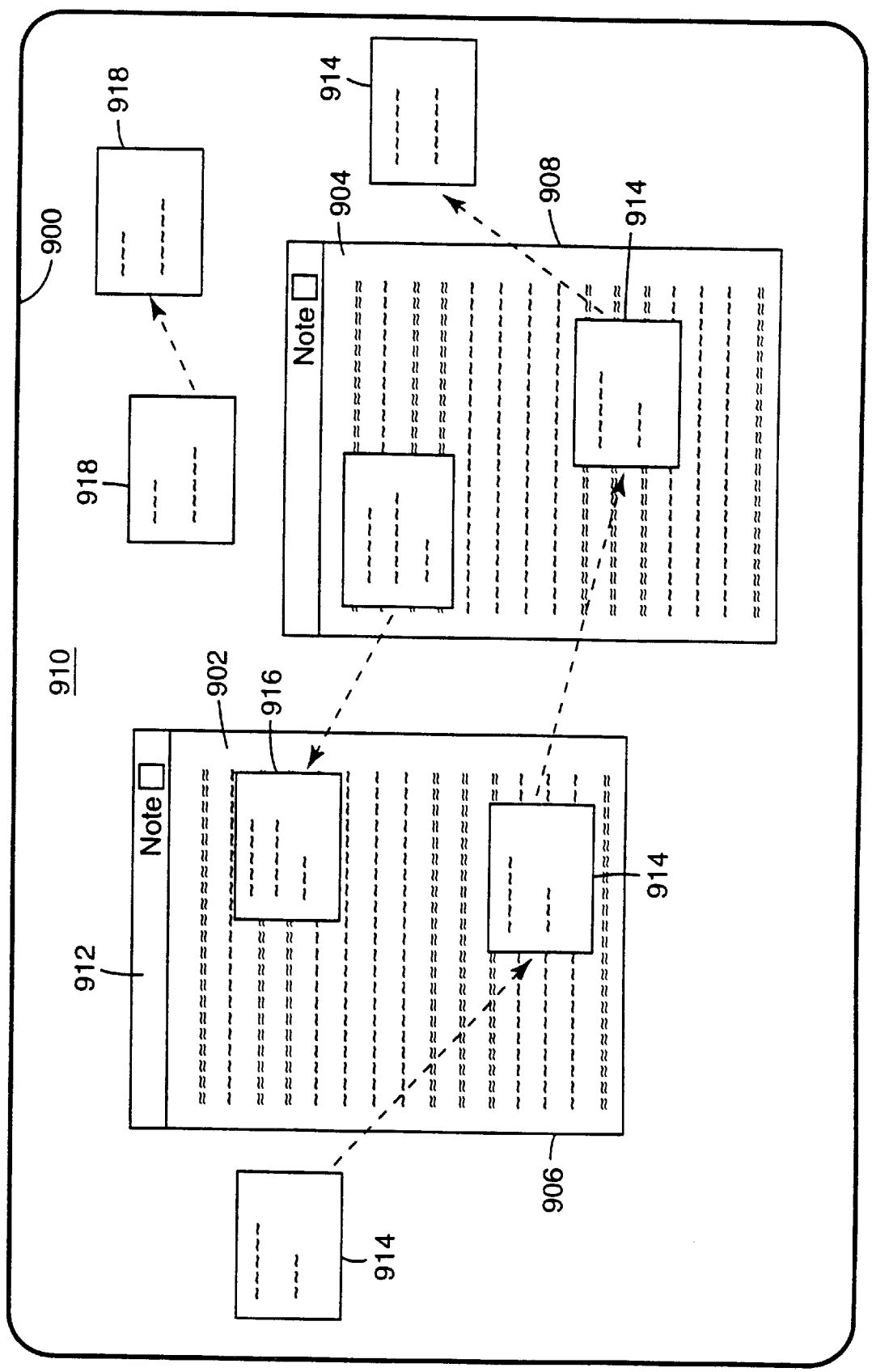
FIG. 9 is a representation of a screen display showing note movement between active and inactive windows.

As shown by a display 900 in FIG. 9, notes may be moved between active and inactive windows appearing, for example, on the viewing screen of a monitor of the display terminals 304 of the data processing system 300. A first document 902 and a second document 904 appear in corresponding active and inactive windows 906 and 908 on a desktop 910. For example, the active and inactive windows 906 and 908 appear as the result of the execution of one or more application programs, and the desktop 910 appears as the result of execution of an operating system. As depicted in FIG. 9, active windows are displayed as active. As one possible example, shading, such as the shading of a title bar 912 of the active window 906, may be used to indicate that a window or a note is active.

A first note 914, which is originally inactive and which is originally attached to the desktop 910 at a first location, is moved to the active window 906, then to the inactive window 908, and finally back to the desktop 910 at a second location.

When a note is attached to an active window, the note becomes active if it was previously inactive, or remains active if it was previously active. When a note is attached to an inactive window, the note becomes inactive if it was previously active, or remains inactive if it was previously inactive. Thus, when the first note 914 is attached to the active window 906, the first note 914 becomes active, and when the first note 914 is attached to the inactive window 908, the first note 914 becomes inactive. When the first note 914, which is inactive on the inactive window 908, is reattached to the desktop 910, the first note 914 remains inactive.

A second note 916 is originally inactive because it is attached to the inactive window 908. When the second note 916 is moved to the active window 906, the second note 916 becomes active. A third note 918, which is inactive and which is originally attached to a third location of the desktop 910, is moved to a fourth location on the desktop 910 where the third note 918 remains inactive.

Figure 10:
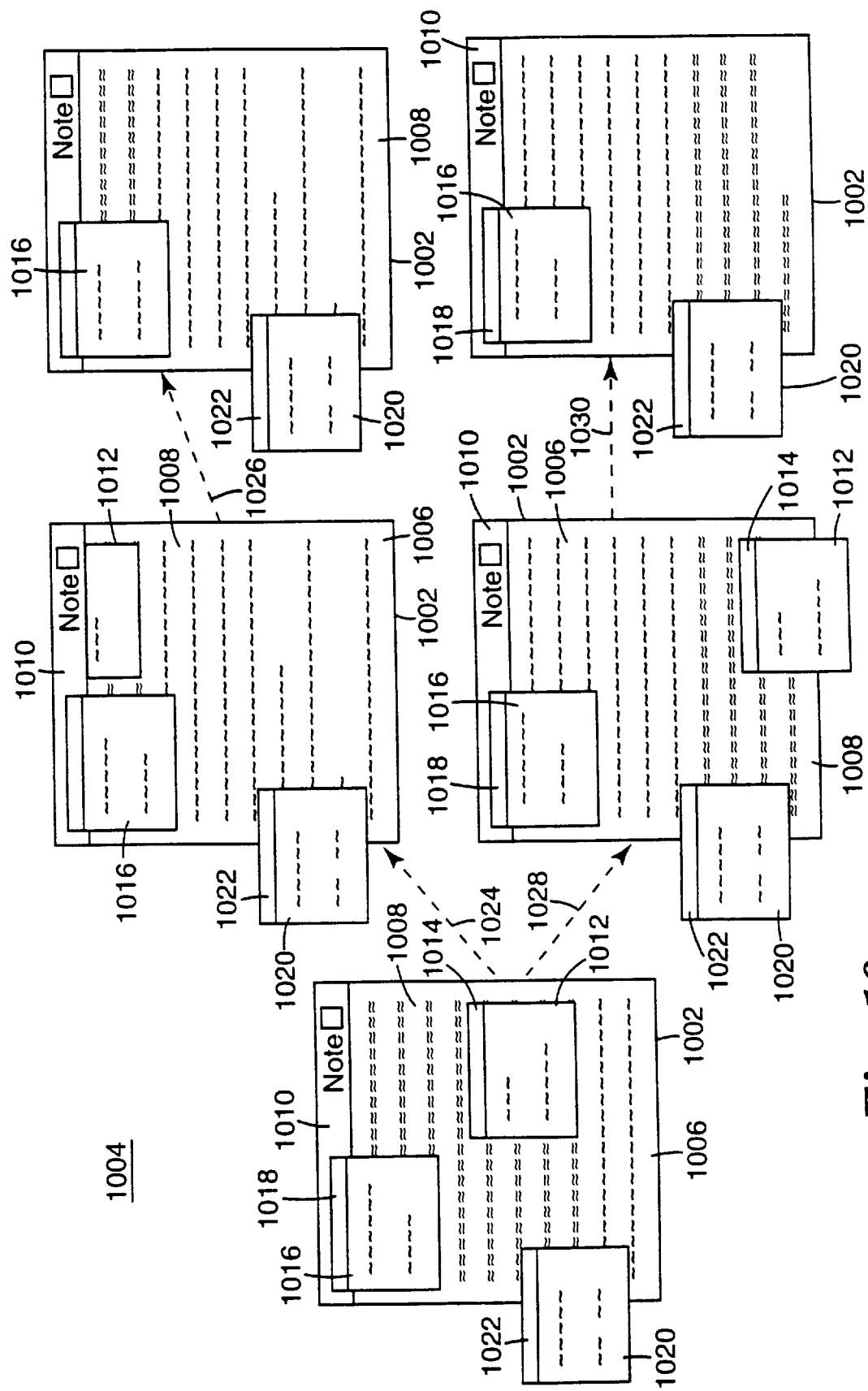
FIG. 10 shows the effects of scrolling a window having notes attached thereto.

As shown in FIG. 10, notes may, or may not, move with the scrolling contents of windows appearing, for example, on a viewing screen of a monitor of the display terminals 304 of the data processing system 300. A window 1002 appears on a desktop 1004. As is typical of windows, the window 1002 has a first portion 1006, which may contain a document 1008, and a second portion 1010, which may contain a title bar or any other graphical region. The document 1008 within the first portion 1006 may be scrolled.

The first portion 1006 of the window 1002 may have one or more fixed note sections and one or more moving note sections. Accordingly, if a note is attached to one of these fixed note sections, this note does not move as the document 1008 within the first portion 1006 is scrolled; however, if a note is attached to one of these moving note sections, this note does move with the document 1008 within the first portion 1006 as the document 1008 is scrolled.

Similarly, although the contents of the second portion 1010 generally are nonscrollable, the second portion 1010 of the window 1002 may have one or more fixed note sections and one or more moving note sections. Accordingly, if a note is attached to one of these fixed note sections, this note does not move as the document 1008 within the first portion 1006 is scrolled; however, if a note is attached to one of these moving note sections, this note does move as the document 1008 within the first portion 1006 is scrolled.

It should also be understood that, even though a note is attached to a fixed note section of the window 1002, the note will move as the contents within the window 1002 are scrolled if the moving state of the note's nonmove option is selected, and that, even though a note is attached to a moving note section of the window 1002, the note will not move as the contents of the window 1002 are scrolled if the non-moving state of the note's nonmove option is selected.

These actions of a note are illustrated by FIG. 10 wherein a first note 1012, having a grab area 1014, is attached to the document 1008 within the first portion 1006 of the window 1002, a second note 1016, having a grab area 1018, is attached to the second portion 1010 of the window 1002, and a third note 1020, having a grab area 1022, is attached to the document 1008 within the first portion 1006 of the window 1002. One of the features of the preferred embodiment of the present invention is that, as long as any part of a predetermined area of a note, preferably the grab area, overlies a visible portion of a document in a window, the entire note is visible. Thus, as long as the grab area 1014 of the first note 1012 overlies a part of the document 1008 which is within the first portion 1006 of the window 1002, the entire first note 1012 is visible, and as long as the grab area 1022 of the third note 1020 overlies a part of the document 1008 which is within the first portion 1006 of the window 1002, the entire first note 1020 is visible.

A note which is attached to a moving note section of a window moves with the scrollable contents of the window, and a note which is attached to a fixed note section of a window does not move with the scrollable contents of the window. Thus, as shown by the window 1002 at the end of an arrow 1024, since the first note 1012 is attached to a moving note section of the first portion 1006 of the window 1002, the first note 1012 moves up with the document 1008 as the document 1008 within the first portion 1006 of the window 1002 is scrolled up. The second note 1016, which is attached to a fixed note section of the second portion 1010 of the window 1002, does not move up as the document 1008 within the first portion 1006 of the window 1002 is scrolled up. And, since the third note 1020 is attached to a fixed note section of the first portion 1006 of the window 1002, the third note 1020 does not move up with the document 1008 as the document 1008 within the first portion 1006 of the window 1002 is scrolled up.

Moreover, since no part of the grab area 1014 of the first note 1012 now overlies a part of the document 1008 which is within the first portion 1006 of the window 1002, a portion of the first note 1012, commensurate with that part of the document 1008 which underlies the first note 1012 and which is no longer within the first portion 1006 of the window 1002, is also not visible.

Finally, as shown by the window 1002 at the end of an arrow 1026, no part of the first note 1012 is visible since the document 1008 within the first portion 1006 of the window 1002 has been scrolled up sufficiently that none of the document 1008 underlying the first note 1012 is within the first portion 1006 of the window 1002. However, since the second note 1016, which is attached to a fixed note section of the second portion 1010 of the window 1002, does not move up as the document 1008 within the first portion 1006 of the window 1002 is scrolled up, all of the second note 1016 is still visible; and, since the third note 1020, which is attached to a fixed note section of the first portion 1006 of the window 1002, does not move up as the document 1008 within the first portion 1006 of the window 1002 is scrolled up, all of the third note 1020 is still visible.

On the other hand, as shown by the window 1002 at the end of an arrow 1028, since the first note 1012 is attached to a moving note section of the first portion 1006 of the window 1002, the first note 1012 moves down as the document 1008 within the first portion 1006 of the window 1002 is scrolled down. However, the second note 1016, which is attached to a fixed note section of the second portion 1010 of the window 1002, does not move down as the document 1008 within the first portion 1006 of the window 1002 is scrolled down, and the third note 1020, which is attached to a fixed note section of the first portion 1006 of the window 1002, does not move down as the document 1008 within the first portion 1006 of the window 1002 is scrolled down.

Moreover, since the grab area 1014 of the first note 1012 still overlies a part of the document 1008 which is within the first portion 1006 of the window 1002, all of the first note 1012 is visible.

Finally, as shown by the window 1002 at the end of an arrow 1030, no part of the first note 1012 is visible since the document 1008 within the first portion 1006 of the window 1002 has been scrolled down sufficiently that none of the document 1008 underlying the first note 1012 is within the first portion 1006 of the window 1002. However, since the second note 1016, which is attached to a fixed note section of the second portion 1010 of the window 1002, does not move down as the document 1008 within the first portion 1006 of the window 1002 is scrolled down, all of the second note 1016 is still visible; and since the third note 1020, which is attached to a fixed note section of the first portion 1006 of the window 1002, does not move down as the document 1008 within the first portion 1006 of the window 1002 is scrolled down, all of the third note 1020 is still visible.

A note, which has been scrolled out of a window, returns to view whenever any part of the document underlying the note is scrolled back into the window, provided that, whenever any part of the grab area of the note reappears in the window, the entire note is made visible.

Figure 11:
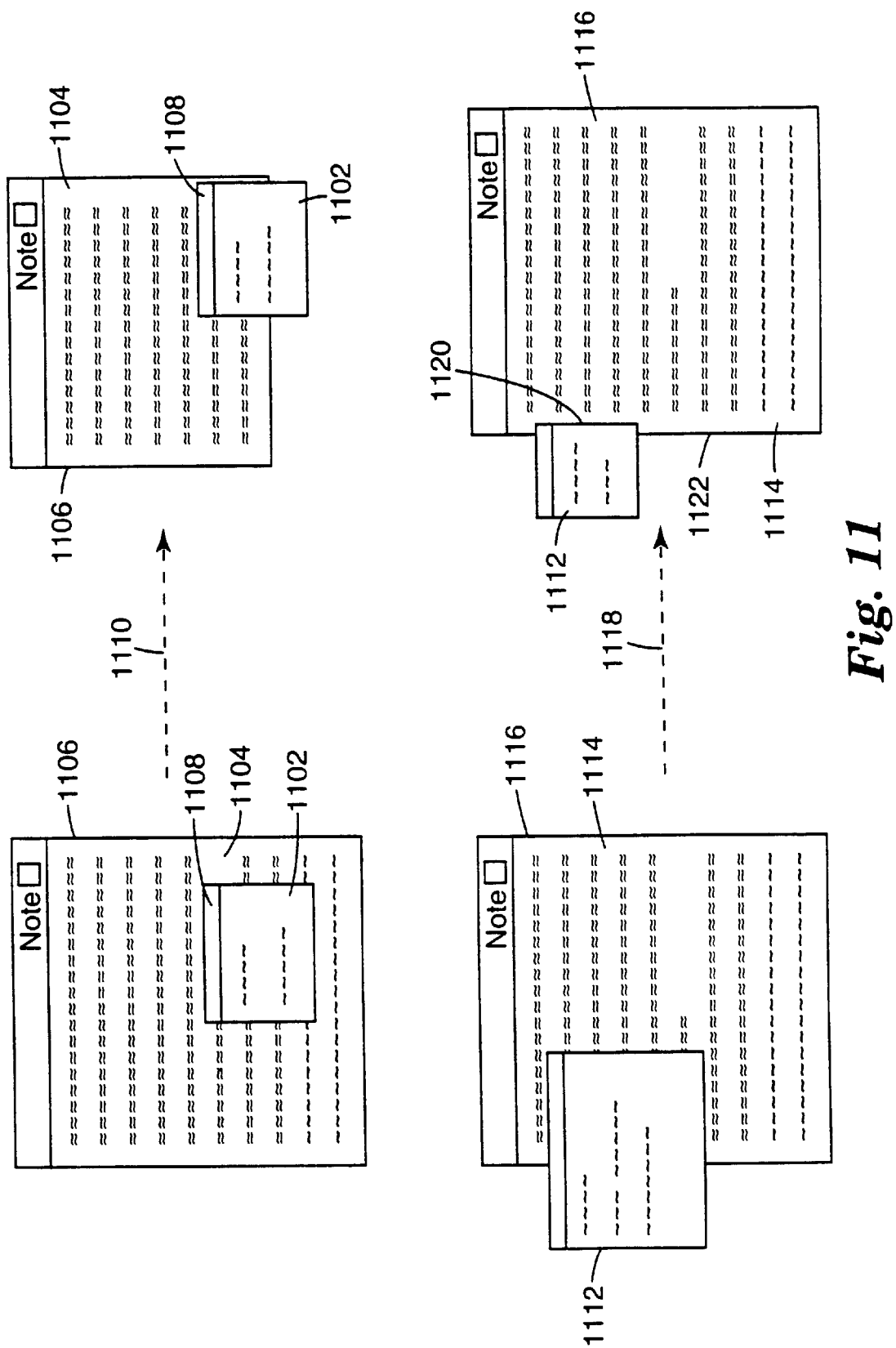
FIG. 11 shows the effects of resizing a note and resizing a window.

As shown in FIG. 11, windows may be resized without affecting the size of a note, and a note may be resized without affecting the size of a window. As a window is resized, any note attached to it remains attached to its attachment site on the window. Preferably, the note cannot be detached from a window, or from a document within a window, due to resizing of the window.

As shown in FIG. 11, a first note 1102 is attached to a first document 1104 within a first window 1106. The first note 1102 has a grab area 1108 therein. As shown at the end of an arrow 1110, the first window 1106 has been resized by using, for example, standard window resizing techniques. As a result of the resizing of the first window 1106, a portion of the first document 1104 is removed from the visible portion of the first window 1106. The first note 1102, which is attached to the first document 1104, remains attached to the same attachment site in the first document 1104 even as the first window 1106 is resized. However, as shown in FIG. 11, since the first window 1106 is much smaller after resizing, the first note 1102, which retains its same size, overlaps the bottom edge of the boundary of the first window 1106. Also, because at least a portion of the grab area 1108 of the first note 1102 remains within the first window 1106, the entire first note 1102 is visible. If the first window 1106 were resized so that the grab area 1108 is no longer visible, only that part of the first note 1102 which overlies the part of the first document 1104 which remains within the first window 1106 is visible.

A second note 1112 is attached to a second document 1114 within a second window 1116. As shown at the end of an arrow 1118, the second note 1112, but not the second window 1116, has been resized. In accordance with the preferred embodiment of the present invention, the second note 1112 cannot be resized so that it is no longer attached to the second window 1116. Thus, as the second note 1112 is resized, for example, from its right lower corner, there is a limit placed on the resizing operation to prevent the second note 1112 from being resized off of the second window 1116, e.g. so that a right-hand edge 1120 of the second note 1112 is prevented from being moved across a left-hand edge 1122 of a boundary of the second window 1116.

Figure 12:
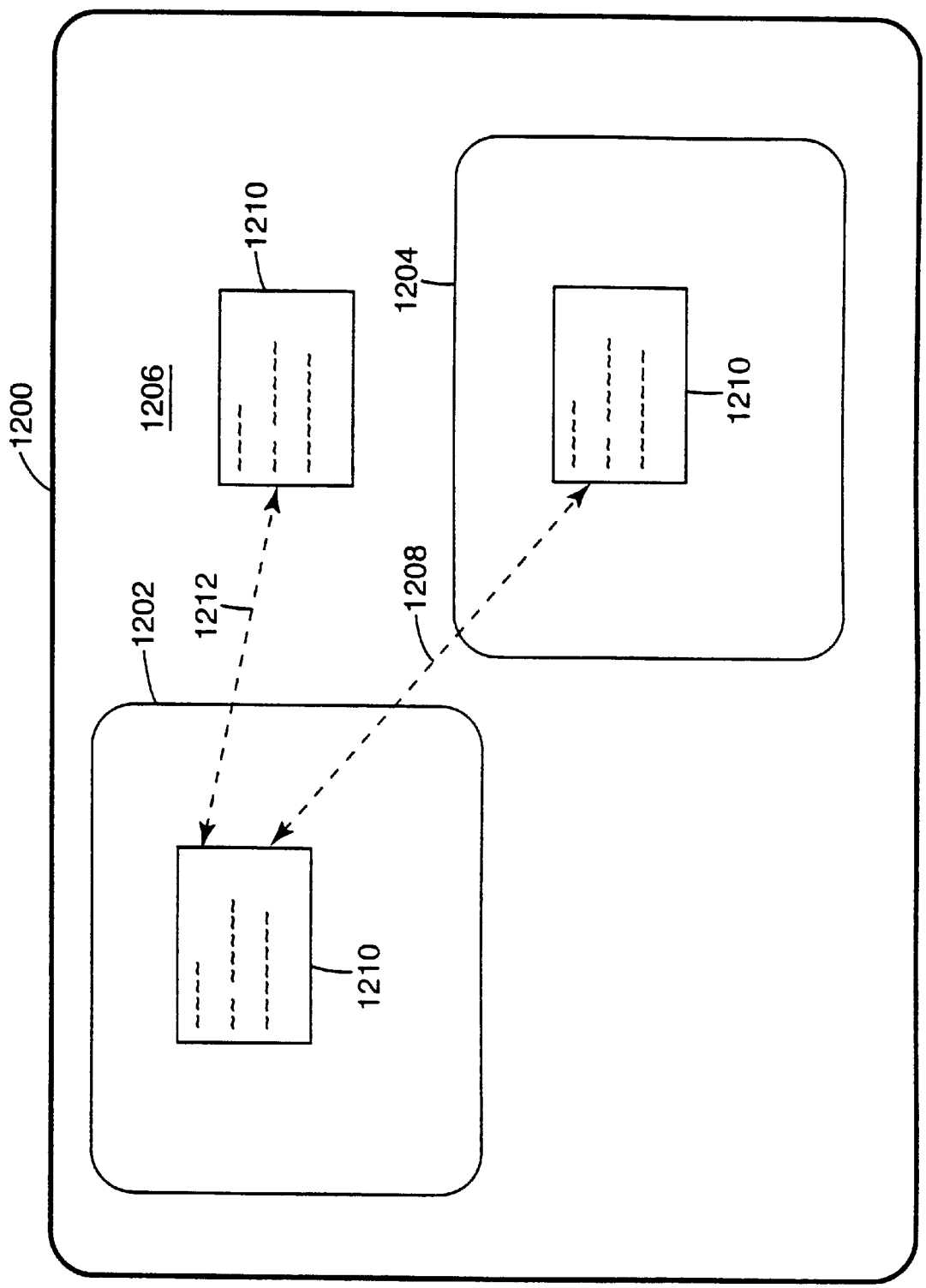
FIG. 12 is a representation of a screen display showing movement of a note between desktops.

As shown by a display 1200 in FIG. 12, notes may be moved between desktops since, with current computer technology, multiple desktops may be simultaneously displayed on one or more monitors of the data processing system 300. As shown in FIG. 12, the display 1200 includes a first desktop 1202, a second desktop 1204, and a third desktop 1206. For example, the first desktop 1202 may be included within the display 1200 in response to execution of a first operating system, the second desktop 1204 may be included within the display 1200 in response to execution of a second operating system, and the third desktop 1206 may be included within the display 1200 in response to execution of a third operating system. Alternatively, the first, second, and third desktops 1202, 1204, and 1206 may be included within the display 1200 in response to execution of a single operating system, or in response to execution of any combination of operating systems.

As indicated by an arrow 1208, a note 1210 may be moved between the first and second desktops 1202 and 1204 as long as the operating system(s), the execution of which results in the first and second desktops 1202 and 1204, is/are compliant with the note program 318. As indicated by an arrow 1212, the note 1210 may also be moved between the first and third desktops 1202 and 1206 as long as the operating system(s), the execution of which results in the first and third desktops 1202 and 1206, is/are compliant with the note program 318. The note 1210 may also be moved between the second and third desktops 1204 and 1206 as long as the operating system(s), the execution of which results in the second and third desktops 1204 and 1206, is/are compliant with the note program 318. (The third desktop 1206 may be a simple backdrop instead of a desktop.)

Figure 13:
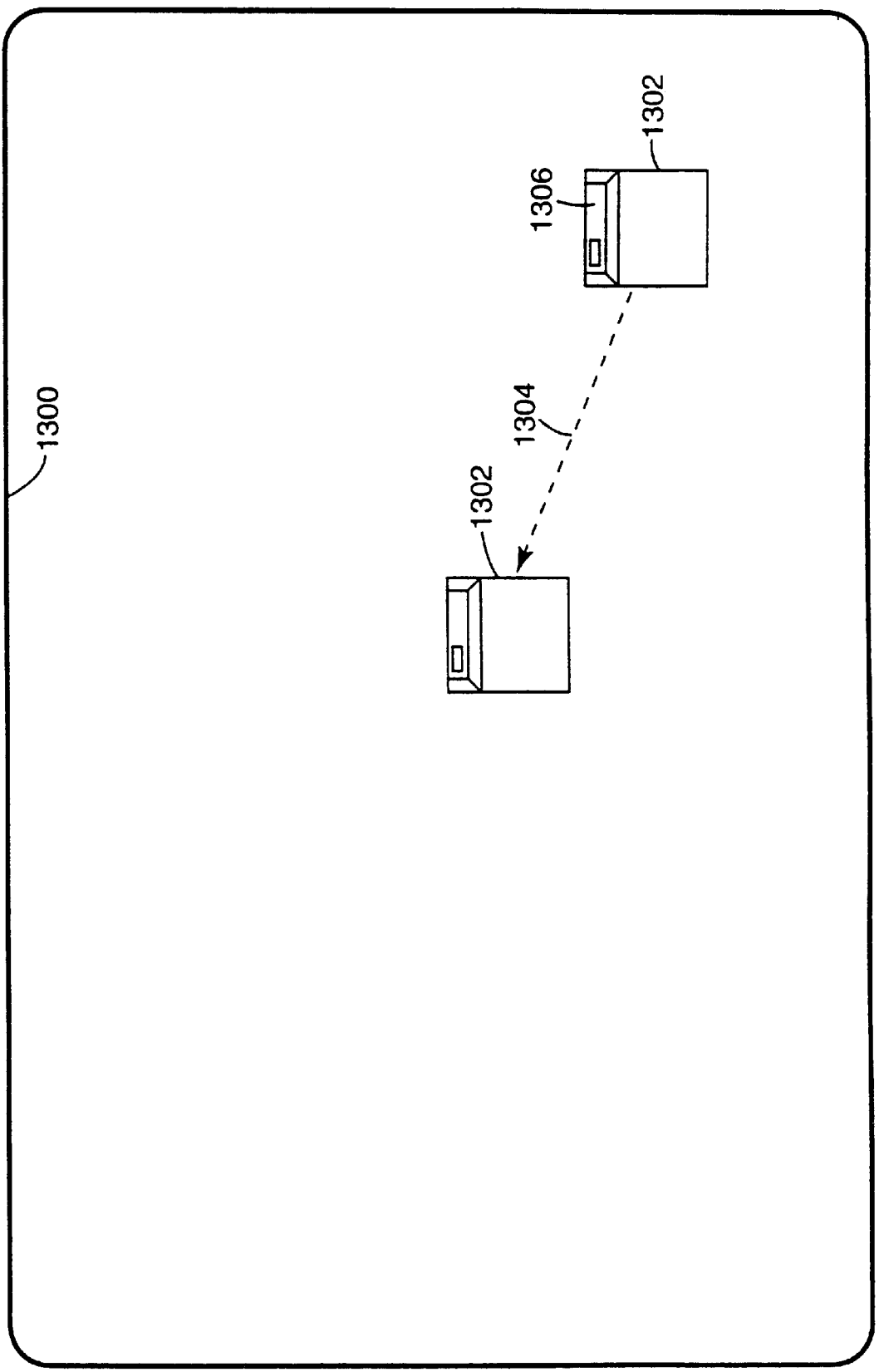
FIG. 13 is a representation of a screen display showing the repositioning of a desktop note dispenser.

As shown in FIG. 13, a display 1300 includes a note dispenser 1302 located at a first location within the display 1300. As shown by an arrow 1304, the note dispenser 1302 may be repositioned to a second location within the display 1300. For example, the note dispenser 1302 may be repositioned by positioning a cursor over a grab area 1306 of the note dispenser 1302, by activating the cursor, by dragging the note dispenser 1302 from its first location to the second location, and by deactivating the cursor to attach the note dispenser 1302 to the second location.

Activating the cursor while the cursor is over the grab area 1306 causes an outline of the note dispenser 1302 to appear in the display 1300 while the note dispenser 1302 is being dragged to the second location. On deactivating the cursor, the note dispenser 1302 is removed from the first location and appears at the second location. Alternatively, the cursor may be activated and deactivated (such as by clicking a mouse) over the note dispenser 1302, and then reactivated and re-deactivated at the second location. A further alternative is to access a dispenser option from an options area of the note dispenser 1302 and to select a new-coordinate option in order to designate new coordinates for the note dispenser 1302.

The functions described above are executed by the data processing system 300 based upon the note program 318 according to the flow chart shown in FIGS. 14–41. It is to be understood that, although the note program 318 is shown in sequential flow chart form, the operations and tests described in connection therewith may be performed either sequentially or independently in parallel.

Figure 14:
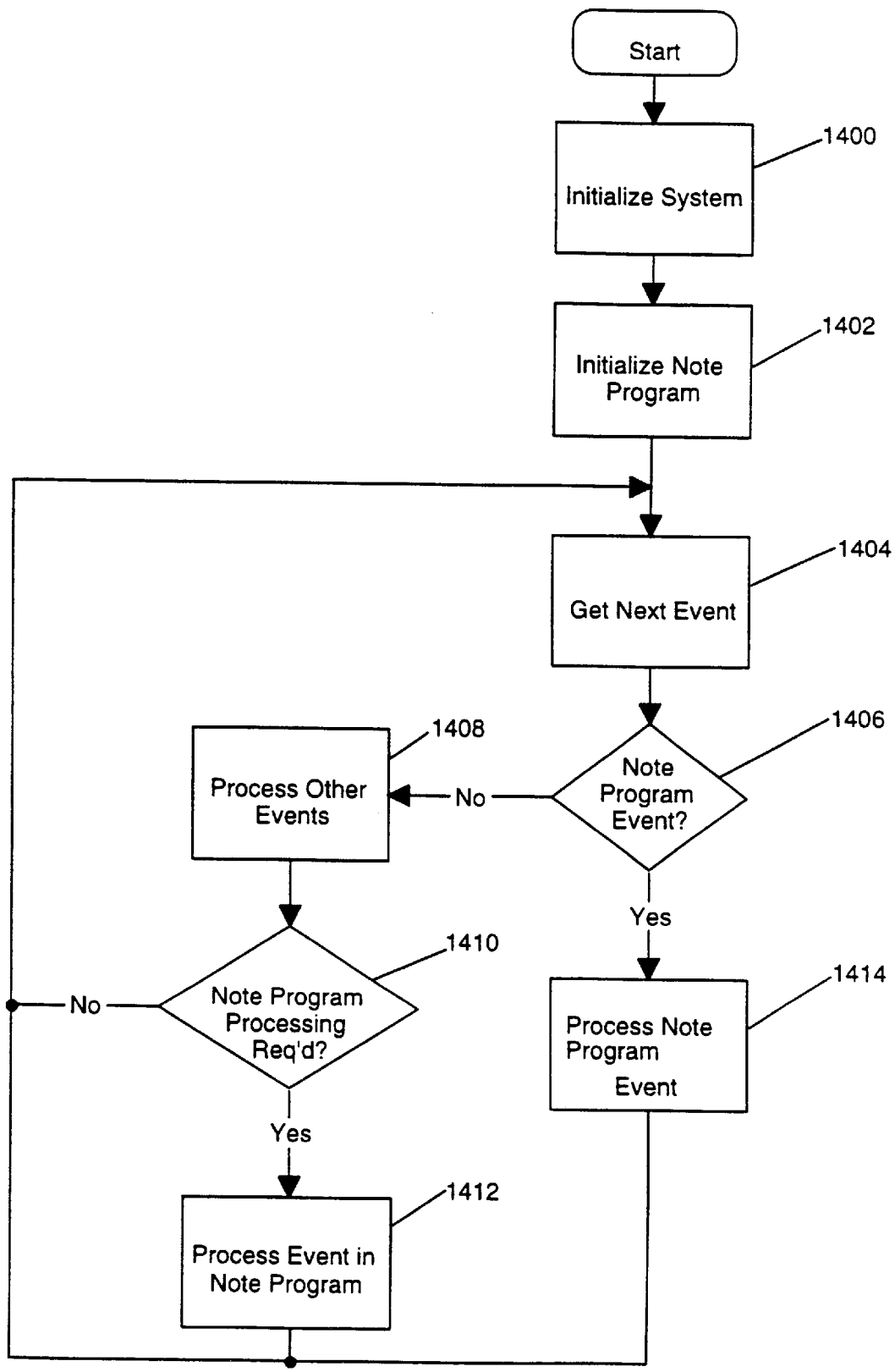
FIG. 14 is a top level flow diagram of the present invention.

As shown in FIG. 14, upon start up, a block 1400 of the program code of the data processing system 300 initializes the data processing system 300. As part of this initialization, a desktop is made to appear, for example, on a viewing screen of a monitor of the display terminals 304 of the data processing system 300. A block 1402 initializes the note program 318. The initialization of the note program 318 will be described more fully in connection with FIG. 15.

Once the block 1402 initializes the note program 318, the data processing system 300 waits for an event to be chosen by the computer user, as illustrated by a block 1404. If a block 1406 determines that the chosen event to be processed by the data processing system 300 is not a note program event (i.e., is not an event to be executed by the note program 318), the data processing system 300 processes the event as indicated by a block 1408. If a block 1410 determines that, as a result of processing of the event in accordance with one or more of the application programs 316, further processing of the event by the note program 318 is required, a block 1412 further processes the event. The block 1412 is shown in additional detail in FIG. 30.

Figure 16:
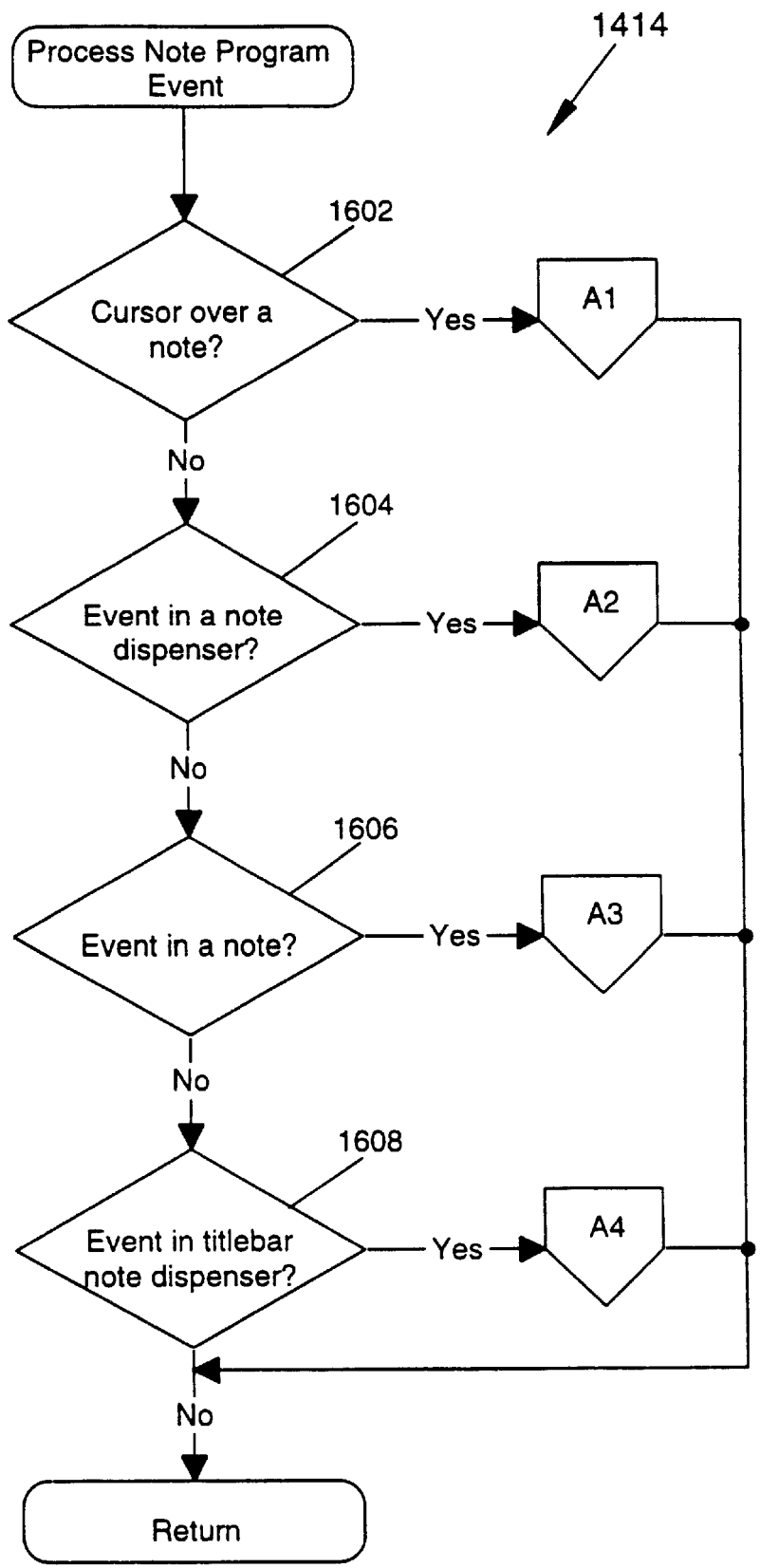
FIG. 16 is a flow chart showing the Process Note Program Event block of FIG. 14 in additional detail.

If the block 1406 determines that the event to be processed is a note program event, a block 1414 processes that note program event in a manner to be described more fully in connection with FIG. 16. If the block 1410 determines that further processing by the note program 318 is not required, or after the block 1412 further processes the event processed by the block 1408, or after the block 1414 processes a note program event, the program shown in FIG. 14 returns to the block 1404 in order to get, and process, the next event.

Figure 15:
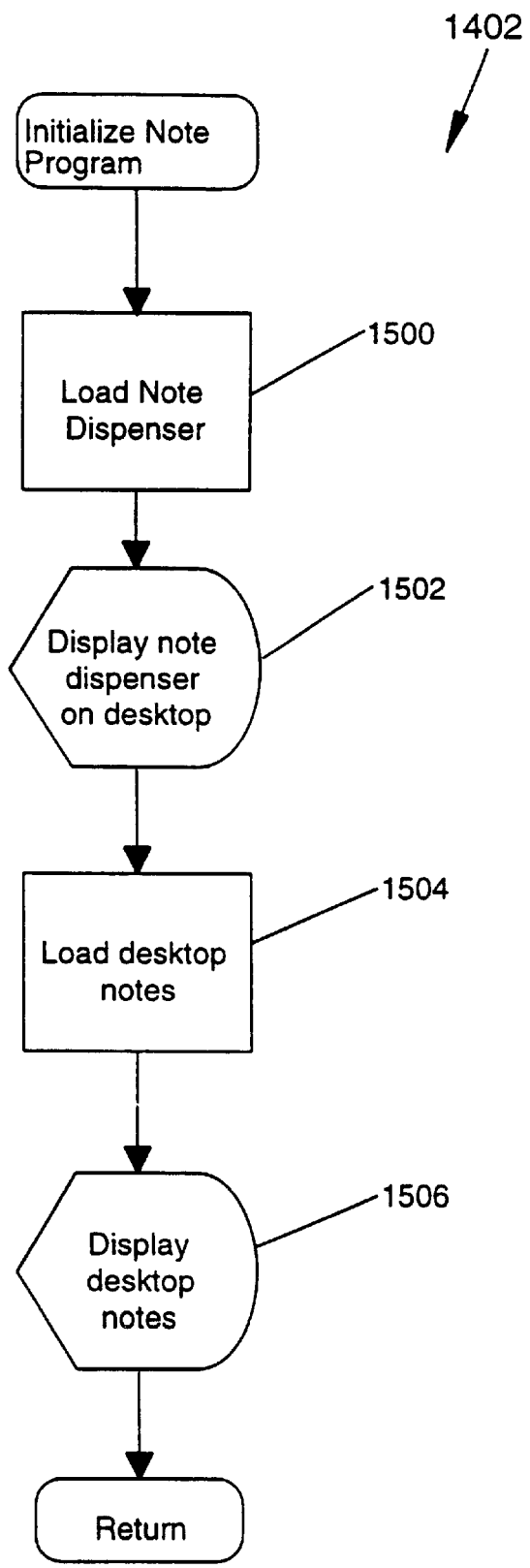
FIG. 15 is a flow chart showing the Initialize Note Program block of FIG. 14 in additional detail.

FIG. 15 shows the routine performed by the block 1402 of FIG. 14. As shown in FIG. 15, a block 1500 loads a note dispenser, such as the note dispenser 200, in a video display memory, and a block 1502 causes the note dispenser stored in the video display memory to appear on the desktop displayed by a monitor of the display terminals 304. Next, a block 1504 loads any desktop notes (i.e., those notes attached to the desktop), which were previously created by the note program 318 and stored at the operating system level, into the video display memory, and a block 1506 causes these desktop notes to be displayed by the monitor of the display terminals 304. The data processing system 300 returns to the block 1404 shown in FIG. 14.

Figure 17:
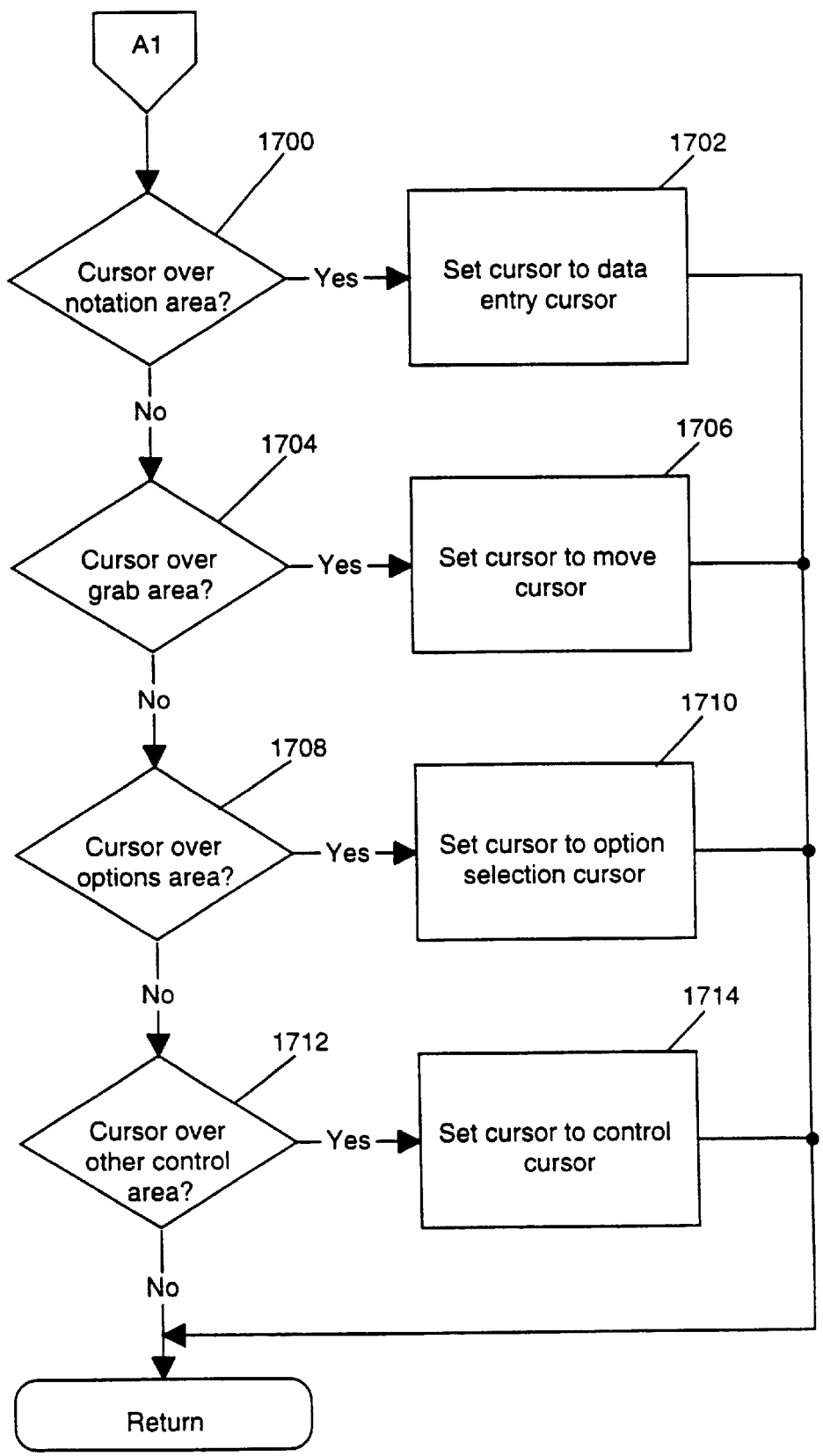
FIG. 17 is a flow chart showing the A1 subroutine of FIG. 16 in additional detail.

FIG. 16 shows how a note program event is processed according to the block 1414 of FIG. 14. As shown in FIG. 16, a block 1602 determines whether a cursor of the data processing system 300, as displayed by a monitor of the display terminals 304, is over a note. If the block 1602 determines that a cursor is over a note, such as the note 100, a subroutine A1 is executed by the data processing system 300 in order to change the character of the cursor, as appropriate. The subroutine A1 is shown in FIG. 17.

Figure 18:
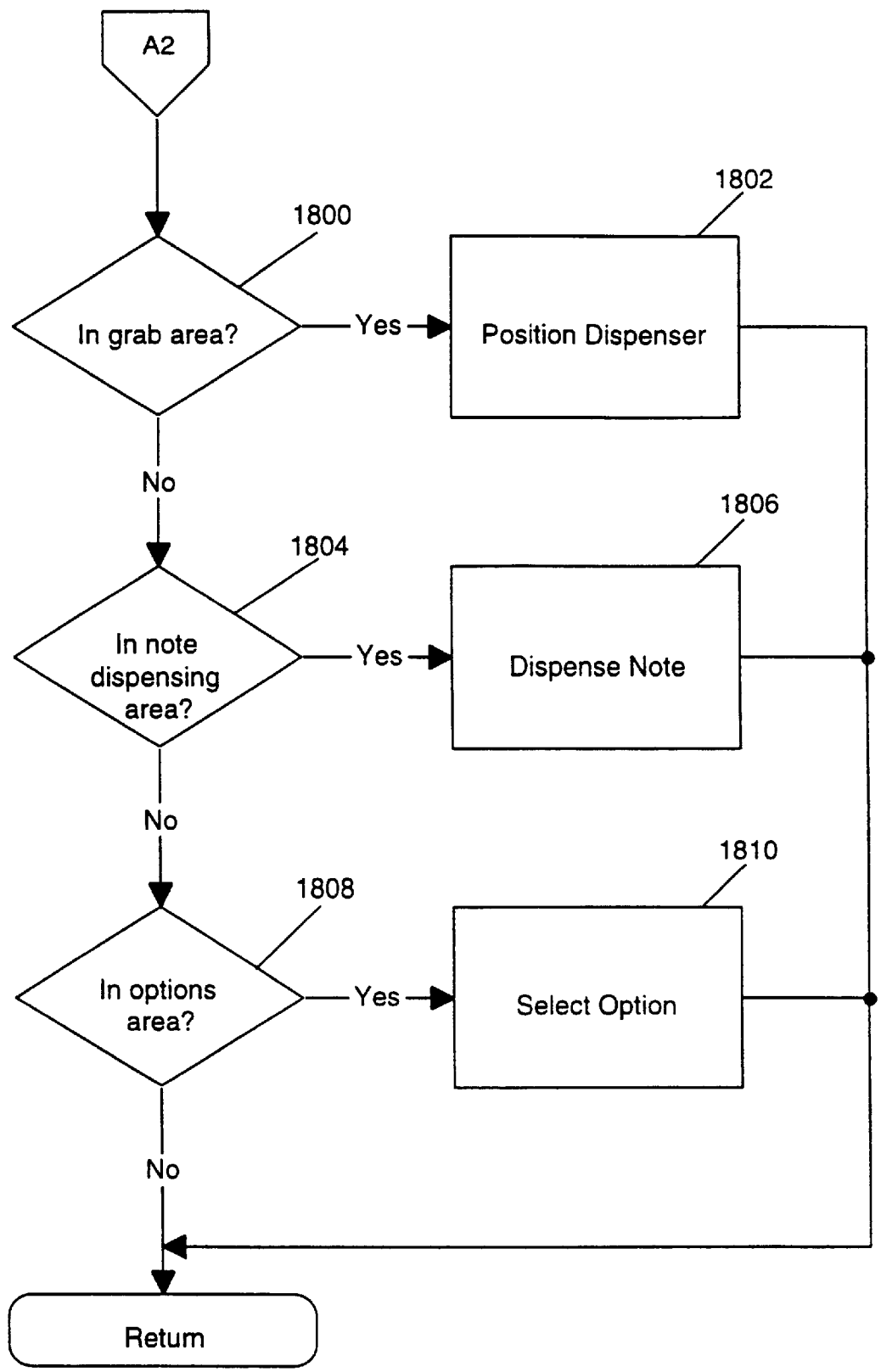
FIG. 18 is a flow chart showing the A2 subroutine of FIG. 16 in additional detail.

A block 1604 determines whether a desktop note dispenser event is selected by the computer user, such as by determining whether a changed cursor is activated while the changed cursor is over a desktop note dispenser. If the block 1604 determines that an event associated with a desktop note dispenser, such as the note dispenser 200, is to be processed, the subroutine A2 is executed by the data processing system 300. The subroutine A2 is shown in FIG. 18.

Figure 25:
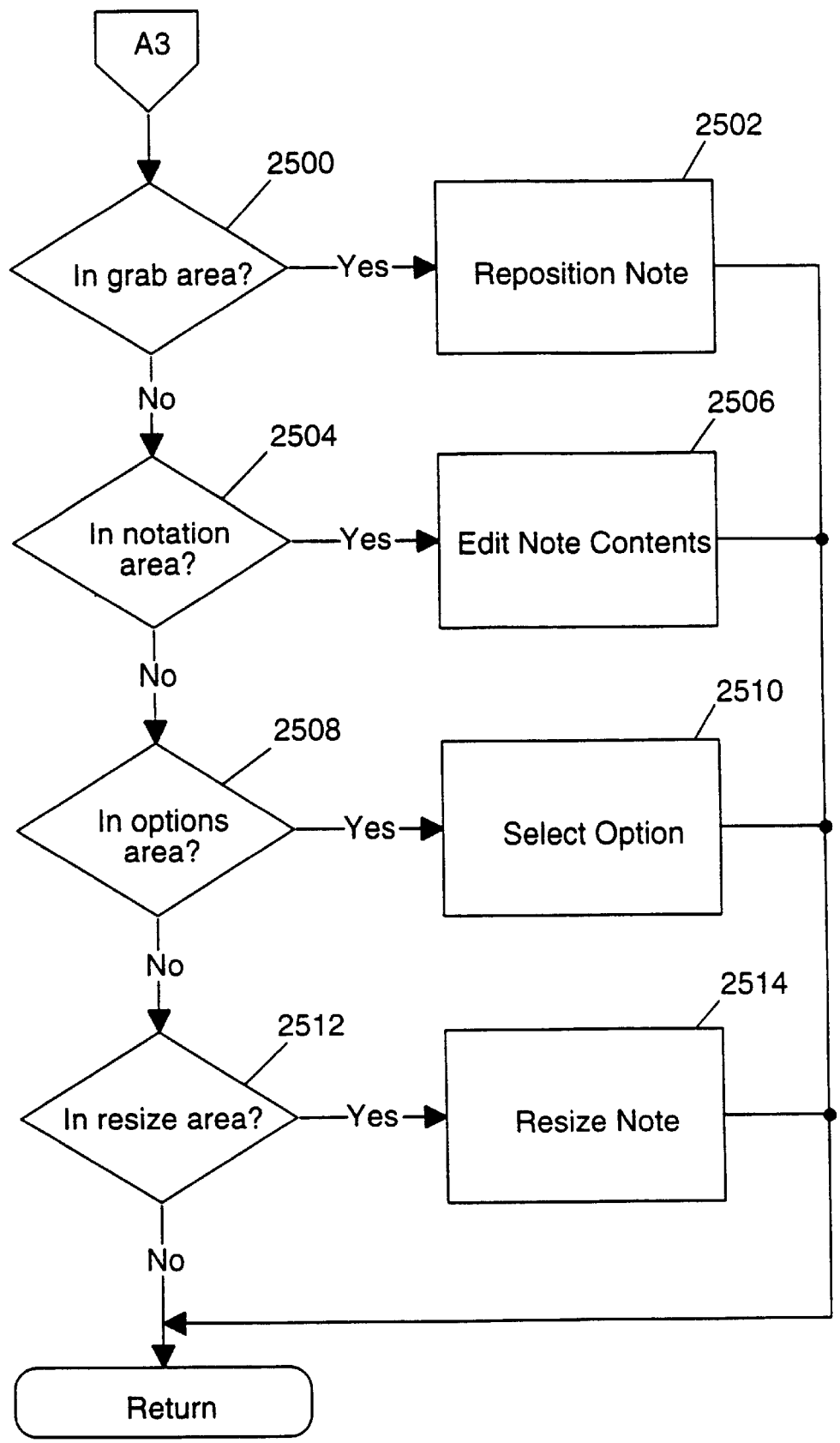
FIG. 25 is a flow chart showing the A3 subroutine of FIG. 16 in additional detail.

A block 1606 determines whether a note event is selected by the computer user, such as by determining whether a changed cursor is activated while the changed cursor is over a note. If a note event is selected, the subroutine A3 is executed by the data processing system 300. The subroutine A3 is shown in FIG. 25.

Figure 29:
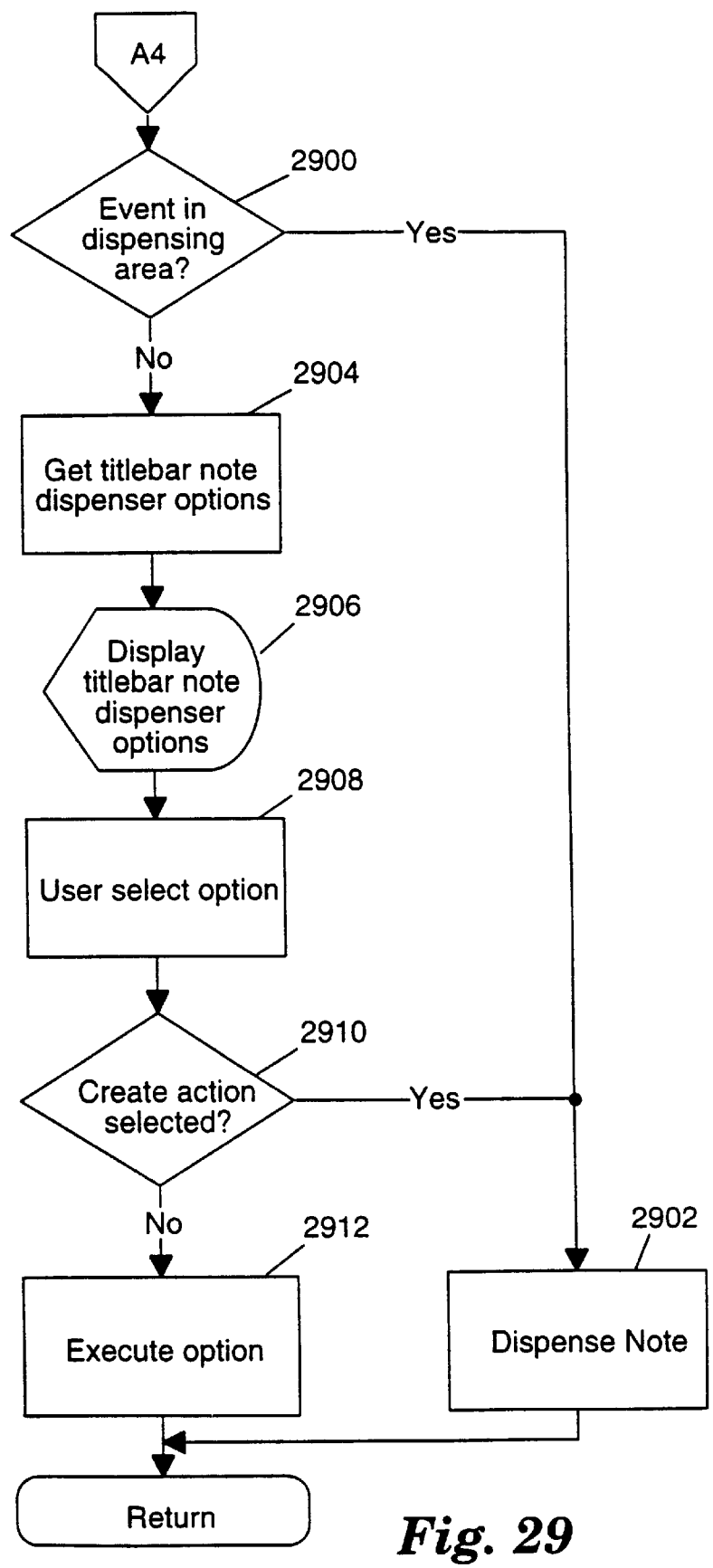
FIG. 29 is a flow chart showing the A4 subroutine of FIG. 16 in additional detail.

A block 1608 determines whether a title bar note dispenser event is selected by the computer user. If a title bar note dispenser event is selected, then the subroutine A4 is executed by the data processing system 300. The subroutine A4 is shown in FIG. 29.

If a cursor of the data processing system 300 is not over a note, or if a desktop note dispenser event is not selected by the computer user, or if a note event is not selected by the computer user, or if a title bar note dispenser event is not selected by the computer user, or after execution of the appropriate subroutine A1, A2, A3, or A4, the program returns to the block 1404 shown in FIG. 14.

As a cursor is passed over a note as determined by the block 1602 of FIG. 16, the character (e.g., appearance) of the cursor is changed according to the subroutine A1 shown in FIG. 17. In FIG. 17, a block 1700 determines whether the cursor is over the notation area of a note, such as the notation area 106 of the note 100. If so, a block 1702 changes the cursor to a data entry cursor. Data can be entered by a computer user by activating the cursor while the data entry cursor is over the notation area and by operating an appropriate input device, such as a keyboard.

A block 1704 determines whether the cursor is over a grab area of a note. If the cursor is over the grab area of a note, a block 1706 changes the cursor to a move cursor (which may have any desired appearance) so that, if the cursor is activated, the note under the cursor may be repositioned.

A block 1708 determines whether the cursor is over an options area of a note. If the cursor is over the options area, a block 1710 changes the cursor to an options selection cursor (which may have any desired appearance) so that, if the cursor is activated, options are displayed, and so that a computer user may select one of the displayed options.

A block 1712 determines whether the cursor is over another control area, if any, of a note. If the cursor is over another control area of a note, a block 1714 changes the cursor to a control cursor (which may have any desired appearance).

After operation of any of the blocks 1702, 1706, 1710, and 1714, or if the cursor is not over the notation area, the grab area, the options area, or another control area of the note, the program returns to the block 1404 of FIG. 14.

If the block 1604 of FIG. 16 determines that an event associated with a desktop note dispenser is to be processed so that the subroutine A2 is entered, a block 1800 determines whether a grab area, such as the grab area 204 of the note dispenser 200, is selected by a computer user, such as by clicking a mouse while the mouse cursor is over the grab area. If the grab area is selected, then a block 1802 positions the desktop note dispenser to a location determined by the computer user. The block 1802 is shown in more detail in FIG. 19.

A block 1804 determines whether a note dispensing area, such as the note dispensing area 202 of the note dispenser 200, is selected by a computer user, such as by clicking a mouse while the mouse cursor is over the note dispensing area. If the note dispensing area is selected by a computer user, a block 1806 dispenses a note. The block 1806 is shown in more detail in FIG. 20.

A block 1808 determines whether an options area, such as the options area 206 of the note dispenser 200, is selected by the computer user. If the options area is selected by the computer user, a block 1810 selects an option as determined by the computer user. The block 1810 is shown in more detail in FIG. 24. After the block 1802 positions a desktop note dispenser, or after the block 1806 dispenses a note from a desktop note dispenser, or after the block 1810 selects an option from a desktop note dispenser, or if a grab area of a note dispenser is not selected by a computer user, or if a note dispensing area of a note dispenser is not selected by a computer user, or if an options area of a note dispenser is not selected by the computer user, the program returns to the block 1404 shown in FIG. 14.

Figure 19:
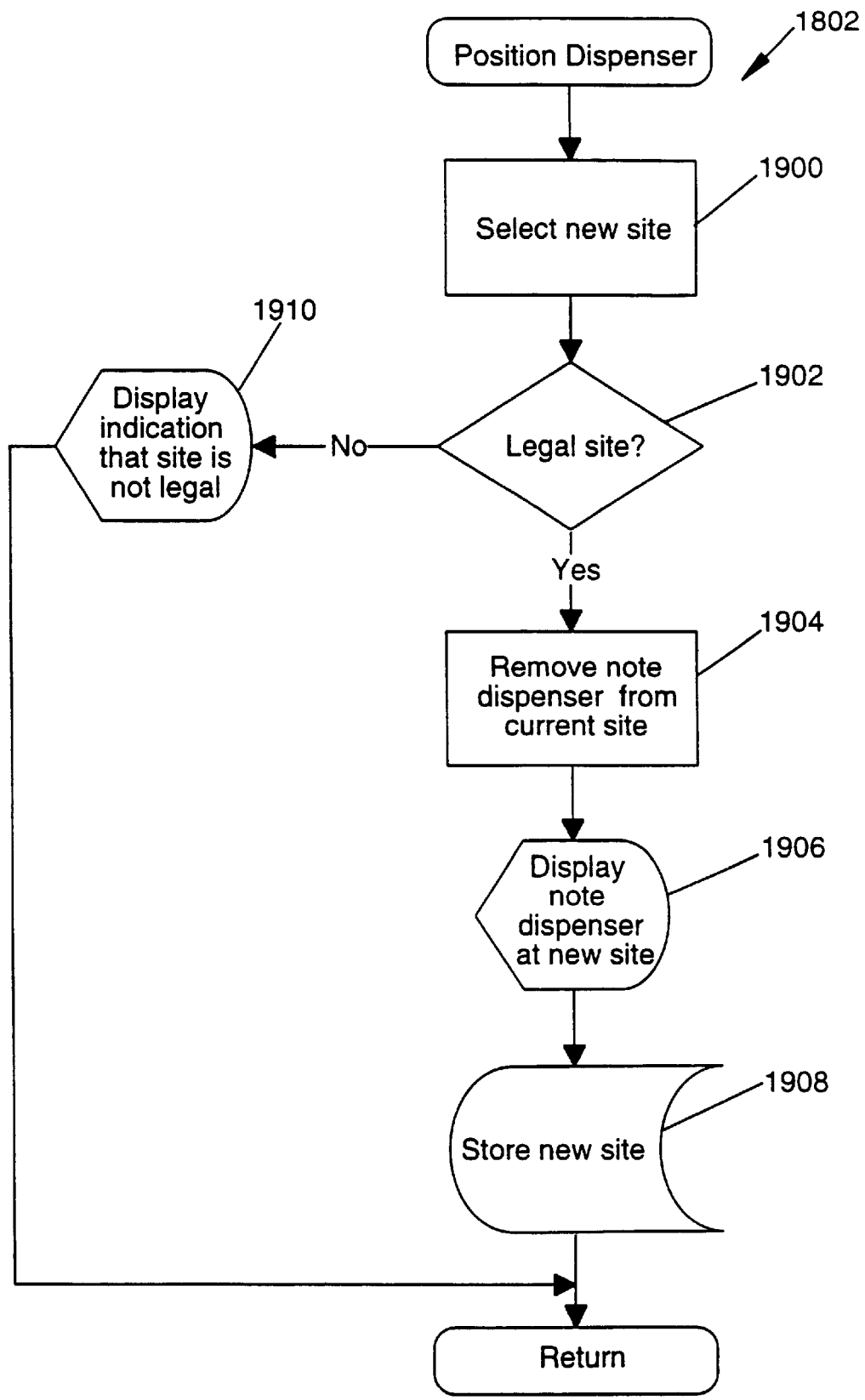
FIG. 19 is a flow chart showing the Position Dispenser block of FIG. 18 in additional detail.

The Position Dispenser block 1802 of FIG. 18 is shown in more detail in FIG. 19. As shown in FIG. 19, a block 1900 selects a new attachment site for the desktop note dispenser, for example based upon movement of a cursor by a mouse of the data processing system 300. If a block 1902 determines that the new attachment site, as selected by the block 1900, is a legal attachment site, a block 1904 then removes the desktop note dispenser from its current attachment site, and a block 1906 displays the desktop note dispenser at the new attachment site. A block 1908 stores the desktop note dispenser at the new attachment site.

However, if the new attachment site is not a legal attachment site as determined by the block 1902, a block 1910 causes a display or other indication to be provided to the computer user indicating that the selected new attachment site is not a legal attachment site.

After the block 1908 stores the desktop note dispenser at its new attachment site, or after the block 1910 causes a display or other indication to be provided to the computer user indicating that the selected new attachment site is not a legal attachment site, the program returns to the block 1404 of FIG. 14.

Figure 20:
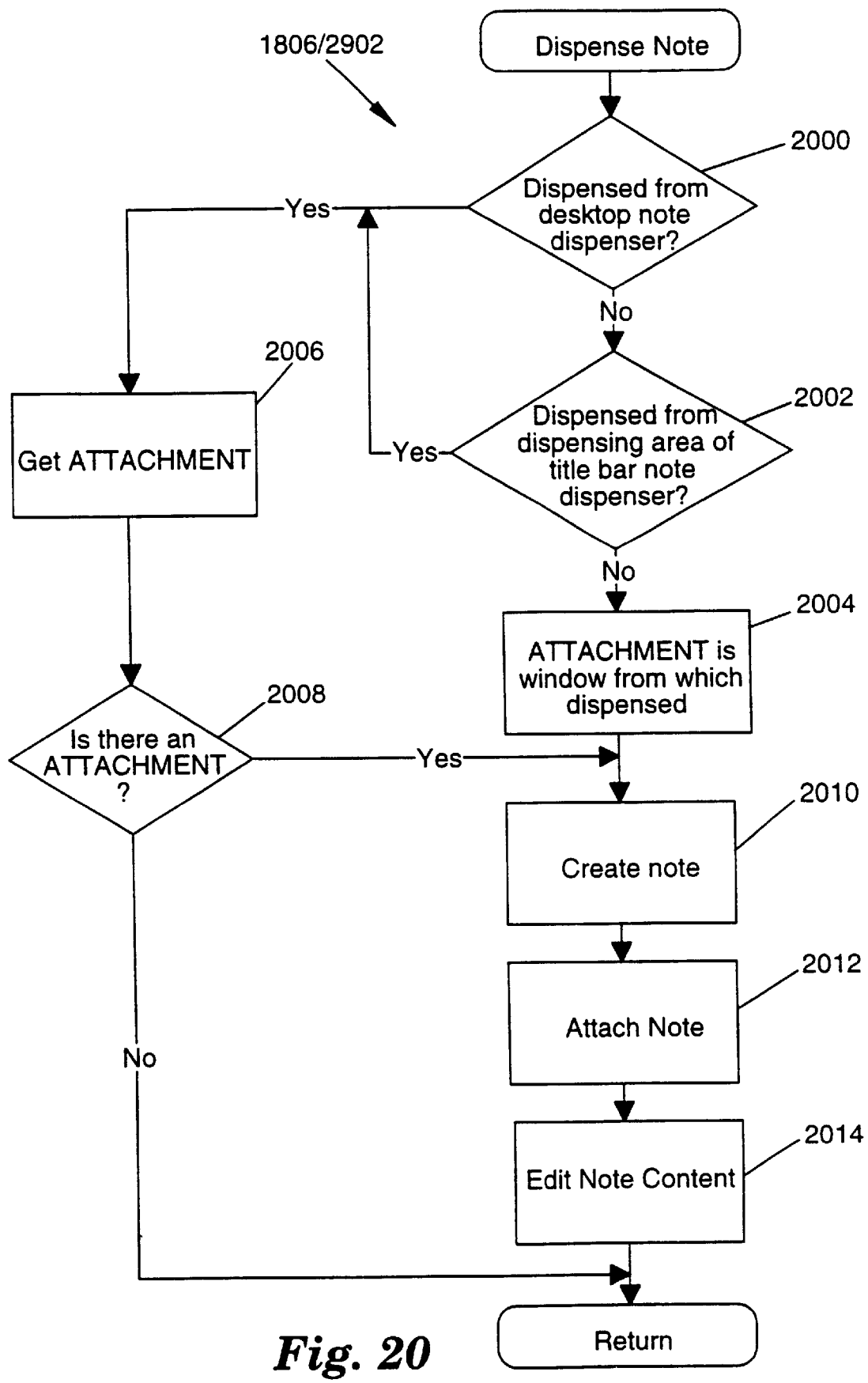
FIG. 20 is a flow chart showing the Dispense Note block of FIG. 18 in additional detail.

The Dispense Note block 1806 of FIG. 18 is shown in more detail in FIG. 20. As shown in FIG. 20, a block 2000 determines whether the note is dispensed from the desktop note dispenser. If the note is not dispensed from the desktop note dispenser, a block 2002 determines whether the note is dispensed from a note dispensing area of the title bar note dispenser. If the note is not dispensed either from a desktop note dispenser or from a note dispensing area of the title bar note dispenser, the note must have been dispensed by another means, such as by a note dispensing option of the options area of the title bar note dispenser.

A note which is dispensed by a means other than a note dispenser on a desktop or in the title bar is dispensed to the window from which the note is dispensed and at an attachment site which may be determined by the note program 318 or by the computer user. Accordingly, a block 2004 initially attaches this note to the window from which the note was dispensed. The note may then be move from that initial attachment site, if desired.

Figure 21:
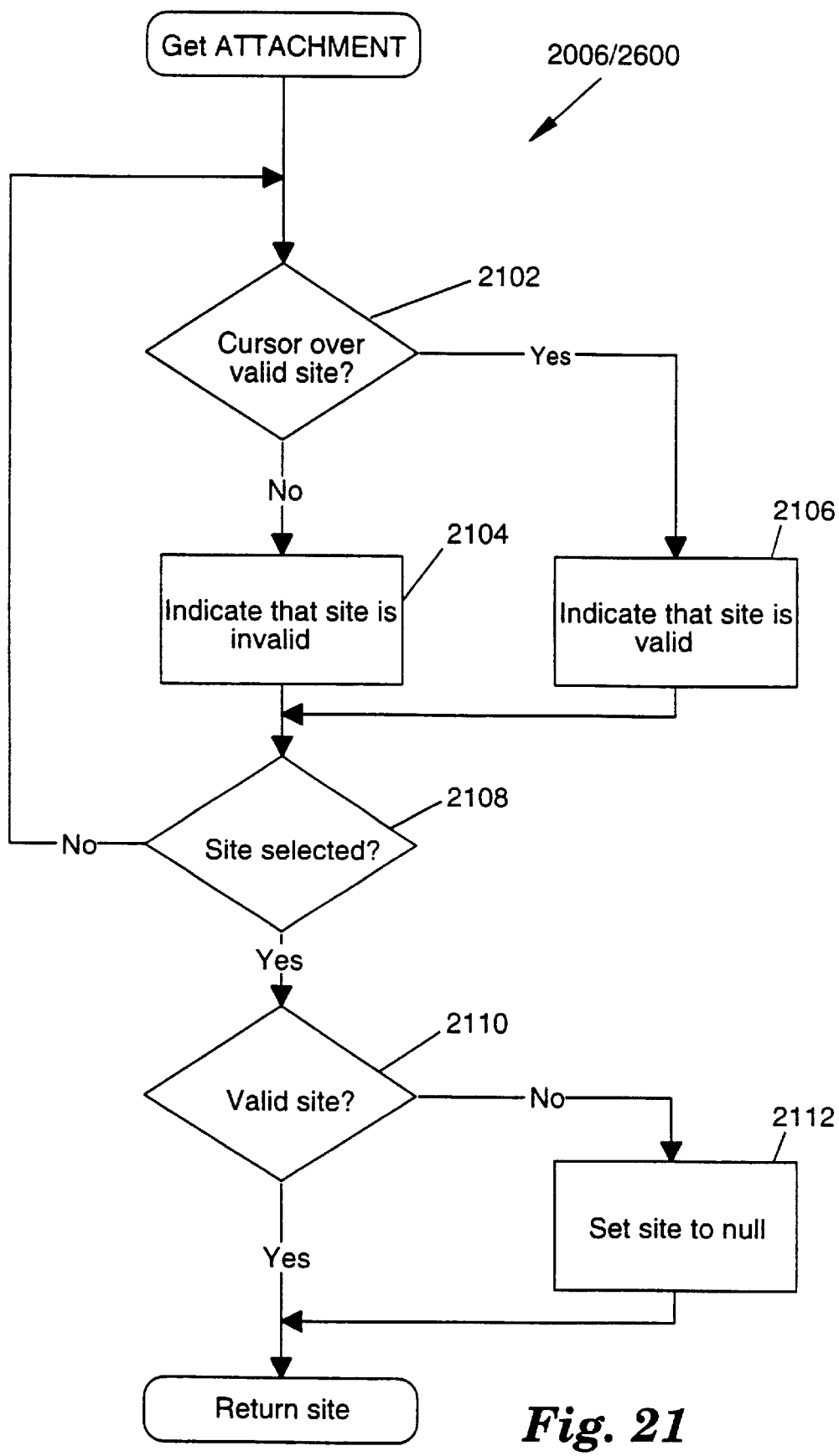
FIG. 21 is a flow chart showing the Get ATTACHMENT block of FIG. 20 in additional detail.

If the note is dispensed from a desktop note dispenser as determined by the block 2000, or if the note is dispensed from a title bar note dispenser as determined by the block 2002, a block 2006, which is shown in more detail in FIG. 21, (i) determines where the note is to be potentially attached, (ii) determines whether this potential attachment site is a valid attachment site, (iii) determines whether the potential attachment site relates to a program, such as an application program or an operating system, which is compliant with the note program 318, and (iv) sets a site flag accordingly. A block 2008 determines whether the site flag indicates that the potential attachment site is legal or illegal.

If the block 2008 determines that the site flag indicates that the potential attachment site for a note dispensed from a note dispenser is legal, or if the block 2004 attaches a new note to the window from which the new note is dispensed, a block 2010 creates a note by forming the outline and areas as shown by the note 100 in FIG. 1. A block 2012, as shown in more detail in FIG. 22, attaches the note to the legal attachment site. A block 2014, as shown in more detail in FIG. 23, edits the content of the attached note.

If the block 2008 determines that the site flag indicates that the potential attachment site is illegal, or after the block 2014 edits the contents of the note attached to a legal attachment site, the program returns to the block 1404 of FIG. 14.

The Get ATTACHMENT block 2006 of FIG. 20 is shown in more detail in FIG. 21. As shown in FIG. 21, a block 2102 determines whether a cursor of the data processing system is over a valid or an invalid potential attachment site. An invalid potential attachment site, for example, may be a region, such as a window, which is under the control of a noncompliant program (i.e., a program which is not compliant with the note program 318), or an invalid portion of a region, such as a window, which is under the control of a compliant program (i.e., a program which is compliant with the note program 318).

If the cursor is over an invalid potential attachment site, a block 2104 indicates to the computer user that the potential attachment site is an invalid attachment site. For example, the block 2104 may cause a symbol, such as the symbol 710 shown in FIG. 7, to be displayed to the computer user to indicate to the computer user that the potential attachment site is invalid.

On the other hand, if the cursor is over is a valid potential attachment site, a block 2106 indicates to the computer user that the potential attachment site is a valid potential attachment site. For example, instead of displaying a symbol indicating to the computer user that the site is an invalid potential attachment site, the block 2306 may cause an outline of a note to be displayed to the computer user to indicate to the computer user that the potential attachment site is a valid attachment site.

After the block 2104 indicates that the cursor is over an invalid potential attachment site, or after the block 2106 indicates that the cursor is over a valid potential attachment site, a block 2108 determines whether the computer user has selected the potential attachment site as the attachment site, for example by determining whether the computer user released the control button of a mouse. If the block 2108 determines that an attachment site has not been selected by the computer user yet, the routine returns to the block 2102 so that the computer user may move the cursor over other potential attachment sites.

On the other hand, if the block 2108 determines that the potential attachment site has been selected by the computer user as the attachment site, a block 2110 determines whether the selected attachment site is a valid attachment site. If the selected attachment site is not a valid attachment site, a block 2112 sets a site flag to null which indicates that the potential attachment site is not a valid attachment site. If, instead, the block 2110 determines that the selected attachment site is a valid attachment site, the site flag is not set to null. After the block 2112 sets the site flag to null, or if the block 2110 determines that the selected attachment site is a valid attachment site so that the site flag is not set to null, the program returns to the block 2008 which, as discussed above, determines whether the site flag has been set to null.

Figure 22:
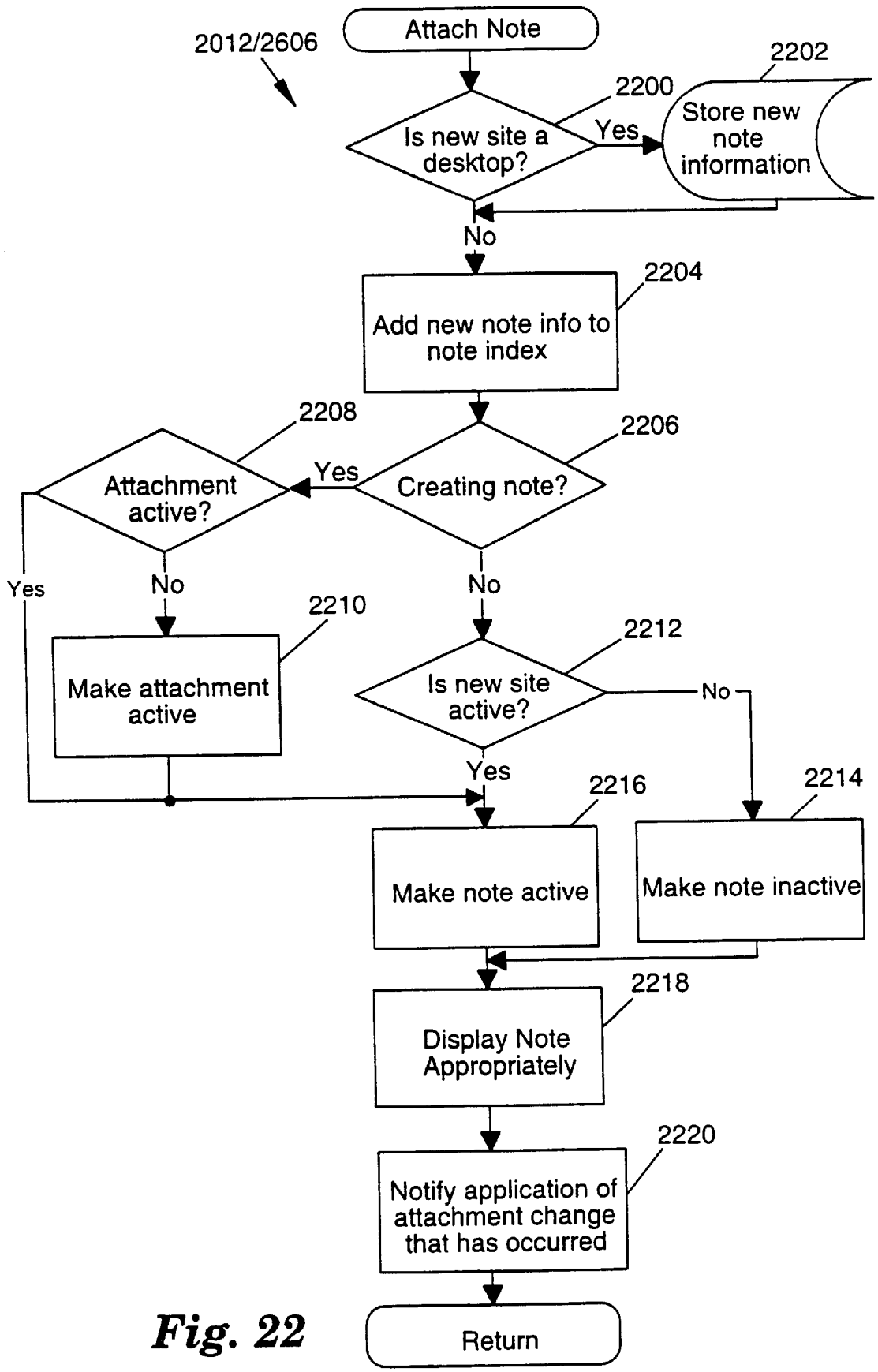
FIG. 22 is a flow chart showing the Attach Note block of FIG. 20 in additional detail.

The Attach Note block 2012 of FIG. 20 is shown in more detail in FIG. 22. As shown in FIG. 22, a block 2200 determines whether the attachment site is on a desktop. If the attachment site is on a desktop, a block 2202 causes the note to be stored at the operating system level.

After the block 2202 stores the note information concerning a note which is to be attached to a desktop, or if the block 2200 determines that the new attachment site is not a desktop, a block 2204 adds appropriate note information to an index. The index is discussed more fully in connection with FIG. 42. A block 2206 determines whether the computer user is creating a new note or whether, for example, an existing note has been moved to a new attachment site. If the computer user is creating a new note, a block 2208 determines whether the selected attachment site is an active attachment site. If a new note is to be created, as determined by the block 2206, and if the attachment site for this newly created note is not active, as determined by the block 2208, a block 2210 makes the attachment site active.

If the block 2206 determines that a new note is not being created, e.g. a note is being moved from an old attachment site to a new attachment site, a block 2212 determines whether the new attachment site is active. If the new attachment site is not active, a block 2214 makes the note inactive. Thus, a note, which is moved to an inactive attachment site, is made inactive.

If a new note is to be created as determined by the block 2206 and if the attachment site for this newly created note is not active as determined by the block 2208 and after the block 2210 makes this attachment site active, or if a new note is to be created as determined by the block 2206 and if the attachment site for this newly created note is already active as determined by the block 2208, or if the block 2206 determines that a new note is not being created and if the block 2212 determines that the new attachment site is active, a block 2216 makes the note active. After the block 2216 makes the note active, or after the block 2214 makes the note inactive, a block 2218 displays the note at the new attachment site, and a block 2220 appropriately notifies the application program, which controls the new attachment site, that an attachment change has occurred. That is, the application program which controls the new attachment site is either notified that a new note has been created and has been attached to the new attachment site, or that an existing note has been moved from an old attachment site to the new attachment site. Accordingly, the note is attached to the new attachment site. After the block 2220 appropriately notifies an application program that a change has occurred, the program returns to the block 2014 of FIG. 20.

A note can be attached to window, to a desktop, to a document generally, to an object such as a character, a word, a sentence, a paragraph, a graphic, a cell, a page, a video, a video frame, a video segment, a sound, or to the like. If the note is attached to an object, special highlighting, pointers, or the like, may be used to indicate the object to which the note is attached.

Figure 23:
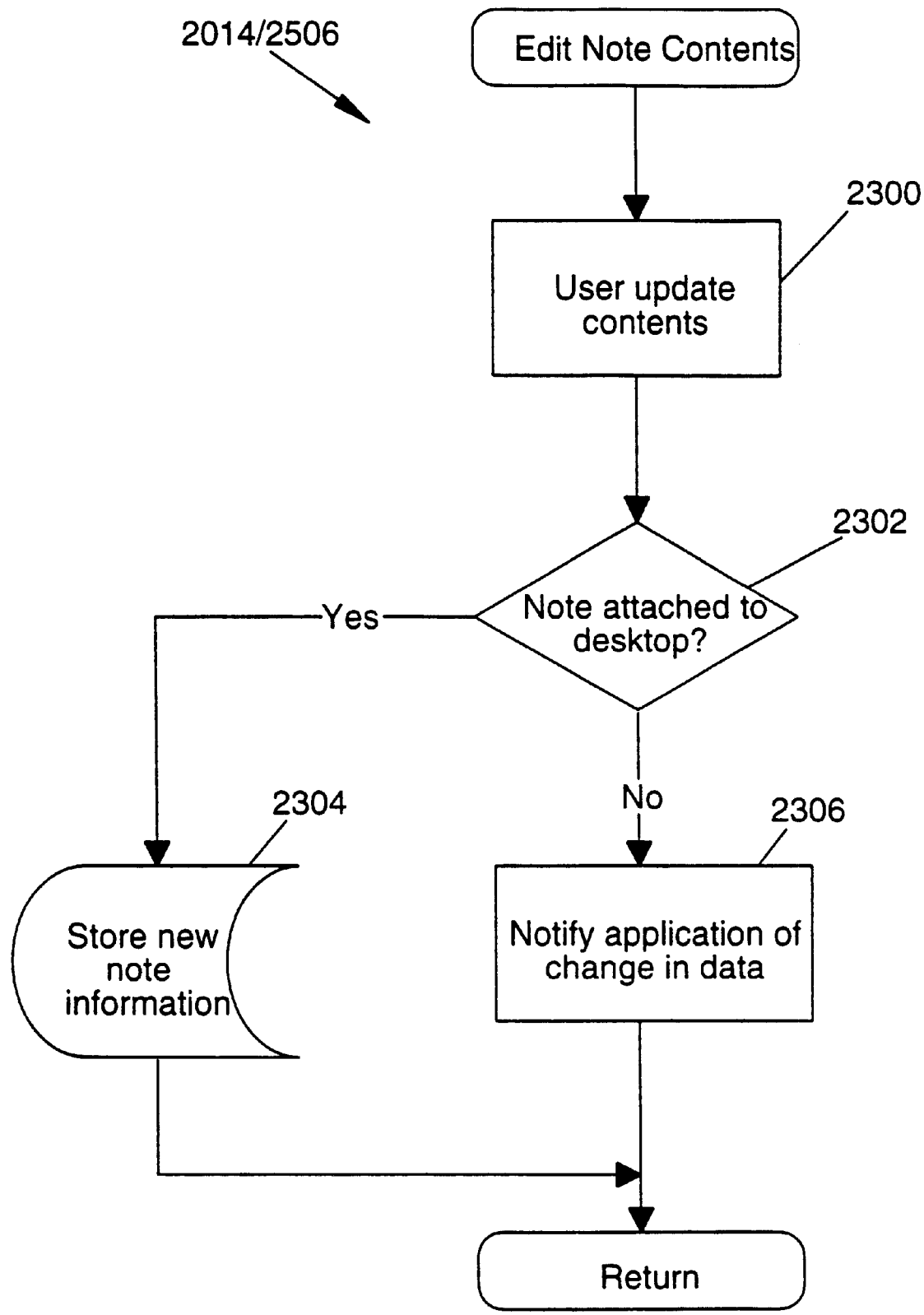
FIG. 23 is a flow chart showing the Edit Note Contents block of FIG. 20 in additional detail.

The Edit Note Contents block 2014 of FIG. 20 is shown in more detail in FIG. 23. As shown in FIG. 23, a block 2300 permits the computer user to update the contents of an existing note or to insert data into a newly created note. As an example, an edit or data entry cursor may appear in a note. The computer user can use a keyboard or other techniques to enter new data, or edit existing data, within the note at the data entry cursor.

If the note is attached to a desktop, as determined by a block 2302, a block 2304 causes the updated contents to be stored immediately (i.e., without a specific save instruction from the computer user) as data is added to the contents of the note or as the existing contents in the note are edited. On the other hand, if the note is not attached to a desktop as determined by the block 2302, a block 2306 appropriately notifies the application program of the updated contents. Either the note program 318 or an application program may be responsible for saving the updated contents. After the updated contents have been stored by the block 2304 for a note attached to a desktop, or after the block 2306 appropriately notifies the application program of the updated contents, the program returns to the block 1404 of FIG. 14.

Figure 24:
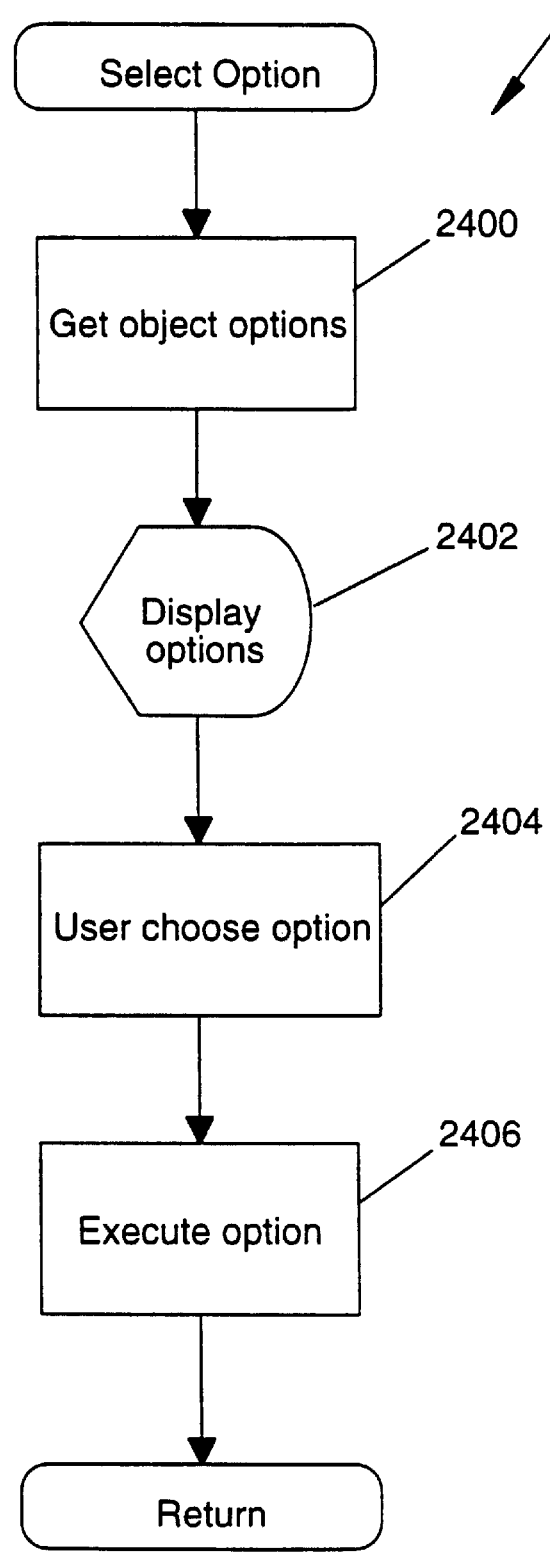
FIG. 24 is a flow chart showing the Select Option block of FIG. 18 in additional detail.

The Select Option block 1810 of FIG. 18 is shown in more detail in FIG. 24. As shown in FIG. 24, a block 2400 gets the options associated with any existing options area, such as the options area 206 of the note dispenser 200. A block 2402 causes the options to be displayed, and a block 2404 permits the computer user to select an option from the options displayed by the block 2402. A block 2406 executes the option selected by the computer user by way of the block 2404. The system returns to the block 1404 of FIG. 14.

Figure 26:
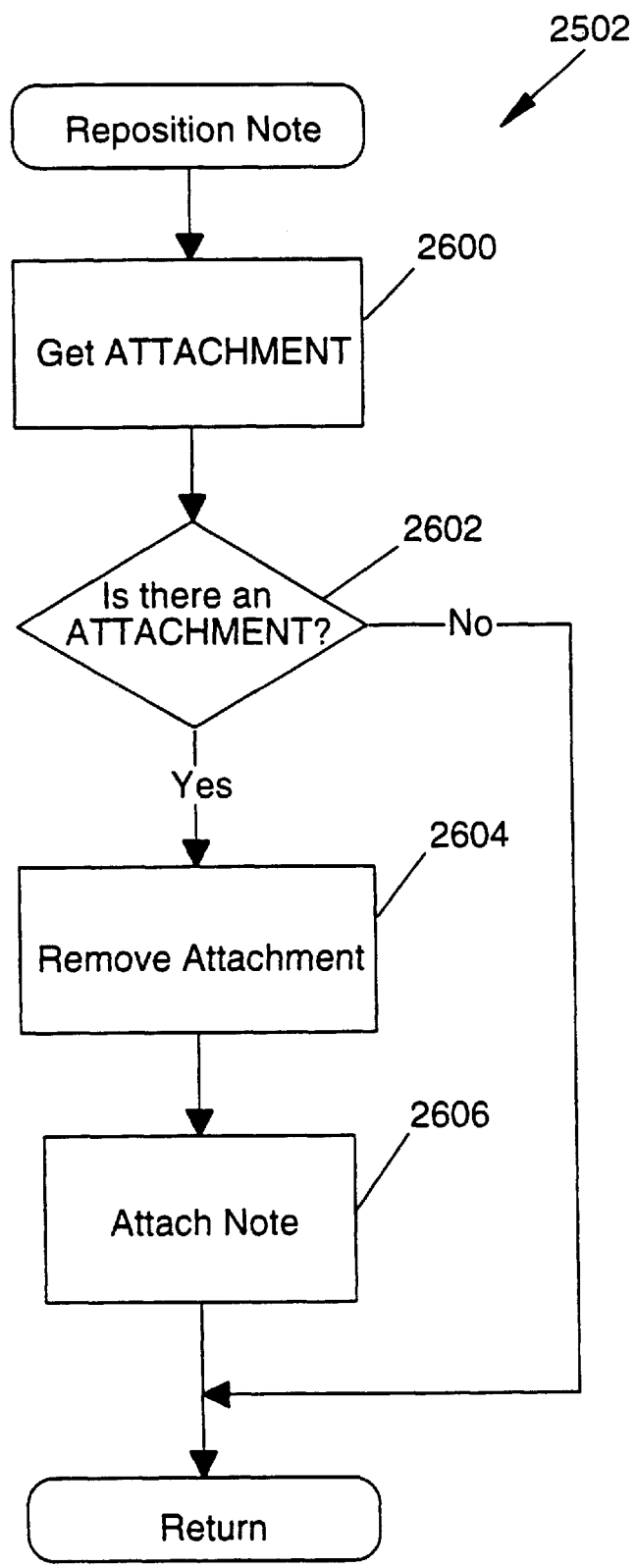
FIG. 26 is a flow chart showing the Reposition Note block of FIG. 25 in additional detail.

If the block 1606 of FIG. 16 determines that an event in a note is selected by the computer user so that the subroutine A3 is entered, a block 2500 determines whether a cursor, which is over the grab area of a note, such as the grab area 102 of the note 100, has been activated. If so, a block 2502, the details of which are shown in FIG. 26, causes this note to be repositioned.

A block 2504 determines whether the cursor is over the notation area of a note, such as the notation area 106 of the note 100, when the cursor is activated. If the cursor is over the notation area of a note at the time the cursor is activated, a block 2506, the details of which are shown in FIG. 23, edits the contents of this note.

A block 2508 determines whether the cursor is over the options area of a note, such as the options area 104 of the note 100, at the time that the cursor is activated. If so, a block 2510, the details of which are shown in FIG. 24, selects an option.

Figure 28:
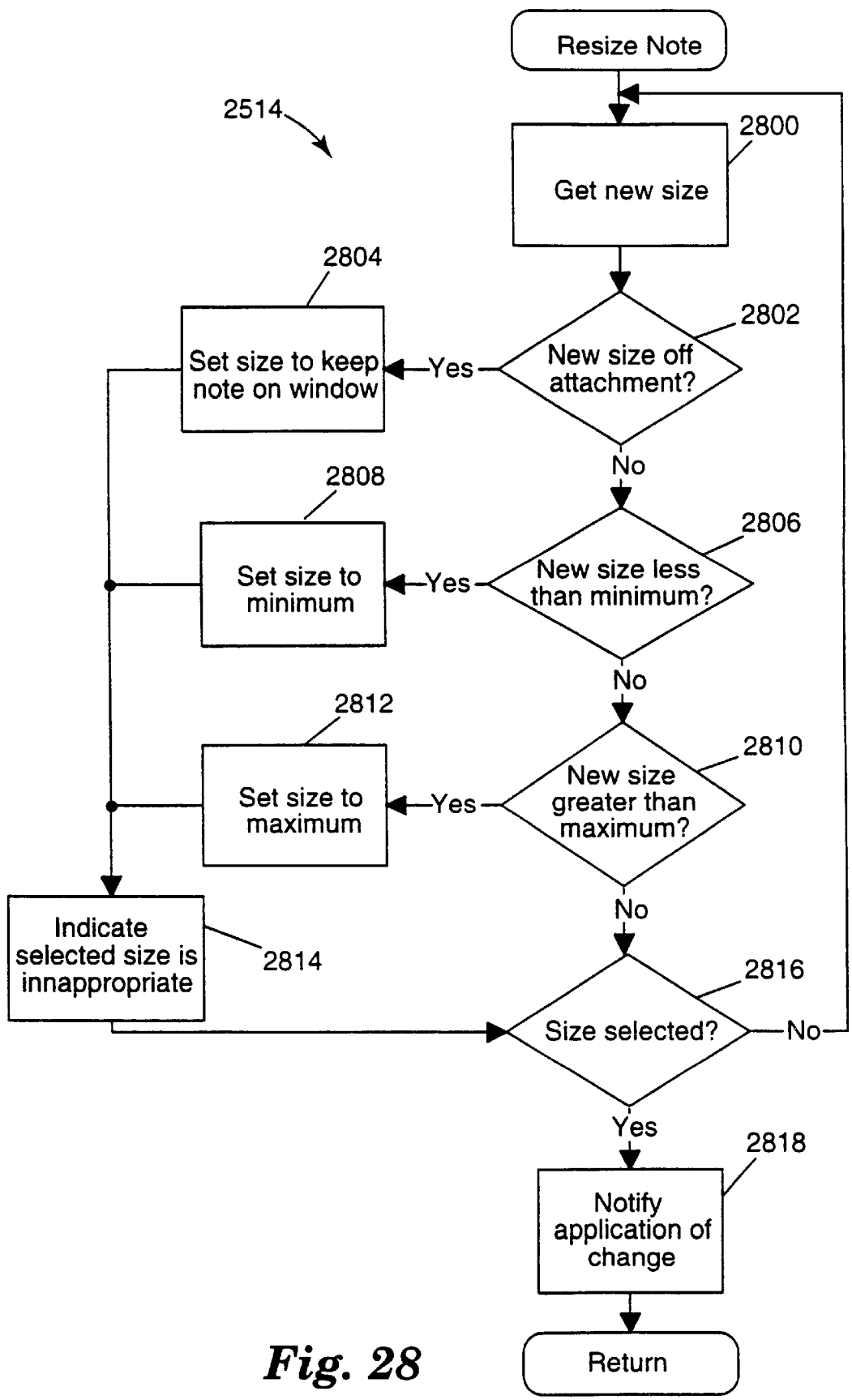
FIG. 28 is a flow chart showing the Resize note block of FIG. 25 in additional detail.

A block 2512 determines whether the cursor is over the sizing control area, such as the sizing control area 108 of the note 100, at the time that the cursor is activated. If so, a block 2514, the details of which are shown in FIG. 28, resizes the note.

If the cursor is not over the grab area of a note, or if the cursor is not over the notation area of a note, or if the cursor is not over the options area of a note, or if the cursor is not over the sizing control area of a note, at the time that the cursor is activated, or after the block 2502 repositions the note, or after the block 2506 edits the contents of the note, or after the block 2510 selects an option, or after the block 2514 resizes the note, the program returns to the block 1404 of FIG. 14.

The Reposition Note block 2502 of FIG. 25 is shown in more detail in FIG. 26. As shown in FIG. 26, a block 2600 causes the subroutine shown in FIG. 21 to be performed. A block 2602 determines whether the site flag is set to null. If the site flag is not set to null, a block 2604 causes the note to be removed from the old attachment site, and a block 2606 causes the subroutine shown in FIG. 22 to be performed so as to attach the note to the new attachment site. The block 2604 is shown in more detail in FIG. 27. If the block 2602 determines that the site flag is set to null, or after the block 2606 causes the note to be attached to the new attachment site, the program returns to the block 1404 of FIG. 14.

Figure 27:
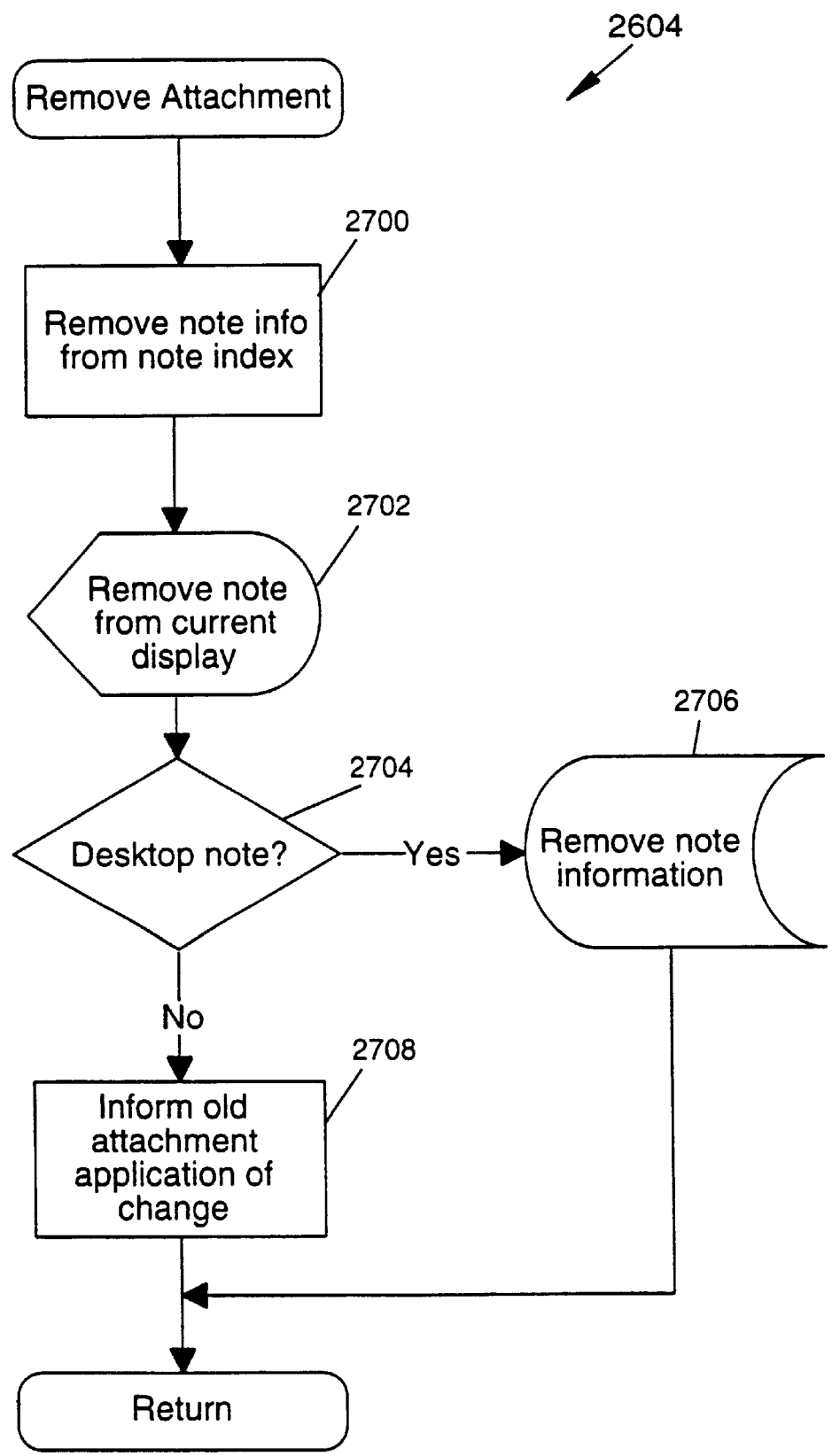
FIG. 27 is a flow chart showing the Remove Attachment block of FIG. 26 in additional detail.

The Remove Attachment block 2604 of FIG. 26 is shown in more detail in FIG. 27. As shown in FIG. 27, a block 2700 removes the note information from the note index. A block 2702 removes the note from the current display, i.e. from the old attachment site of the note. A block 2704 determines whether the old attachment site is a desktop. If the old attachment site is a desktop, a block 2706 causes the information contained in the note at the operating system level to also be removed from memory. On the other hand, if the old attachment site is not a desktop, a block 2708 informs the application program controlling the old attachment site to remove the information relating to the note at the old attachment site. After the block 2706 removes from memory the information of a desktop note being removed from an old attachment site, or after the block 2708 informs the application program controlling the old attachment site, the program returns to the block 2606 of FIG. 26.

The Resize note block 2514 of FIG. 25 is shown in more detail in FIG. 28. As shown in FIG. 28, a block 2800 gets the new size for the note. For example, if the sizing control area 108 of the note 100 shown in FIG. 1 is to be used for resizing a note, a cursor is moved to the sizing control area 108. The cursor is activated and dragged. As the cursor is dragged, the outline of the note changes to indicate the changing size of the note.

Thereafter, a block 2802 determines whether the note, due to its new size as selected by the computer user, would be off of its attachment, such as off the window to which the note is attached. For example, as shown in FIG. 11, if the size of the note 1112 is made smaller in a direction which would otherwise pull the note entirely off of the window 1116 to which the note is attached, a block 2804 limits the resizing so that the note is kept attached to its window. On the other hand, if the new size of the note does not require the note to be off of its attachment as determined by the block 2802, a block 2806 determines whether the new size is less than a minimum allowable size for a note. If the new size is less than the minimum allowable size, a block 2808 sets the size of the note to its minimum allowable size. The minimum allowable size may be user selectable, or not, or may not be provided at all.

If the new size is not less than a minimum allowable size as determined by the block 2806, a block 2810 determines whether the new size is greater than a maximum allowable size. If the new size for the note is greater than a maximum allowable size, a block 2812 sets the size of the note to the maximum allowable size. The maximum allowable size may be user selectable, or not, or may not be provided at all.

After the block 2804 sets the size of the note so that the note is kept on its attachment, or after the block 2808 sets the size of the note to the minimum allowable size, or after the block 2812 sets the size of the note to the maximum allowable size, a block 2814 indicates to the computer user that the size of the note, as selected by the computer user, is inappropriate. For example, the note can be shaded, the note can be color changed, or the note program 318 can simply refuse to change the outline in a nonallowable method, so that the computer user is notified that the computer user has attempted an illegal operation.

After the block 2814 indicates that the selected size of the note is inappropriate, or if the block 2810 determines that the new size of the note is not greater than the maximum allowable size for a note, a block 2816 determines whether the size of the note has been selected by the computer user. For example, if the sizing control area 108 of the note 100 is being operated by a cursor under control of a mouse, the size is selected when the mouse button is released. If the block 2816 determines that the size of the note has not been selected, the routine shown in FIG. 28 returns to the block 2800 for continued resizing of the note. If the block 2816 determines that the size of the note has been selected, a block 2818 appropriately notifies the program controlling the attachment (e.g., a window) of the new size of the note. Thereafter, the program returns to the block 1404 of FIG. 14.

If the block 1608 of FIG. 16 determine that an event in the title bar note dispenser is selected by the computer user so that the subroutine A4 is entered, a block 2900 determines whether the event being requested is in a dispensing area of the title bar note dispenser. If the dispensing area in a title bar note dispenser is selected, a block 2902 dispenses a note as shown in FIG. 20. If the dispensing area of the title bar note dispenser is not selected, a block 2904 gets the title bar options, a block 2906 displays those options, and a block 2908 selects an option as chosen by the computer user. A block 2910 determines whether the selected option is a note creating option. If it is, the block 2902 dispenses a note. If the selected option is not a note creating option, a block 2912 executes the selected option. After the block 2902 dispenses a note, or after the block 2912 executes the selected option, the program returns to the block 1404 of FIG. 14.

Figure 30:
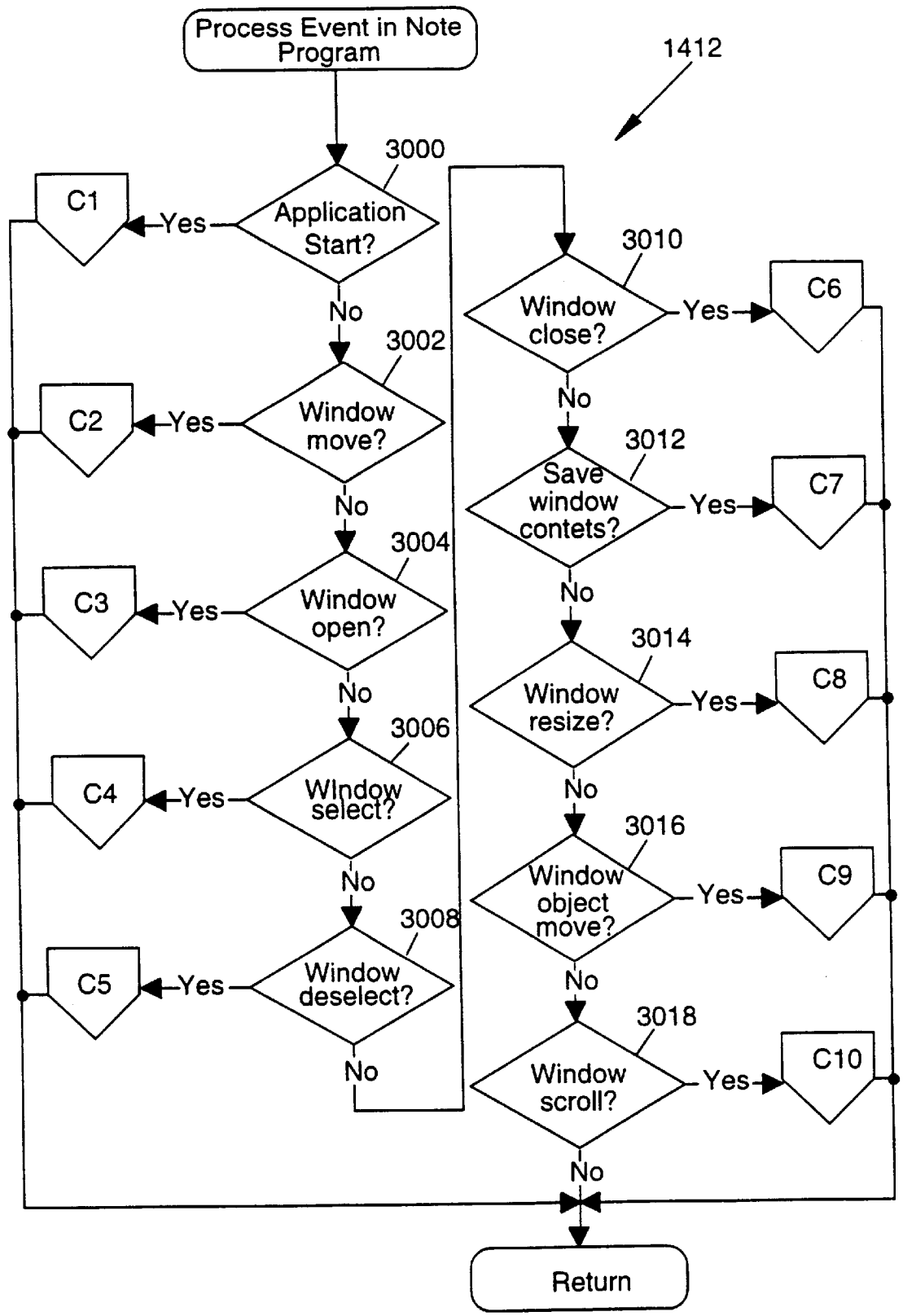
FIG. 30 is a flow chart showing the Process Event In Note Program block of FIG. 14 in additional detail.
Figure 31:
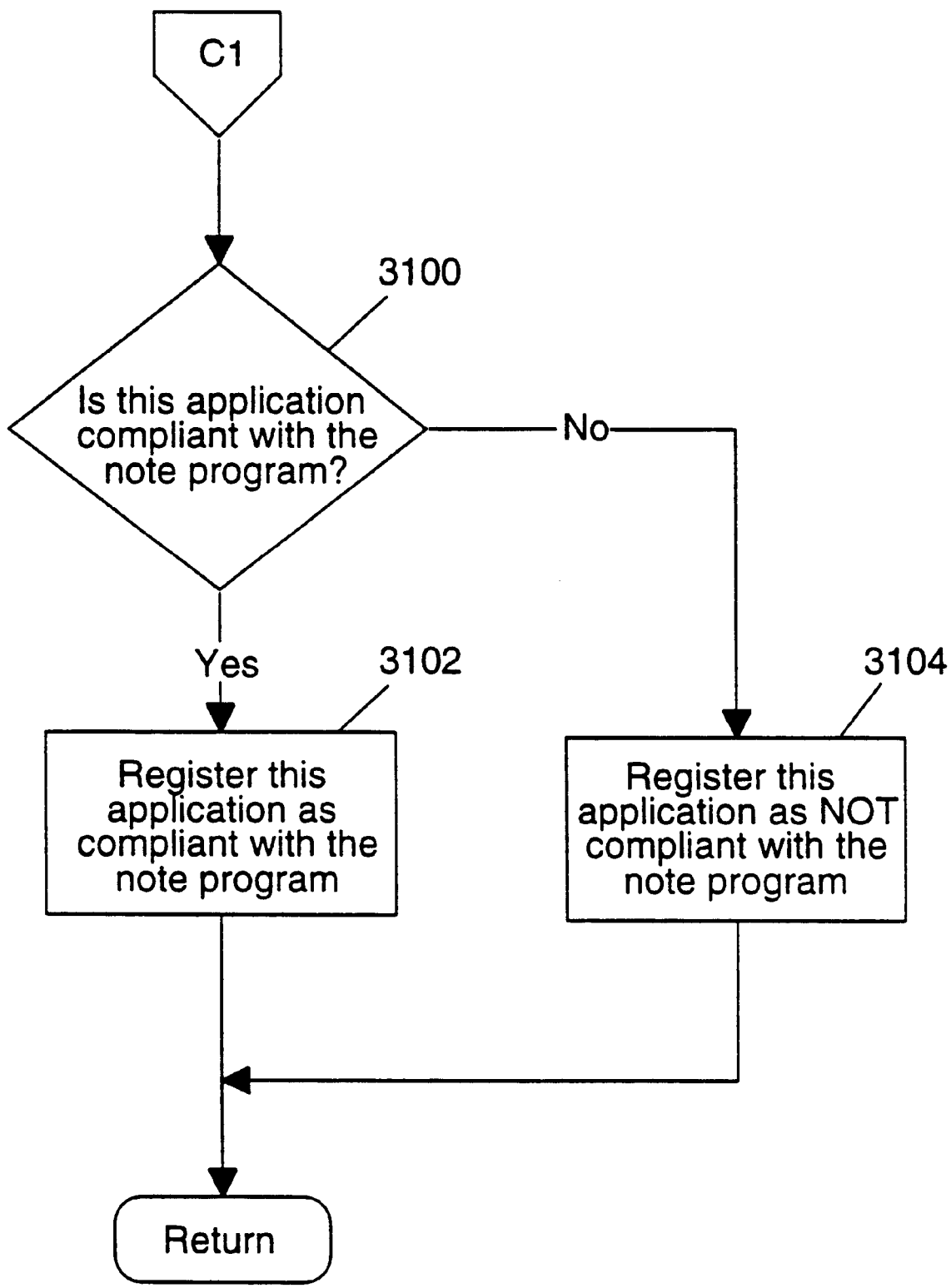
FIG. 31 is a flow chart showing the C1 subroutine of FIG. 30 in additional detail.

FIG. 30 shows how the block 1412 further processes an event processed by the block 1408. As shown in FIG. 30, a block 3000 determines whether one of the application programs 316 has been started, i.e. has just been entered. If the block 3000 determines that an application program has just been started, a subroutine C1 is executed by the data processing system 300 in order to register that the application program is, or is not, compliant with the note program 318. The subroutine C1 is shown in FIG. 31.

Figure 32:
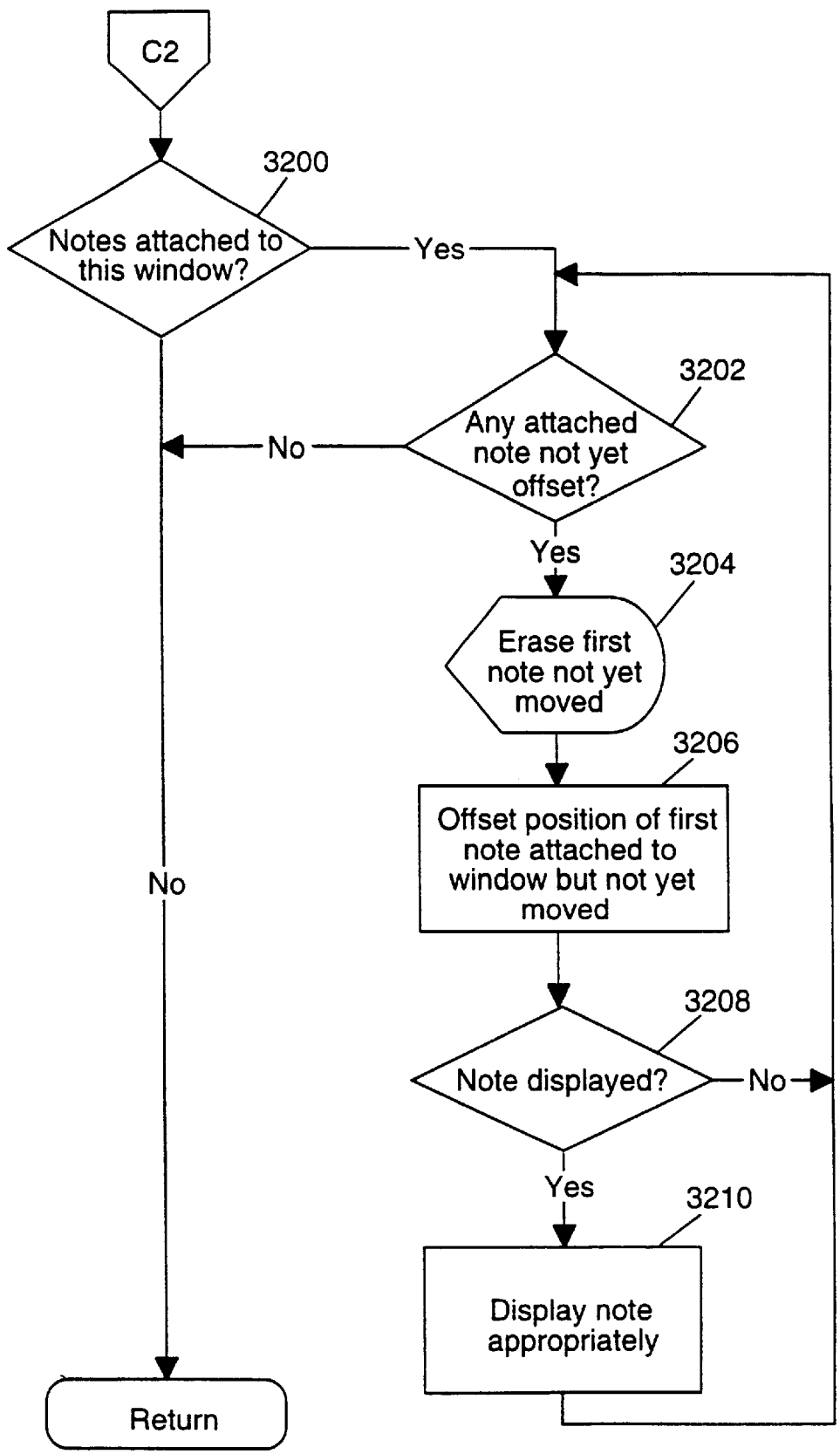
FIG. 32 is a flow chart showing the C2 subroutine of FIG. 30 in additional detail.

A block 3002 determines whether a window has been moved. If the block 3002 determines that a window has been moved, a subroutine C2 is executed by the data processing system 300. The subroutine C2 is shown in FIG. 32.

Figure 33:
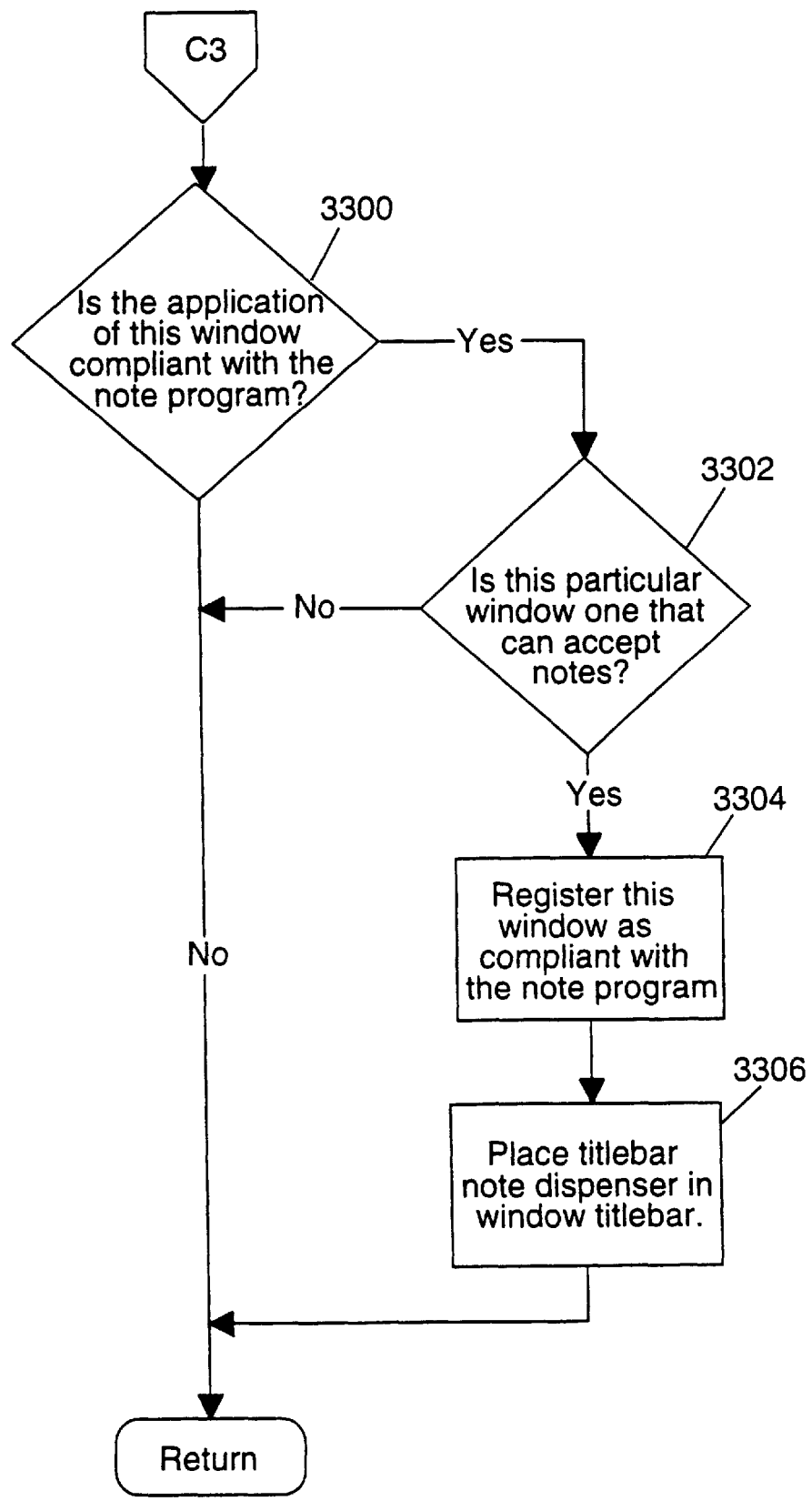
FIG. 33 is a flow chart showing the C3 subroutine of FIG. 30 in additional detail.

A block 3004 determines whether a window has just been opened as a result of execution of one of the application programs 316 or the operating system 314. If the block 3004 determines that a window has just been opened, a subroutine C3 is executed by the data processing system 300. The subroutine C3 is shown in FIG. 33.

Figure 34:
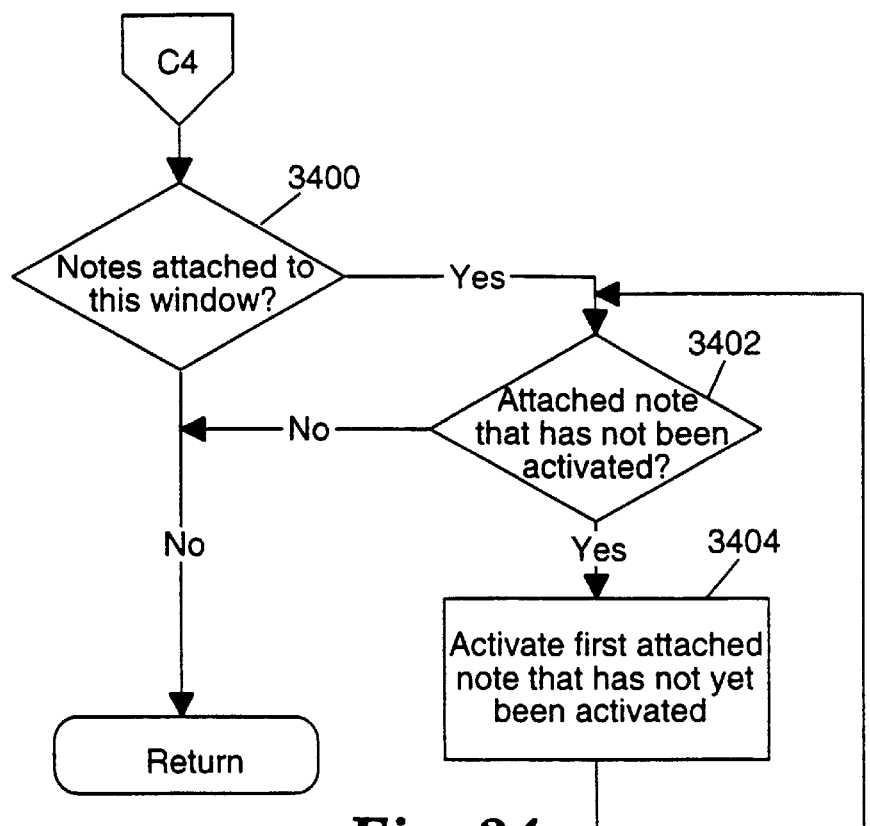
FIG. 34 is a flow chart showing the C4 subroutine of FIG. 30 in additional detail.

A block 3006 determines whether a window has been selected, i.e. made active. If the block 3006 determines that a window has been selected, a subroutine C4 is executed by the data processing system 300. The subroutine C4 is shown in FIG. 34.

Figure 35:
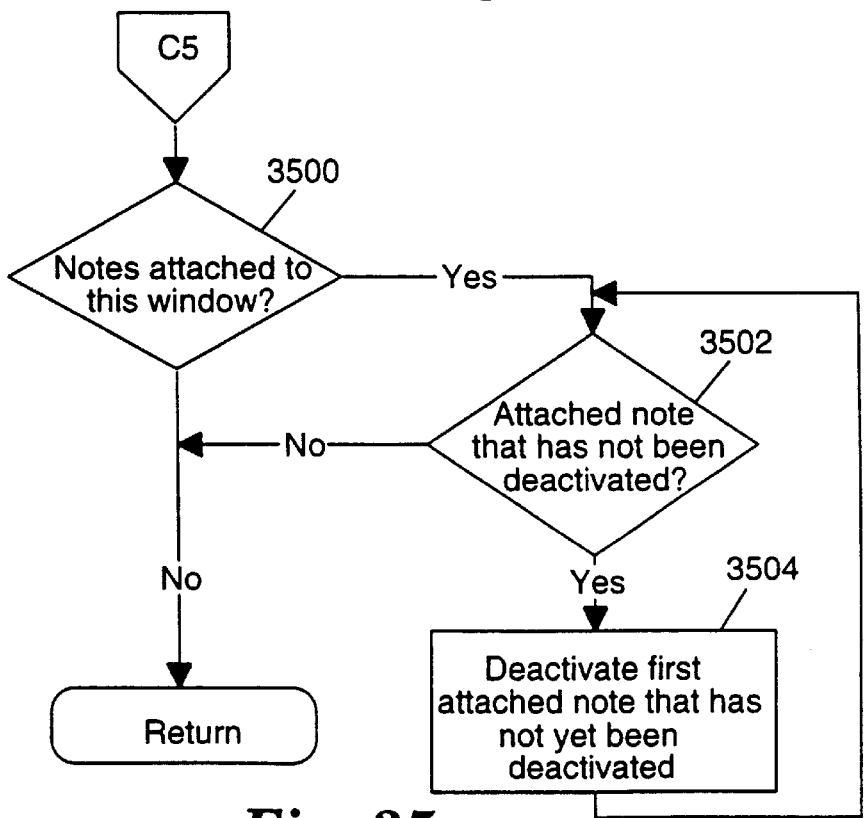
FIG. 35 is a flow chart showing the C5 subroutine of FIG. 30 in additional detail.

A block 3008 determines whether a window has been de-selected, i.e. made inactive. If the block 3008 determines that a window has been de-selected, a subroutine C5 is executed by the data processing system. The subroutine C5 is shown in FIG. 35.

Figure 36:
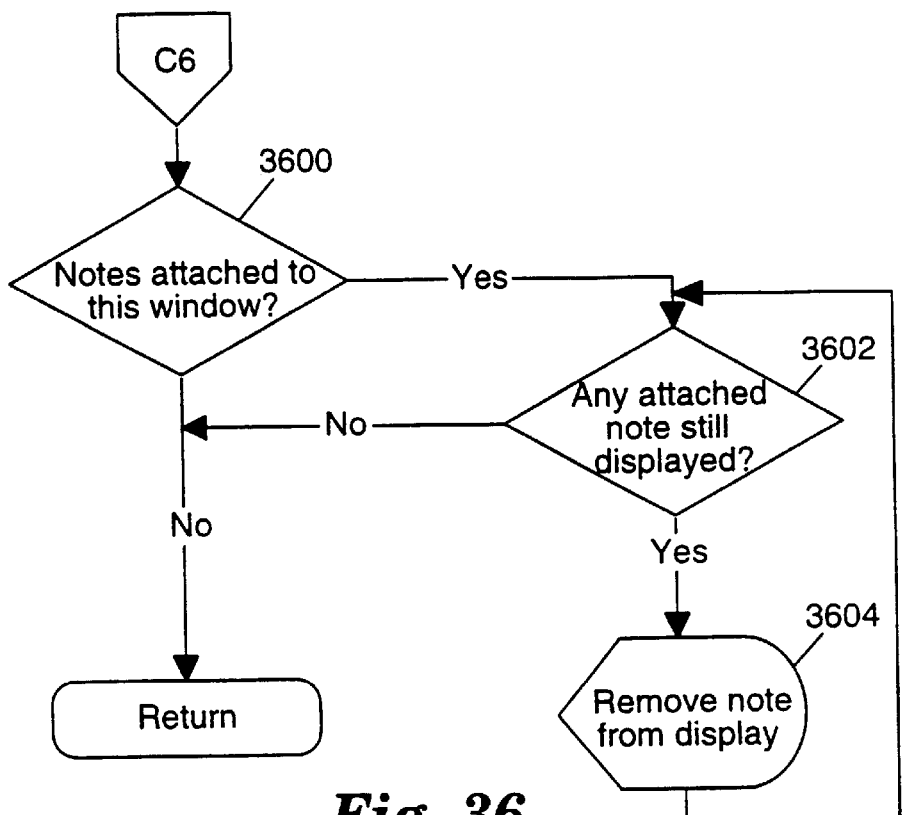
FIG. 36 is a flow chart showing the C6 subroutine of FIG. 30 in additional detail.

A block 3010 determines whether a window has been closed. If the block 3010 determines that a window has been closed, a subroutine C6 is executed by the data processing system 300. The subroutine C6 is shown in FIG. 36.

Figure 37:
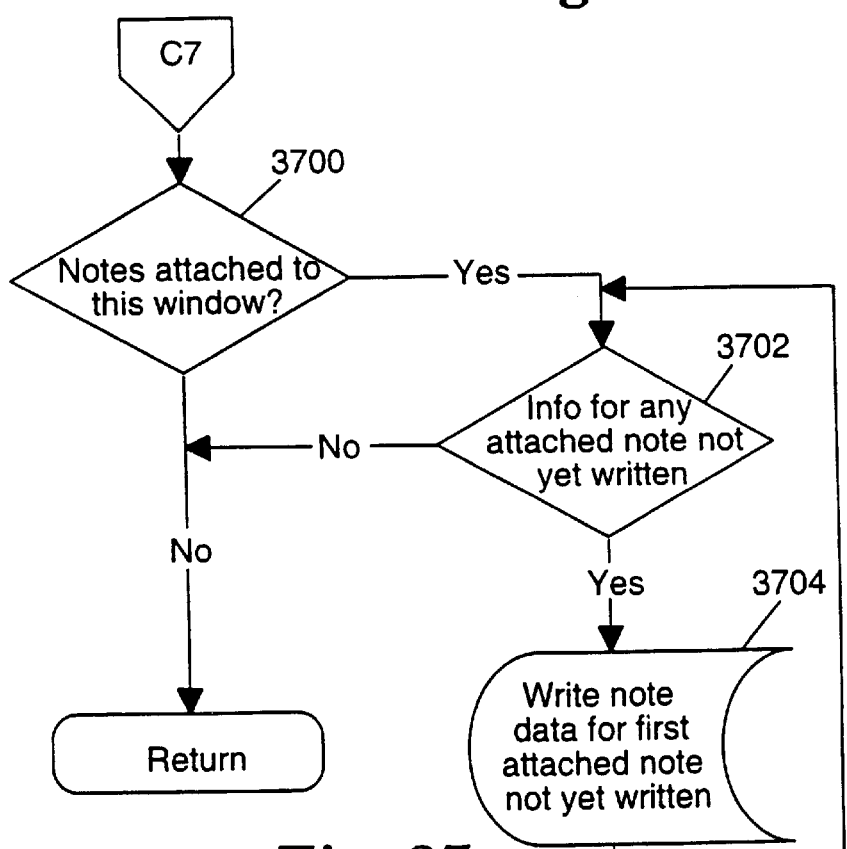
FIG. 37 is a flow chart showing the C7 subroutine of FIG. 30 in additional detail.

A block 3012 determines whether the contents of a window are being saved. For example, a computer user can select a save option. If the block 3012 determines that the contents of a window are being saved, a subroutine C7 is executed by the data processing system 300. The subroutine C7 is shown in FIG. 37.

Figure 38:
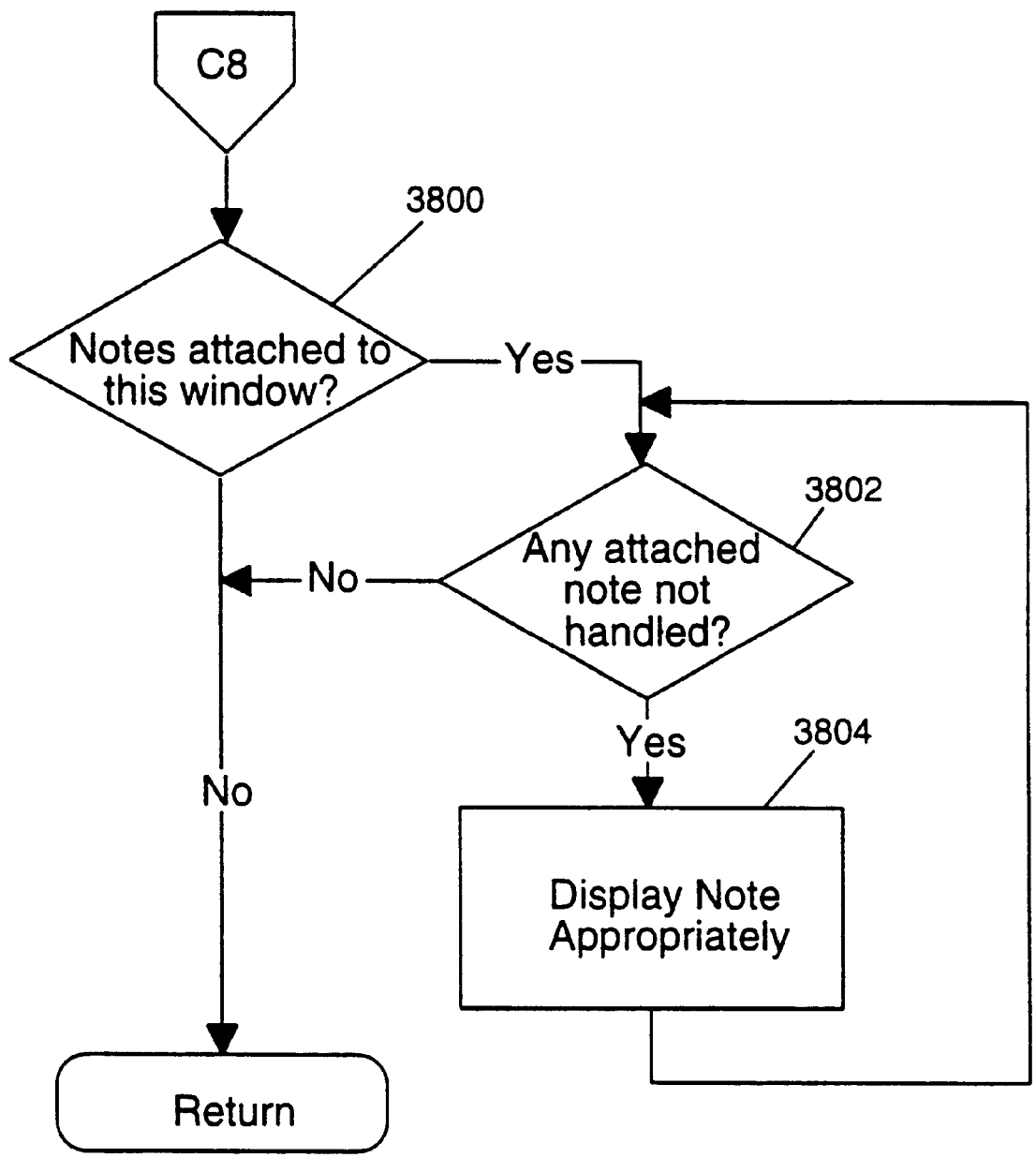
FIG. 38 is a flow chart showing the C8 subroutine of FIG. 30 in additional detail.

A block 3014 determines whether a window has been resized by a computer user. If a window has been resized, a subroutine C8 is executed by a data processing system 300. The subroutine C8 is shown in FIG. 38.

Figure 40:
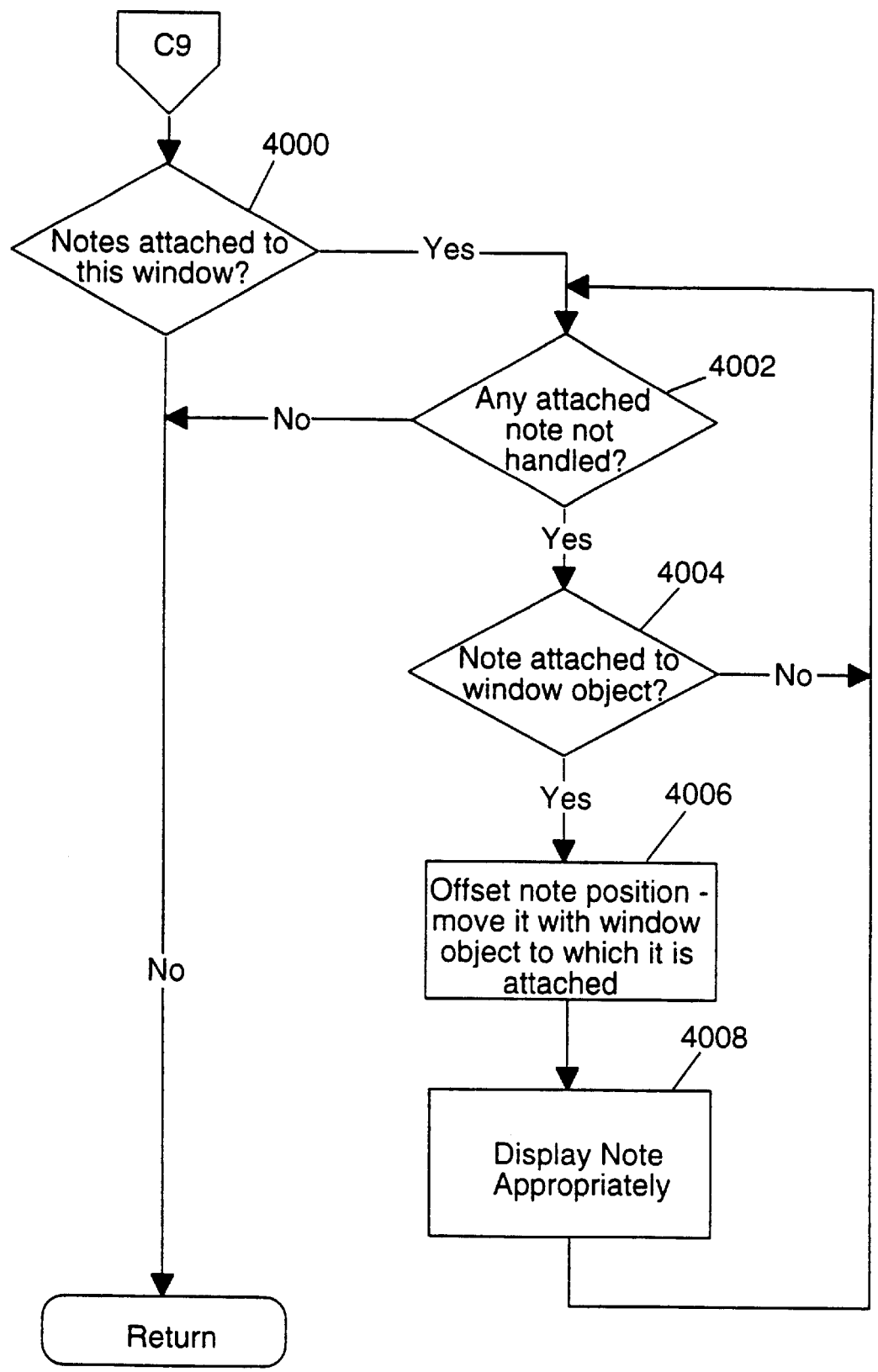
FIG. 40 is a flow chart showing the C9 subroutine of FIG. 30 in additional detail.

A block 3016 determines whether an object within a window is being moved by the computer user. If the block 3016 determines that an object within a window is being moved by a computer user, a subroutine C9 is executed by the data processing system 300. The subroutine C9 is shown in FIG. 40.

Figure 41:
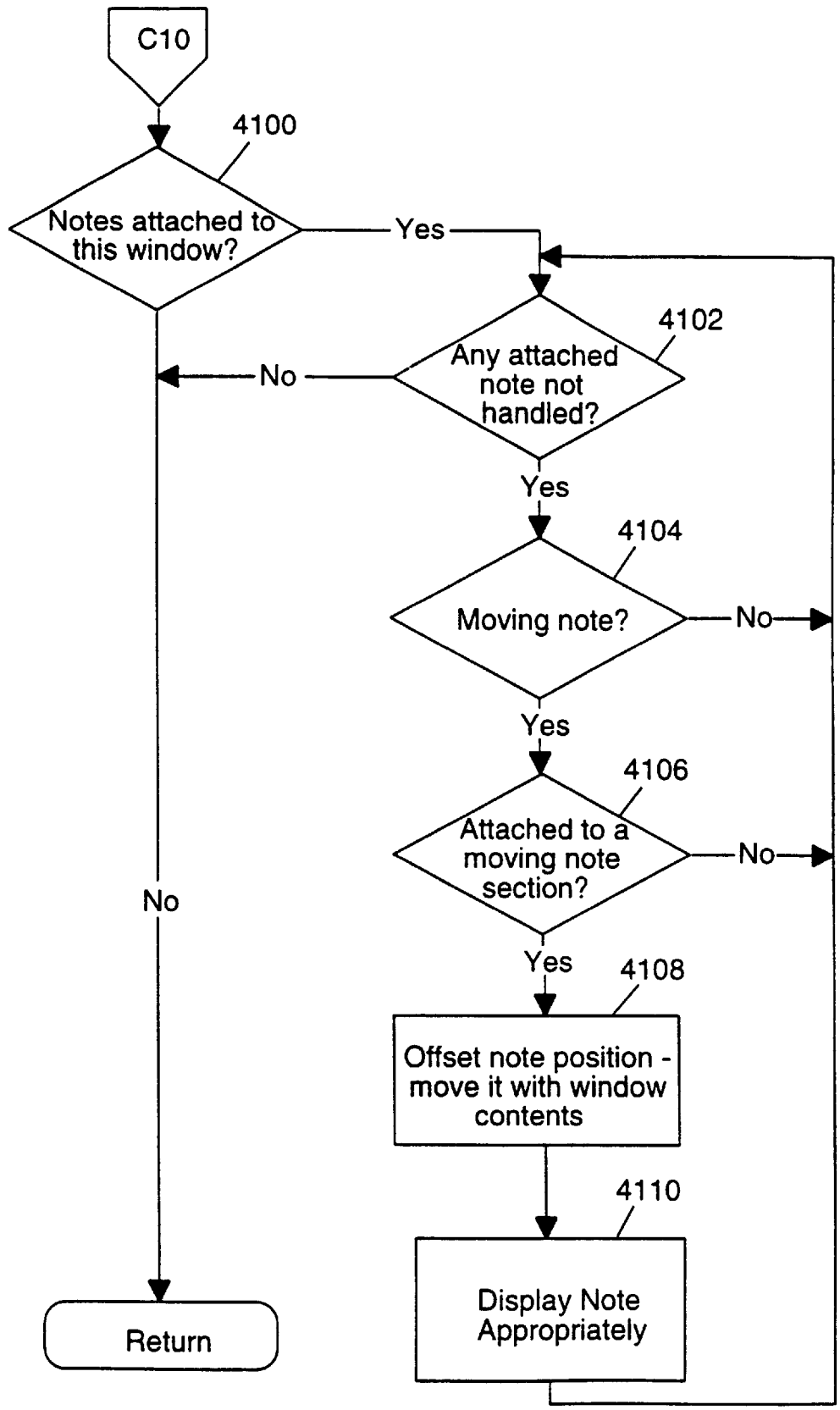
FIG. 41 is a flow chart showing the C10 subroutine of FIG. 30 in additional detail; and, FIG. 42 is an example of an index containing information concerning existing notes.

A block 3018 determines whether a window is being scrolled by a computer user. If the block 3018 determines that a window is being scrolled by a computer user, a subroutine C10 is executed by the data processing system 300. The subroutine C10 is shown in FIG. 41.

If an application program has not just been started, or is a window has not been moved, or if a window has not just been opened, or if a window has not been selected, or if a window has not been de-selected, or if a window has not been closed, or if the contents of a window are not being saved, or if a window has not been resized by a computer user, or if an object within a window is not being moved by the computer user, or if a window is not being scrolled by a computer user, or after execution of the appropriate subroutine C1, C2, C3, C4, C5, C6, C7, C8, C9, or C10, the program returns to the block 1404 shown in FIG. 14.

When the block 3000 determines that an application program is just started so that the subroutine C1 shown in FIG. 31 is entered, a block 3100 determines whether the application program just starting is compliant with the note program 318. In effect, the block 3100 determines whether an interface exists between the application program just started and the note program 318.

If the block 3100 determines that the application program just started is compliant with the note program 318, a block 3102 registers the fact that the application program just started is compliant with the note program 318. For example, a flag may be set indicating that the application program is compliant with the note program 318. On the other hand, if the block 3100 determines that the application program just started is not compliant with the note program 318, a block 3104 registers the fact that the application program just initiated is not compliant with the note program 318. For example, a flag may be set indicating that the application program is not compliant with the note program 318. After the block 3102 registers that the application program just started is compliant with the note program 318, or after the block 3104 registers that the application program just started is not compliant with the note program 318, the subroutine C1 returns to the block 1404 shown in FIG. 14.

When the block 3002 determines that a window has been moved so that the subroutine C2 shown in FIG. 32 is entered, a block 3200 determines whether there are any notes attached to the window being moved. If there are notes attached to the window being moved, the program corresponding to the window being moved is necessarily compliant with the note program 318. On the other hand, if there are no notes attached to the window being moved, the program corresponding to the window being moved may or may not be compliant with the note program 318.

If the block 3200 determines that there are notes attached to the moved window, a block 3202 determines whether there are any notes attached to the moved window remaining to be offset, i.e. to be moved to the new position of the moved window. If there are any such notes, a block 3204 removes a first of these notes remaining to be offset from the old position of the window, and a block 3206 determines the new coordinates for this first note. The new coordinates of this first note are those coordinates which maintain the original attachment site of this first note relative to the window when the window is at its new position.

A block 3208 determines if this note is to be displayed. For example, the block 3208 may determine whether a note is to be hidden or shown. If the block 3208 determines that this note is to be displayed, a block 3210 displays the note at its new position, i.e. at its new coordinates. After the block 3210 displays the note at its new position, or if the block 3208 determines that the note is not to be displayed, the subroutine C2 returns to the block 3202 to determine whether there are any more notes remaining to be moved to the new position of the window. If there are, the blocks 3204–3210 process each of the remaining notes as above. If the block 3200 determines that there are no notes attached to the moved window, or when the block 3202 determines that there are no more notes to be moved to the new position of the moved window, the subroutine C2 returns to the block 1404 shown in FIG. 14.

When a window is opened as determined by the block 3004 so that the subroutine C3 shown in FIG. 33 is entered, a block 3300 determines whether the application program corresponding to the window which has just been opened is compliant with the note program 318. If this application program is compliant with the note program 318, a block 3302 determines whether this particular window is one that can accept notes. That is, windows corresponding to application programs which are compliant with the note program 318 may have invalid attachment sites associated therewith. If the block 3302 determines that the newly opened window can accept notes, a block 3304 registers that the window is compliant with the note program 318. A block 3306 then places a note dispenser, such as the note dispenser 513, in the newly opened window. If the block 3300 determines that the application program corresponding to the newly opened window is not compliant with the note program 318, or if the block 3302 determines that, even though the window corresponds to an application program which is compliant with the note program 318, the particular window is not a valid attachment site for notes, or after the block 3306 places a note dispenser in the newly opened window, the subroutine C3 returns to the block 1404 shown in FIG. 14.

If the block 3006 determines that a window has been selected so that the subroutine C4 shown in FIG. 34 is entered, a block 3400 determines whether there are any notes attached to the selected window. If the block 3400 determines that there are notes attached to the selected window, a block 3402 determines whether there are any notes attached to the selected window which have not been activated. If there are any notes which have not been activated, a block 3404 activates a first of these inactive notes. The block 3402 determines whether there are any more notes which have not been activated. If so, the block 3404 activates another of the inactive notes. When the block 3402 determines that all notes have been activated, or if the block 3400 determines that there are no notes attached to the selected window, the subroutine C4 returns to the block 1404 shown in FIG. 14.

If the block 3008 determines that a window is de-selected so that the subroutine C5 shown in FIG. 35 is entered, a block 3500 determines whether there are any notes attached to the de-selected window. If there are notes attached to the de-selected window, a block 3502 determines whether there are any notes attached to the window which have not been deactivated, i.e. made inactive. If there are notes which have not yet been deactivated, a block 3504 deactivates one of these notes. Then, the block 3502 determines whether there are any more notes which have not been deactivated. If so, the block 3504 deactivates another of the notes which have not been deactivated. When the block 3502 determines that all notes attached to the de-selected window have been deactivated, or if the block 3500 determines that there are no notes attached to the de-selected window, the subroutine C5 returns to the block 1404 shown in FIG. 14.

If the block 3010 determines that a window has been closed so that the subroutine C6 shown in FIG. 36 is entered, a block 3600 determines whether there are any notes attached to the closed window. If there are notes attached to the closed window, a block 3602 determines whether there are any notes attached to the closed window which are still displayed. If the block 3602 determines that there are notes attached to the closed window which are still displayed, a block 3604 removes one of the notes from the display. Then, the block 3602 determines whether there are any other notes attached to the closed window which are still displayed. If so, the block 3604 removes another of the notes from the display. When the block 3602 determines that all notes have been removed from the display, or if the block 3600 determines that there are no notes attached to the closed window, the subroutine C6 returns to the block 1404 shown in FIG. 14.

If the block 3012 determines that contents of a window are being saved by a computer user so that the subroutine C7 shown in FIG. 37 is entered, a block 3700 determines whether there are any notes attached to this window. If the block 3700 determines that there are notes attached to this window, a block 3702 determines whether any of these notes contain information which has not been written, i.e. saved in memory. If the block 3702 determines that there are attached notes containing information which has not yet been written, a block 3704 writes the note information for one of these attached notes. Thereafter, the block 3702 determines whether there are any other notes containing information which has not been written. If so, the block 3704 writes the information of another of the notes. When the block 3702 determines that the information for all attached notes has been written, or if the block 3700 determines that there are no notes attached to the window which contents are being saved by the computer user, the subroutine C7 returns to the block 1404 shown in FIG. 14.

If the block 3014 determines that a window has been resized by a computer user so that the subroutine C8 shown in FIG. 38 is entered, a block 3800 determines whether there are any notes attached to the resized window. If there are notes attached to the resized window, a block 3802 determines whether there are any such notes which have not yet been processed by a block 3804. If there are any notes attached to the resized window which have not yet been processed by the block 3804, the block 3804 processes one of the notes yet to be processed. The block 3804 is shown in additional detail in FIG. 39. After the note is processed by the block 3804, the block 3802 determines whether there are any more notes which have not been processed by the block 3804. If there are, the block 3804 processes another of these notes. When the block 3802 determines that all notes have been processed by the block 3804, or if the block 3800 determines that there are no notes attached to the resized window, the subroutine C8 returns to the block 1404 shown in FIG. 14.

Figure 39:
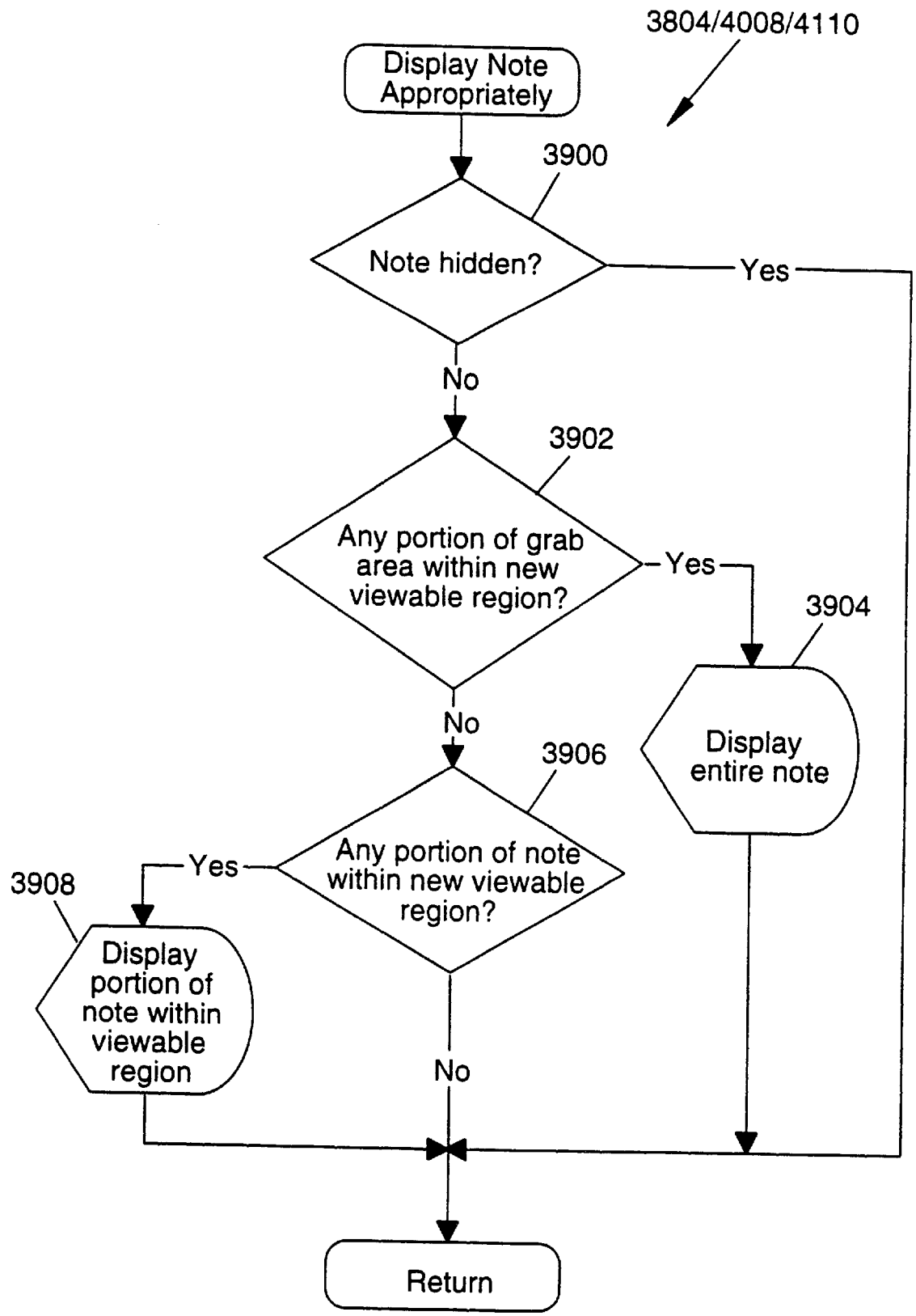
FIG. 39 is a flow chart showing the Display Note Appropriately block of FIG. 38 in additional detail.

Notes are processed by the block 3804 in accordance with the routine shown in FIG. 39. A block 3900 determines whether the note currently being processed is to be hidden. If the note is not to be hidden, a block 3902 determines whether any portion of the grab area of the note currently being processed, such as the grab area 102 of the note 100 shown in FIG. 1, is within the viewable region of the resized window. If some portion of the grab area of the note currently being processed is within the viewable region of the resized window, a block 3904 displays the entire note currently being processed.

On the other hand, if no portion of the grab area of the note currently being processed is within the viewable region of the resized window, a block 3906 determines whether any portion of the note currently being processed is within the viewable region of the resized window. If some portion of the note currently being processed is within the viewable region of the resized window, a block 3908 displays only that portion of the note currently being processed which is within this viewable region. If the block 3900 determines that the note currently being processed is to be hidden, or after the block 3904 displays the entire note currently being processed, or if the block 3906 determines that no portion of the note currently being processed is within the viewable region of the resized window, or after the block 3908 displays that portion of the note currently being processed which is within the viewable region of the resized window, the routine shown in FIG. 39 returns to the block 3802 shown in FIG. 38.

If the block 3016 determines that an object within a window is being moved so that the subroutine C9 shown in FIG. 40 is entered, a block 4000 determines whether there are any notes attached to the window within which an object is being moved. If so, a block 4002 determines whether there are any such notes which have not been processed. If the block 4002 determines that there are notes which have not been processed, a block 4004 determines whether a first of these notes is attached to an object being moved. If the block 4004 determines that a first of these notes is attached to an object being moved, a block 4006 moves this note along with the object to which it is attached so that this note remains attached to the object being moved. Thereafter, a block 4008 displays this note appropriately. The block 4008 executes the routine described previously in connection with FIG. 39.

If the block 4004 determines that this first note is not attached to an object being moved, or after the block 4008 displays this first note which is attached to an object being moved, the block 4002 determines whether there are any other notes which have not been processed by the blocks 4004, 4006 and 4008. If so, the next note is processed by these blocks. When the block 4002 determines that all notes, which are attached to this window within which an object is being moved, have been processed, or if the block 4000 determines that there are no notes attached to the window within which an object is being moved, the subroutine C9 returns to the block 1404 shown in FIG. 14.

If the block 3018 determines that a window is being scrolled so that the subroutine C10 shown in FIG. 41 is entered, a block 4100 determines whether there are any notes attached to this scrolled window. If there are, a block 4102 determines whether any of these notes have not been processed. If there are notes which have not yet been processed, a block 4104 determines whether a first of these notes which have not yet been processed is a moving note. A note is a nonmoving note if, for example, its nonmove option has been selected.

If the block 4104 determines that the first of these notes which have not yet been processed is a moving note, a block 4106 determines whether this note is attached to a moving note section of the window. For example, if the note is attached to a fixed note section of a window, the note is not moved as the scrollable contents of the window are scrolled.

If the block 4106 determines that the note is attached to a moving note section of a window, a block 4108 causes the coordinates of the note to be adjusted as the attachment site to which the note is attached scrolls with the contents of the scrolled window. Thereafter, a block 4110 causes the note to be displayed at the new coordinates. The block 4110 is executed in accordance with the routine shown in FIG. 39.

If the block 4104 determines that the note currently being processed by the blocks 4104–4110 is not a moving note, or if the block 4106 determines that this note is not attached to a moving note section of the scrolled window, or after this note is displayed by the block 4110, the block 4102 determines whether all of the notes attached to the scrolled window have been processed by the blocks 4104–4110. If all of the notes have not as yet been processed, the blocks 4104–4110 process another of the notes yet to be processed. When the block 4102 determines that all notes attached to the scrolled window have been processed, or if the block 4100 determines that there are no notes attached to this scrolled window, the subroutine C10 returns to the block 1404 shown in FIG. 14.

Figure 42:
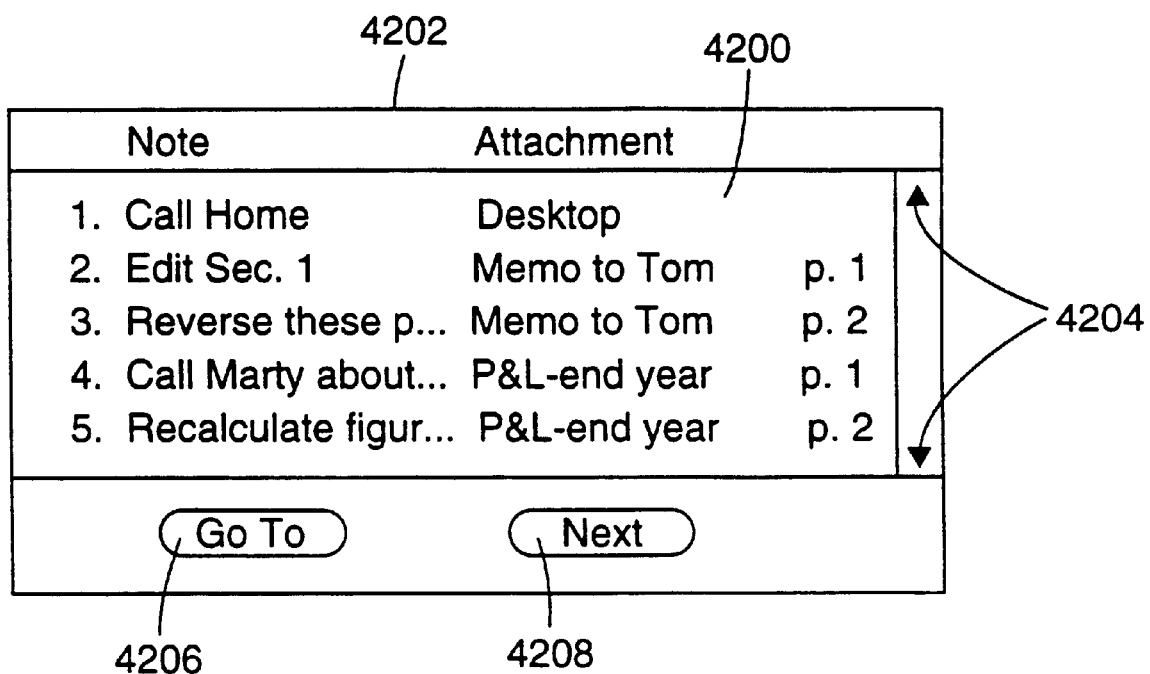

FIG. 42 provides an example of an index which can be maintained by the note program 318. This index contains the information added to it by the block 2204, and is useful, for example, in locating notes. As shown in FIG. 42, the index 4200 can be displayed within an index window 4202, and includes a listing of all, or some, of the notes created by the note program 318. As shown in FIG. 42 by way of example, each listing may include (i) all, or a portion, of a note's contents under a column designated Note, (ii) a region, such as the desktop or a document, to which the note is attached under a column designated Attachment, and (iii) a page number, if appropriate, of the document to which the note is attached.

The index window 4202 may include scroll controls 4204 so that a computer user may scroll through the note listings contained in the index 4200. The size of the index window 4202 for the index 4200 determines how many note listings are visible at one time within the index window 4202. However, the size of the index window 4202 may be adjustable by the computer user, if desired. If only a portion of the contents of a note is contained in a note listing, a series of periods may be used to indicate that the contents of the note are more extensive than shown in the index window 4202 of the index 4200.

Navigation controls can also be integrated into the index window 4202. For example, a Go To button 4206 may be used to go to a particular note after the computer user has selected a note from the list shown in the index window 4202. As shown in FIG. 42, a selected note may be indicated by shading in the index window 4202. A Next button 4208 may be used to go to the next note.

The index 4200 as shown in FIG. 42 is only an example of an index which can be provided. Note information which is different from, or in addition to, the note information shown in FIG. 2 can be provided. Also, the construction of the index window 4202 can be varied from that shown in FIG. 42. The index 4200 need not be displayed in a window. As an example, the index 4200 could instead be presented to the computer user as a menu.

Many alternatives and modifications have been described above. Many other alternatives and modifications will occur to those skilled in the art. For example, instead of displaying notes and windows in two dimensional regions on a conventional monitor, notes and windows may be displayed holographically, or otherwise, in three dimensional regions. Also, although "window" has been used herein in a conventional sense, the present invention is useful with windows having any number of shapes, sizes, colors, etc. Moreover, although the note 100 is shown as having a grab area 102 separate from the notation area 106, the grab area 102 and the notation area 106 may be coextensive. All such alternatives and modifications are covered by the present invention.

What is claimed is:

1. A computer readable storage medium having program code stored thereon, wherein the program code is arranged so that, when the program code is executed by a computer, a note is displayed, the note has a single options area, a notation area, and a grab area, and the notation area and the grab area are different areas of the note, and so that, when the single options area is activated, at least two options are displayed.

2. The computer readable storage medium of claim 1 wherein the note has one or more control areas.

3. The computer readable storage medium of claim 1 wherein the grab area and the single options area are at a top of the note.

4. The computer readable storage medium of claim 1 wherein the note has no scroll bar.

5. The computer readable storage medium of claim 1 wherein the note has a control area.

6. The computer readable storage medium of claim 5 wherein the control area is a resize control area.

7. The computer readable storage medium of claim 1 wherein the single options area contains a color option.

8. The computer readable storage medium of claim 1 wherein the single options area contains a delete option.

9. The computer readable storage medium of claim 1 wherein the single options area contains a font option.

10. The computer readable storage medium of claim 1 wherein the single options area contains a size option.

11. The computer readable storage medium of claim 1 wherein the single options area contains a duplicate option.

12. The computer readable storage medium of claim 1 wherein the single options area contains a print option.

13. The computer readable storage medium of claim 1 wherein the single options area contains a minimum and/or maximum option.

14. The computer readable storage medium of claim 1 wherein the single options area contains a video and/or sound option.

15. The computer readable storage medium of claim 1 wherein the single options area contains a drawings and/or graphics option.

16. The computer readable storage medium of claim 1 wherein the single options area contains a cut and/or paste and/or copy option.

17. The computer readable storage medium of claim 1 wherein the single options area contains a help option.

18. The computer readable storage medium of claim 1 wherein the single options area contains a note information option.

19. The computer readable storage medium of claim 1 wherein the single options area contains a preformatted notes option.

20. The computer readable storage medium of claim 1 wherein the single options area contains a nonmove option.

21. The computer readable storage medium of claim 1 wherein the single options area contains a content scrolling option.

22. The computer readable storage medium of claim 1 wherein the single options area contains a navigation option.

23. A computer readable storage medium having program code stored thereon, wherein the program code is arranged so that, when the program code is executed by a computer, a note is displayed, the note has an options button, a notation area, and a grab area, and the notation area and the grab area are different areas of the note, and so that, when the options button is activated, at least two options are displayed.

24. The computer readable storage medium of claim 23 wherein the note has one or more control areas.

25. The computer readable storage medium of claim 23 wherein the grab area and the options button are at a top of the note.

26. The computer readable storage medium of claim 23 wherein the note has no scroll bar.

27. The computer readable storage medium of claim 23 wherein the note has a control area.

28. The computer readable storage medium of claim 27 wherein the control area is a resize control area.

29. The computer readable storage medium of claim 23 wherein the options button contains a color option.

30. The computer readable storage medium of claim 23 wherein the options button contains a delete option.

31. The computer readable storage medium of claim 23 wherein the options button contains a font option.

32. The computer readable storage medium of claim 23 wherein the options button contains a size option.

33. The computer readable storage medium of claim 23 wherein the options button contains a duplicate option.

34. The computer readable storage medium of claim 23 wherein the options button contains a print option.

35. The computer readable storage medium of claim 23 wherein the options button contains a minimum and/or maximum option.

36. The computer readable storage medium of claim 23 wherein the options button contains a video and/or sound option.

37. The computer readable storage medium of claim 23 wherein the options button contains a drawings and/or graphics option.

38. The computer readable storage medium of claim 23 wherein the options button contains a cut and/or paste and/or copy option.

39. The computer readable storage medium of claim 23 wherein the options button contains a help option.

40. The computer readable storage medium of claim 23 wherein the options button contains a note information option.

41. The computer readable storage medium of claim 23 wherein the options button contains a preformatted notes option.

42. The computer readable storage medium of claim 23 wherein the options button contains a nonmove option.

43. The computer readable storage medium of claim 23 wherein the options button contains a content scrolling option.

44. The computer readable storage medium of claim 23 wherein the options button contains a navigation option.

45. A method performed by a data processing system comprising:

executing program code to display a note, wherein the note is attached to a first site, and wherein the note has an options area and a notation area;

executing program code to drag the note from the first site to a second site, wherein the note automatically attaches to the second site upon release of the note at the second site; and, executing program code so that, when the options area is activated, a list of options is displayed.

46. The method of claim 45 wherein the note has one or more control areas.

47. The method of claim 45 wherein the note further has a grab area, and wherein the grab area and the options area are at a top of the note.

48. The method of claim 45 wherein the note has no scroll bar.

49. The method of claim 45 wherein the note has a control area.

50. The method of claim 49 wherein the control area is a resize control area.

51. The method of claim 45 wherein the list contains a color option.

52. The method of claim 45 wherein the list contains a delete option.

53. The method of claim 45 wherein the list contains a font option.

54. The method of claim 45 wherein the list contains a size option.

55. The method of claim 45 wherein the list contains a duplicate option.

56. The method of claim 45 wherein the list contains a print option.

57. The method of claim 45 wherein the list contains a minimum and/or maximum option.

58. The method of claim 45 wherein the list contains a video and/or sound option.

59. The method of claim 45 wherein the list contains a drawings and/or graphics option.

60. The method of claim 45 wherein the list contains a cut and/or paste and/or copy option.

61. The method of claim 45 wherein the list contains a help option.

62. The method of claim 45 wherein the list contains a note information option.

63. The method of claim 45 wherein the list contains a preformatted notes option.

64. The method of claim 45 wherein the list contains a nonmove option.

65. The method of claim 45 wherein the list contains a content scrolling option.

66. The method of claim 45 wherein the list contains a navigation option.

* * * * *